(12) United States Patent
MacGaffey

(10) Patent No.: US 12,210,761 B2
(45) Date of Patent: Jan. 28, 2025

(54) DATA FABRIC ARCHITECTURE

(71) Applicant: MetaFluent, LLC, Warrenville, IL (US)

(72) Inventor: Andrew MacGaffey, Carol Stream, IL (US)

(73) Assignee: MetaFluent, LLC, Warrenville, IL (US)

( * ) Notice: Subject to any disclaimer, the term of this patent is extended or adjusted under 35 U.S.C. 154(b) by 102 days.

(21) Appl. No.: 18/177,583

(22) Filed: Mar. 2, 2023

(65) Prior Publication Data

US 2023/0333767 A1    Oct. 19, 2023

Related U.S. Application Data

(63) Continuation-in-part of application No. 17/553,986, filed on Dec. 17, 2021, now Pat. No. 11,809,734, which is a continuation of application No. 16/906,570, filed on Jun. 19, 2020, now Pat. No. 11,226,759.

(60) Provisional application No. 63/315,791, filed on Mar. 2, 2022, provisional application No. 62/864,022, filed on Jun. 20, 2019.

(51) Int. Cl.
    *G06F 3/06*    (2006.01)

(52) U.S. Cl.
    CPC ............ *G06F 3/065* (2013.01); *G06F 3/0619* (2013.01); *G06F 3/067* (2013.01)

(58) Field of Classification Search
    CPC ........ G06F 3/065; G06F 3/067; G06F 3/0619; G06F 16/24568; G06F 3/061; G06F 3/0649
    See application file for complete search history.

(56) References Cited

U.S. PATENT DOCUMENTS

| | | | |
|---|---|---|---|
| 2003/0018626 A1* | 1/2003 | Kay | G06Q 30/02 209/7 |
| 2018/0089324 A1 | 3/2018 | Pal et al. | |
| 2019/0095493 A1 | 3/2019 | Bhattacharjee et al. | |
| 2019/0147084 A1 | 5/2019 | Pal et al. | |
| 2020/0050586 A1* | 2/2020 | Pal | G06F 16/148 |
| 2021/0117425 A1* | 4/2021 | Rao | H04L 41/0806 |
| 2022/0107802 A1* | 4/2022 | Rao | G06F 16/907 |
| 2022/0247678 A1* | 8/2022 | Atwal | H04L 45/645 |
| 2023/0259490 A1* | 8/2023 | Liu | G06F 16/13 707/741 |

\* cited by examiner

*Primary Examiner* — Jason W Blust

(74) *Attorney, Agent, or Firm* — Potomac Law Group, PLLC

(57) ABSTRACT

Embodiments operate a data fabric node architecture that includes one or more data fabric nodes. Embodiments receive a session initiation from a client application and publish corresponding session metadata to the data fabric. Embodiments receive from the client application a query and perform syntactic analysis and publish a result of the analysis to the data fabric as a query metadata. Embodiments then anchor the query metadata in the data fabric to the session metadata.

20 Claims, 77 Drawing Sheets

DATA FABRIC ARCHITECTURE

CROSS REFERENCE TO RELATED APPLICATIONS

This application is a Continuation-In-Part of U.S. application Ser. No. 17/553,986, filed on Dec. 17, 2012, which is a Continuation of U.S. application Ser. No. 16/906,570, filed on Jun. 19, 2020, which claims priority of U.S. Provisional Patent Application Ser. No. 62/864,022, filed on Jun. 20, 2019. This application also claims priority of U.S. Provisional Patent Application Ser. No. 63/315,791, filed on Mar. 2, 2022. The disclosures of each of these applications are hereby incorporated by reference.

FIELD

One embodiment is directed generally to data storage and distribution, and in particular to a data replication and caching system.

BACKGROUND INFORMATION

A distributed data store or system is a computer network where information is stored on more than one node, often in a replicated fashion. A "distributed data store" typically refers to either a distributed database where users store information on a number of nodes, or a computer network in which users store information on a number of peer network nodes. Distributed databases are usually non-relational databases that enable quick access to data over a large number of nodes. Some distributed databases expose rich query abilities while others are limited to a key-value store semantics.

Key-value store solutions offer persistence and/or "refresh" style life-cycle models where Objects must either be explicitly removed or they must be explicitly refreshed to keep them alive and in cache. However, in large-scale distributed business applications that may require tens of thousands of real-time streaming, the large numbers of Objects that must be attended to causes a large computing resource drain.

SUMMARY

Embodiments operate a data fabric node architecture that includes one or more data fabric nodes. Embodiments receive a session initiation from a client application and publish corresponding session metadata to the data fabric. Embodiments receive from the client application a query and perform syntactic analysis and publish a result of the analysis to the data fabric as a query metadata. Embodiments then anchor the query metadata in the data fabric to the session metadata.

DETAILED DESCRIPTION

Embodiments are directed to a fault-tolerant and efficient data replication and caching mechanism (referred to as a "data fabric") for storing and replicating Objects in a distributed system for real-time data distribution. The data fabric allows Object-creating business logic (i.e., a "Publisher") to efficiently insert, delete and otherwise manage large numbers of Objects that can be "pushed" to consumers and represent real-time data. The use of the data fabric for this purpose allows Object-consuming business logic (i.e., a "Consumer") to access those Objects in a distributed system architecture spanning an arbitrary number of computer systems and networks.

Further, embodiments are directed to a data integration and distribution platform that supports on-demand materialization of raw (static and dynamic) and augmented (joined and computed) content made available to business applications via simple query mechanisms and a variety of distribution protocols, including, notably, low-latency (sub-millisecond) distribution and very high data volumes, such as would be required for financial trading applications.

In embodiments, a Publisher is an application business logic that uses the data fabric to publish Objects in various Scopes for use by one or more Consumers, while a Consumer is application business logic that uses the data fabric to access one or more Objects in various Scopes as published by Publishers.

Embodiments include a data fabric formed from one or more data fabric nodes. The data fabric allows a Publisher to define Object relationships in such a way as to enable autonomous, efficient and distributed Object life-cycle management by the data fabric on behalf of the Publisher—independent of the Publisher life-cycle. The data fabric in embodiments is an abstraction (i.e., the "fabric") describing a mechanism used by business logic to replicate and distributed Objects within a distributed system. The distributed system is a set of cooperating processes running on one or more computers and interacting via a data fabric implementation. For purposes of the disclosure, "business logic" refers to arbitrary application code using the data fabric. With respect to the data fabric, the business logic has one or both roles of "Publisher" and "Consumer". In general, "business logic" cam be considered some arbitrary algorithm or rules driving the actions of the Publisher and Consumer roles.

Figure 1A:
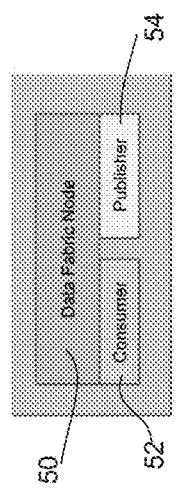
FIGS. 1A-C illustrate data fabrics in accordance to different embodiments.
Figure 1B:
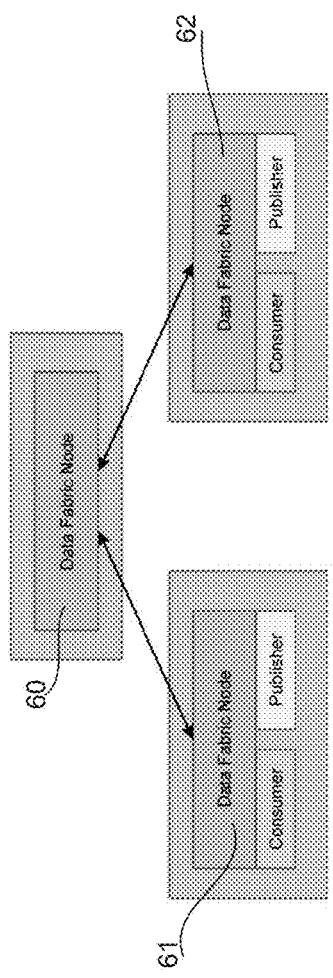
Figure 1C:
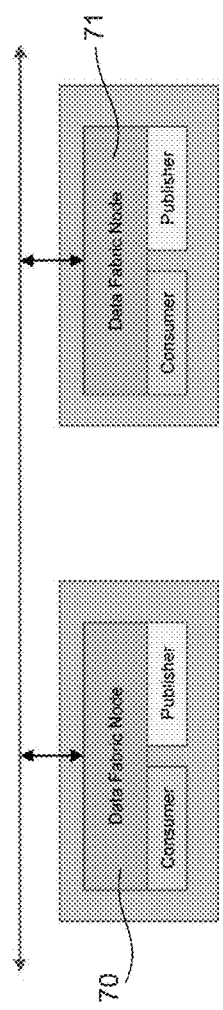

FIGS. 1A-C illustrate data fabrics in accordance to different embodiments. Each data fabric is a set of one or more data fabric nodes in one or more computer operating system processes. Consumers interact directly with the data fabric node within their process. Data fabric nodes communicate with one another across a network using any variety of inter-process communication mechanisms, such as Remote Procedure Calls ("RPC") or purpose-built asynchronous messaging. In embodiments, the number of Consumers or Publishers associated with any particular Node is arbitrary.

In FIG. 1A, the data fabric includes a single data fabric node 50 that includes a Consumer node 52 and a Publisher node 54 that implement a single-process data fabric deployment. In FIG. 1B, the data fabric includes data fabric nodes 60-62 that implement a hierarchical multi-process data fabric deployment. In FIG. 1C, the data fabric includes data fabric nodes 70-71 that implement a peer-to-peer multi-process data fabric deployment.

Figure 2:
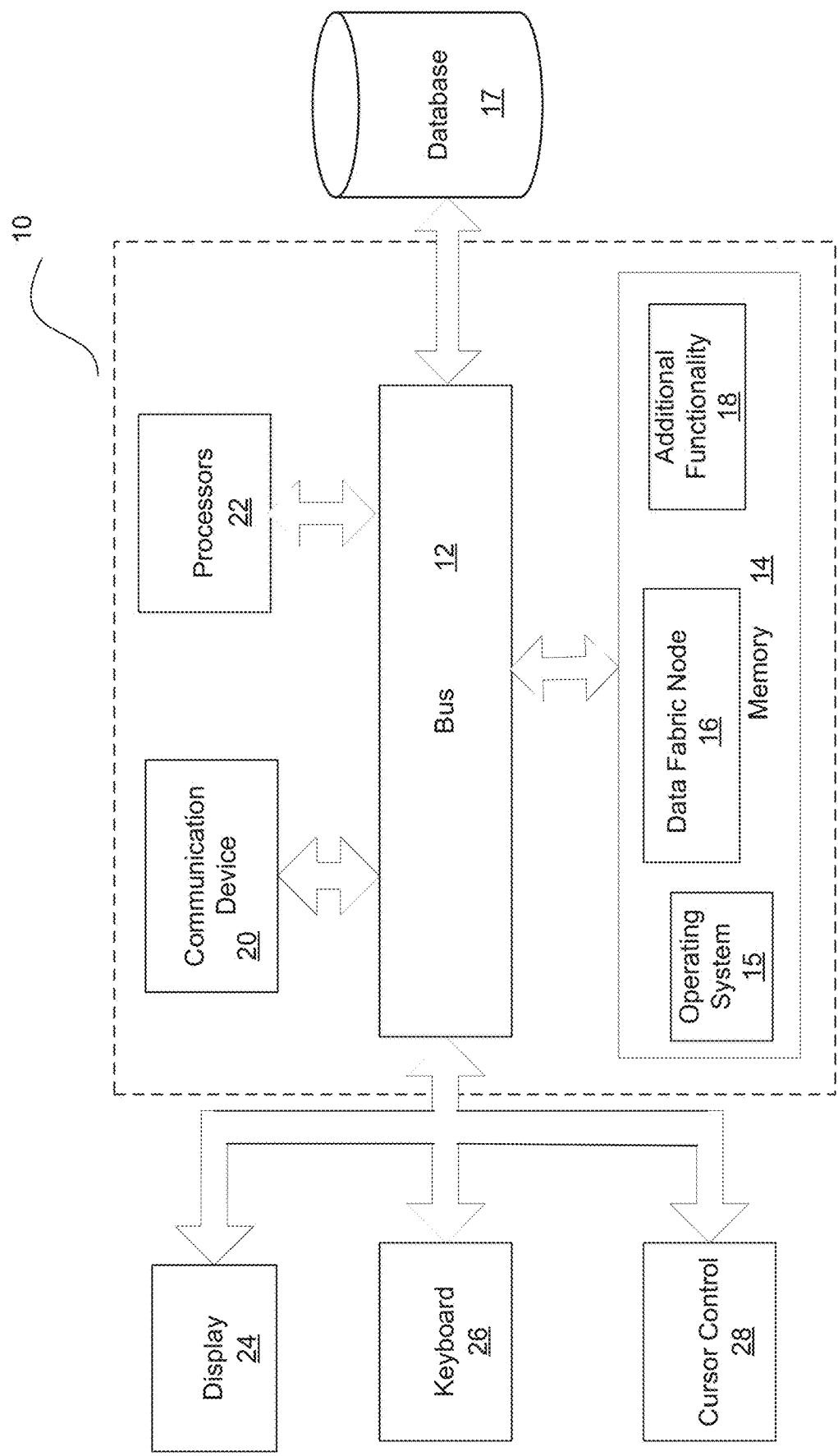
FIG. 2 is a block diagram of a computer server/system that can implement any of the data fabric nodes of FIG. 1 in accordance with embodiments of the present invention.

FIG. 2 is a block diagram of a computer server/system 10 that can implement any of the data fabric nodes of FIG. 1 in accordance with embodiments of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a data fabric node module 16 that implements the functionality of the data fabric node, and all other functionality disclosed herein. System 10 can be part of a larger system. Therefore, system 10 can include one or more additional functional modules 18 to include the additional functionality, such as a financial market real-time data streaming service, or any other service that retrieves and streams a large amount of data, or any other associated business logic. A file storage device or database 17 is coupled to bus 12 to provide centralized storage for modules 16 and 18, including data generated by the sensors in the form of messages or data points. In one embodiment, database 17 is a relational database management system ("RDBMS") that can use Structured Query Language ("SQL") to manage the stored data.

In embodiments, a "Type" refers to a unique data Type (e.g., a Class, as in the Java programming language), and an "Object" refers to a named instance of some arbitrary Type (e.g., session metadata). In embodiments, an "Object Scope" refers to a named collection of Objects (a "Scope"), all having the same Type, and an "ID" refers to a globally unique name, or identifier, describing, for example an Object (an "Object ID") or a Scope (a "Scope ID").

Referring again to FIG. 1, each data fabric node is the concrete manifestation of the data fabric abstraction as used by business logic to interact with the data fabric. When created, a data fabric node is implicitly assigned a node ID (i.e., a globally unique identifier). In a distributed implementation of the data fabric, a data fabric node may interact directly and indirectly with zero or more other nodes. A node communicates with other nodes using any one or more of various synchronous or asynchronous message-based protocols and/or RPC mechanisms.

Collectively, the various data fabric nodes and associated business logic using those nodes form the "distributed system." Various system topologies are possible, including but not limited to directed graphs and peer-to-peer networks.

Use Cases

Embodiments provide many use cases that describe functions of the data fabric from the perspective of Publishers and Consumers in accordance with embodiments, including the following:

1. Object Publishing

Object publishing involves a Publisher publishing an Object, making it accessible by Consumers using the same data fabric. Objects published in this manner must be uniquely identifiable. In general, the Publisher passes the Object to the fabric specifying the Object's Type, Scope ID and Object ID. Any Consumer having previously expressed, to the fabric, interest in this particular Scope will receive an event from the fabric indicating that an Object has been added to the Scope. The data fabric will then supply either the Object itself or an exact copy of the Object to the Consumer.

After a Publisher initially publishes an Object, it may subsequently update that Object by replacing in the fabric the existing Object instance with a new Object instance having the same Type, Scope ID and Object ID.

A Publisher removes a previously published Object by specifying to the fabric the Type, Scope ID and Object ID of the Object that should be removed. Any Consumer having previously expressed to the fabric interest in this particular Scope is informed by the fabric that the Object has been removed and provided with a reason for the removal.

A Publisher may publish an Object to the fabric as above and also specify an interval at which the Object (a "Time-Limited Object") must be "refreshed". If the Object is not refreshed in a timely manner by the Publisher or some other business logic, the data fabric automatically removes the original Object along with any replicated copies and notifies any interested Consumers.

A Publisher, or some other business logic, may refresh a Time-Limited Object by passing to the data fabric the identity (Type, Scope ID and Object ID) of the Object that should be refreshed.

A Publisher may want to tie the life-span of Objects in a Scope (the "Anchored Scope") to a particular Object (the "Anchor") outside the Scope. The Publisher requests that the data fabric anchor a Scope by specifying the Type of Objects in the Anchored Scope, the Scope ID of the Anchored Scope, the Type of the Anchor, the Scope ID of the Scope containing the Anchor, and Object ID of the Anchor. Execution of Publisher business logic stops (i.e., blocks) until the Anchor is available or a specified time has elapsed. After a Scope is successfully anchored, any Object published to that Scope will have a lifespan governed by that of the Anchor. The Publisher may want to know if/when the Anchor is removed. However, if the anchor does not exist or come into existence during the requested time-frame, the anchoring request fails.

2. Object Access and Monitoring

In embodiments, object access and monitoring involves when a Consumer wants to access a particular known Object instance of a particular Type. To access an individual Object, a Consumer requests the Object from the data fabric by specifying the Object's Type, the relevant Scope ID, and the Object ID. Execution of Consumer business logic stops (blocks) until the requested Object is available.

When accessing an Object, rather than wait/block indefinitely, a Consumer may choose to block for an arbitrary amount of time before the access operation is considered to have failed. If the Object does not exist or come into existence during the requested time-frame the request fails. Further, when accessing an Object, rather than block or wait, a Consumer may choose to be notified asynchronously when an Object is available.

When accessing an Object, a Consumer can be notified if the Object is subsequently updated or removed. If an Object is removed, the reason for removal can be provided. Reasons for removal include:

Explicit Removal—the Object was removed by the Publisher.
Timeout—the Object had a time-limited lifespan and was not refreshed in a timely manner.
Anchor Removed—the Object was anchored.
Implicit Removal—the Publisher has been disconnected from the data fabric.

3. Scope Access and Monitoring

Scope access and monitoring involves a Consumer wanting to access all the Objects in a particular Scope. To monitor all the Objects in a Scope, using an Object Monitor disclosed below, a Consumer specifies to the data fabric the Object Type and the relevant Scope ID. The Consumer can iterate over the collection of Objects currently in the Scope and can also randomly access Objects in the collection using an Object ID. A call-back can be provided when the Consumer wants to be notified if Objects are added to, removed from, or updated within the Scope.

Logical View

The following concepts apply to a logical view of embodiments of the invention:

A "Default Scope ID" is a predefined and well-known Scope ID.

A "Default Scope" is a Scope for a particular Type having the Default Scope ID. There generally is one Default Scope for each type of Object. In general, Applications are usually designed such that Objects of a given Type are either always in the Default Scope or always in one of many possible explicitly named Scopes where the corresponding Scope IDs are determined by some consistent business logic rules. For example, assume there exists a business object Type called "session" that represents user sessions and has a unique session ID. Further, assume there is another business object Type representing "query" such that query instances are always associated with a particular session instance, and therefore associated with a particular session ID. Then, one possible use of the data fabric is to store session objects in the Default Scope and to store the set of query Objects for each session in an Anchored Scope tied to particular session Object. Given this design, Consumers can find all the active sessions by accessing the session Objects in a well-known Scope and, having knowledge of the individual sessions, find all the queries related to each session by accessing the relevant query Scopes as identified by the query Type and session ID.

An "Object Map" is an abstraction representing the set (i.e., the map) of Objects in a particular Scope and providing both random and sequential access. Essentially, an Object Map is a read-only manifestation of a Scope. Consumers access an Object Map from the data fabric by specifying the appropriate Type and Scope ID.

A "Future" is a construct from standard programming languages, such as Java, used in multi-threaded frameworks to access the result of an asynchronous operation. A Future supports both blocking and timed-blocking access patterns in the form of various "get" operations. Timed access operations fail if unsatisfied after a caller-specified time period. Application logic that acquires a Future and accesses it in a non-blocking manner has the option to cancel a Future before it completes.

An "Object Future" is a Future for which the result of the get operations is a specific Object in a particular Scope.

An "Object Map Future" is a Future for which the result of the get operations is an Object Map.

An "Object Monitor" is an abstraction that receives from the data fabric events relating to a specific object instance. Object-related events include Update and Remove events. A Consumer has the option of associating an Object Monitor implementation with an Object Future when it obtains the Future from the data fabric. The Future supplies access to the requested Object. The optional monitor is notified if the Object is updated or removed.

An "Object Map Monitor" is an abstraction that receives from the data fabric events relating to an Object Map. Map-related events include Add, Remove, and Update events. A Consumer has the option of associating an Object Map Monitor implementation with an Object Map Future when it obtains the future from the data fabric. The Future supplies access to the requested Object Map. The Object Monitor is notified when the data fabric adds, removes or updates Objects in the Scope represented by the Object Map.

An "Object Life-Cycle" is a property that defines the rules governing the removal ("Life-Cycle") of an Object from the fabric are determined by the Publisher that creates it. All Objects in a particular Scope have the same Life-Cycle. Life-cycle alternatives are:

Bound—The data fabric will destroy a Bound Object when the process containing the original Publisher of the Object exits or the Node for that process is otherwise destroyed.
Timed—The data fabric destroys timed Objects that have not been "touched" or "refreshed" within an arbitrary Publisher-specified time interval. The Application refreshing a timed Object does not have to be the Publisher that created it. Therefore, it is possible for Objects with a timed life-cycle to survive a process restart.

Anchored—The data fabric destroys anchored Objects when the Object to which the containing Scope (an "Anchored Scope") is destroyed. Anchored Objects therefore have a life-cycle independent of the life-cycle of the Publisher. An Anchor may itself be in an Anchored Scope and therefore have an Anchored life-cycle—or it could be Bound or Timed.

A "data fabric Node" is the implementation of the data fabric in a particular process (a "Node"). The data fabric abstraction can encompass multiple processes executing on one or more systems.

A "Node Identifier" is an ID used for a Node.

A "Publishing Node" is the Node associated with a particular Publisher.

A "Consuming" or "Consumer" Node is the Node associated with a particular Consumer.

A "Replicating Node" is the Node that replicates an Object originating in some other Node A "Scope Metadata" is a particular Type that describes a Scope in terms of ID, Type, Object Life-Cycle and, for Anchored Scopes, information about the Anchor. Scope Metadata is created by the fabric implementation in response to Publisher activity and is stored in a Default Scope within the fabric. Instances of Scope Metadata can be accessed, monitored, replicated and anchored to—just like any other Object.

A "Default Scope Metadata" is Scope Metadata that exists in a Consuming Node where a Subscriber accesses a Scope before the Scope Metadata from a Publishing Node is available, either because it does not yet exist or the replication of that original Scope Metadata has not yet happened. A Consumer Node will replace (update) any Default Scope Metadata with the actual Scope Metadata if and when that Scope Metadata is available for replication from the Publisher Node (i.e. at some time after the Publisher performs a publish operation).

An "Aggregate Interest" is an abstraction representing the aggregate interest in a particular Object from the perspective of a particular data fabric Node. Aggregate Interest tracks interest from Consumers, both Futures and Monitors, associated with the "local" Node (i.e., "Local Interest") as well as interest from Consumers associated with remote Nodes (i.e., "Remote Interest").

An "Aggregate Object Interest" tracks the Aggregate Interest for a particular Object.

An "Aggregate Map Interest" tracks the Aggregate Interest for a particular Object Map.

A "Distributed Object Future" is an implementation of an Object Future that represents an Object Future in some remote Consuming Node. In other words, a Distributed Object Future is the local manifestation of a get operation in one or more remote Consuming Nodes.

A "Distributed Object Map Future" is an implementation of an Object Map Future that represents an Object Map Future in some remote Node. In other words, a Distributed Object Map Future is the local manifestation of a map access operation in one or more remote Consuming Nodes.

A "Distributed Object Monitor" is an implementation of the Object Monitor abstraction. It is the local manifestation of an Object Monitor in one or more remote Consuming Nodes.

A "Distributed Object Monitor" is an implementation of the Object Map Monitor abstraction. It is the local manifestation of an Object Map Monitor in one or more remote Consuming Nodes.

The Scope, as disclosed above, is a uniquely identifiable collection of Objects. The unique identity of a Scope is formed by an Object Type combined with a Scope ID. The data fabric is conceptually a collection of Scopes. In general, a Scope is effectively an implementation of the Object Map abstraction. A Scope, represented as an Object Map, may be accessed and monitored by one or more Consumers and therefore maintains an Aggregate Map Interest to track that interest.

Interest in a Scope may originate from local or remote Consumers. Local monitoring is represented by Consumer-supplied implementations of the Object Map Monitor. Remote interest in a scope is represented by instances of the Distributed Object Map Monitor.

Objects within a Scope may be individually monitored by one or more Consumers. Therefore, in addition to storing Objects, a Scope also maintains an Aggregate Object Interest for each Object along with any relevant Object Futures and Object Monitors.

Interest in Objects within a Scope may originate from local or remote Consumers. Local monitoring is represented by Consumer-supplied implementations of the Object Monitor. Remote interest in an Object is represented by instances of the Distributed Object Monitor. Each Scope therefore has zero or one Aggregate Map Interests associated with the Scope and zero or more instances of an Aggregate Object Interest, each of which is associated with a unique Object ID within the Scope.

Scope Metadata is a type of Object that describes a particular instance of the Scope. The description includes the Scope ID, the Object Type, and the Object-Lifecycle. The Scope Metadata for an Anchored Scope includes information about the anchor (Scope ID, Object-Type and Object ID).

The data fabric creates Scope Metadata as needed and stores it in the data fabric in the Default Scope ID. As with any other type of Object, Scope Metadata can also be updated or removed. Storing Scope Metadata in the data fabric in this way means that it can be requested and monitored using a Future, Future Callback and Object Map Monitor like any other Scope.

Since a Publisher determines Object Life-Cycle, it is possible that a Scope created in response to Consumer activity will have an undetermined Life-Cycle, at least until an Object is published into that Scope.

At startup, each Node connects to zero or more other Nodes. The set of other Nodes may be configured or dynamically recognized through some advertising mechanism. Subsequently, each Node expresses to any connected Node an interest in the Object Map for the Default Scope of Scope Metadata. It does this by requesting an Object Map Future specifying the Scope Metadata type and the Default Scope Identifier.

Each Node also conveys to the other Nodes any unsatisfied or open-ended interest in specific Objects or Object Maps. Interest expressed from one Node to another is manifested as a Future, as any application-level interest would be. As Objects are replicated from a remote Node into the local Node, any Futures associated with the local Node are satisfied as appropriate.

A Node may detect that a connected Node becomes disconnected, in which case any local replications of Objects that originated with the disconnected Node and having an Object Life-Cycle of type Bound are removed from the Node and any monitoring Futures are notified accordingly. Unlike Bound Scopes, Anchored Scopes are not necessarily dependent in this manner on the existence of the originating Node but rather are dependent on the existence of the Anchor Object.

Use Case Realizations

1. Publishing

Figure 3:
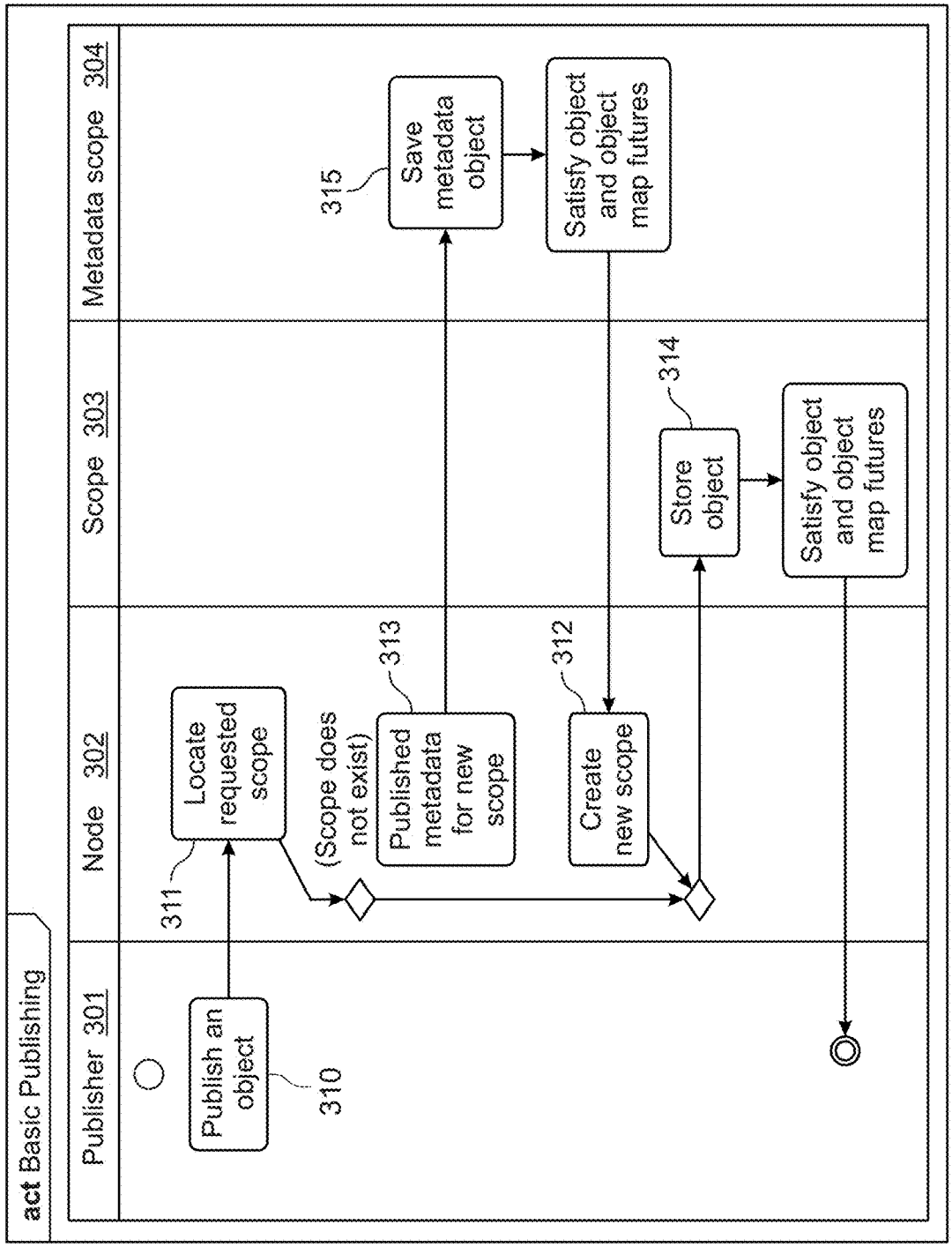
FIG. 3 is a swim lane diagram illustrating functionality for publishing a Bound Object in accordance to embodiments of the invention.

FIG. 3 is a swim lane diagram illustrating functionality for publishing a Bound Object in accordance to embodiments of the invention. In embodiments, the functionality of the swim lane of FIG. 3 (and swim lanes and flow diagrams of FIGS. 4-10 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 310, a Publisher 301 publishes an Object by passing to the data fabric Node 302 the Object Type, the Scope ID, the Object ID and the Object itself.

At 311, Node 302 looks for the specified Scope 303 and, if it does not exist, creates it at 312. All Objects in a given Scope have the same Life-Cycle as determined by the first publishing attempt in a particular Scope.

When Node 302 creates Scope 303, it first creates an instance of Scope Metadata and publishes at 313 in a Default Scope for Scope Metadata 304. Because any connected Nodes have interest in Scope Metadata 304, this new instance of Scope Metadata will be replicated across the data fabric.

Once the appropriate Scope exists, the Object passed by the application is stored in Scope 303 at 314.

If there is an Aggregate Object Interest (comprising both local and remote interest) associated with the published Object, then the Object is passed to the registered Object Futures and/or Object Monitors. In the case of Distributed Object Futures (representing remote interest), the Object must be replicated across a network via one or more intermediate Nodes.

If there is an Aggregate Map Interest for the Scope in which the Object is published, then the new Object is passed to the corresponding Consumers that have expressed interest in the map. Again, those Consumers may be located on local and/or remote Nodes. In all cases the Object would be passed to any Object Map Monitors and would be available for any subsequent random and iterative access via any Object Maps. In the case of Distributed Object Map Futures (representing remote interest), the Object must be replicated across a network via one or more intermediate Nodes.

For publishing timed Objects, a Publisher gives a published Object a Timed Object Life-Cycle by specifying a refresh interval at the time of publishing. The Publisher must periodically "refresh" the Object with the local Node. The local Node will replicate the refresh to any connected Nodes (and so-on throughout the data fabric) thus keeping the Object alive and available.

For any Scopes having a Timed Object Life-Cycle, each Node in a data fabric must track the refresh time of each Object within the Scope and remove any Objects that age (i.e., those whose elapsed refresh time exceeds that specified at the time of publishing).

Figure 4:
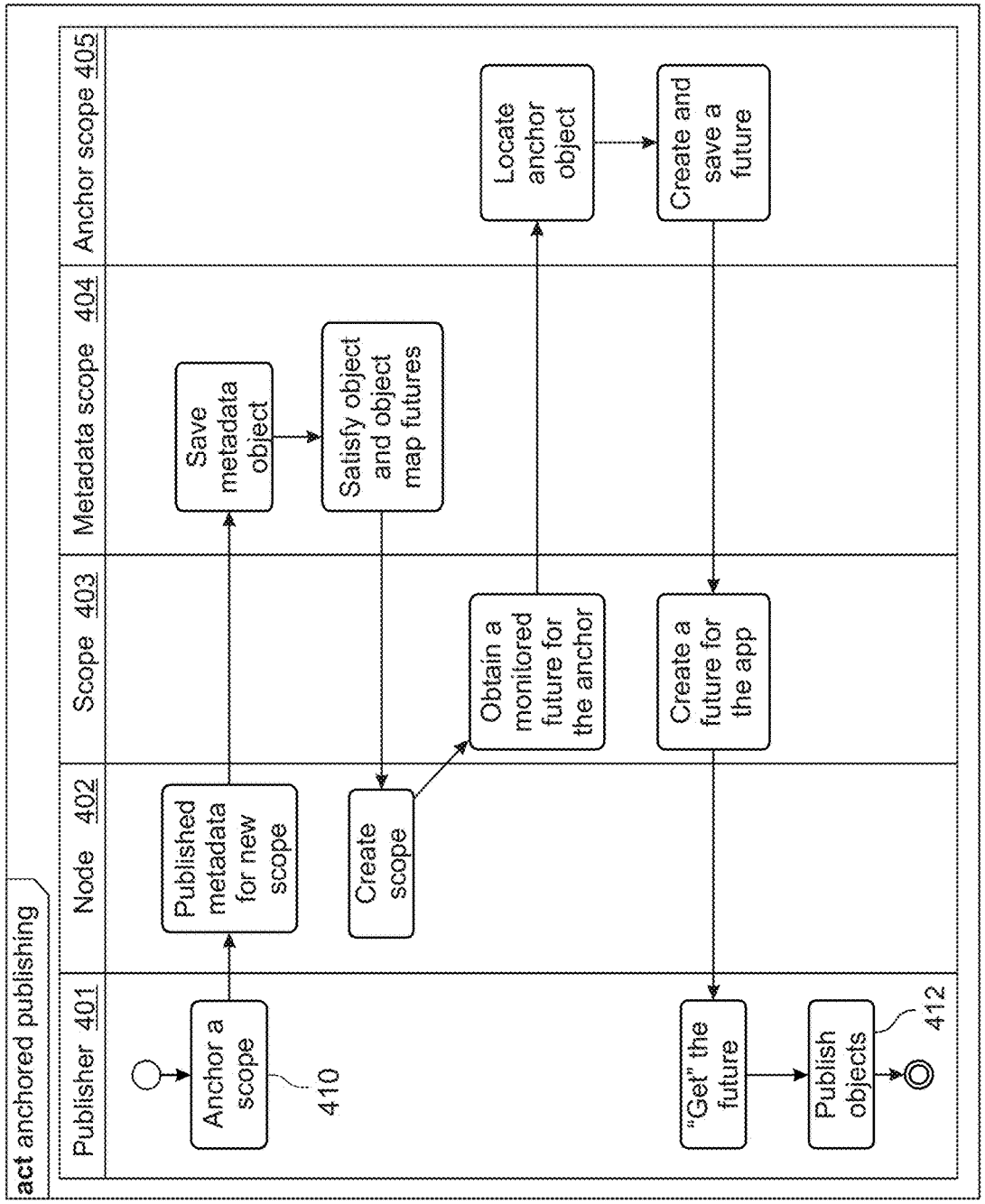
FIG. 4 is a swim lane diagram illustrating functionality for publishing an Anchored Object in accordance to embodiments of the invention.

FIG. 4 is a swim lane diagram illustrating functionality for publishing an Anchored Object in accordance to embodiments of the invention.

At 410, a Publisher 401 anchors a Scope 403 by passing to the data fabric Node 402 the Object Type for the Scope, a Scope Identifier, the Object Type of the Anchor, the Scope Identifier of the Anchor and the Object Identifier of the Anchor. In return, Publisher 401 receives an Object Future for the Anchor. This Future behaves like any other Object Future and Publisher 401 can perform a get operation on the Anchor.

Having obtained the Object Future corresponding to the Anchor, Publisher 401 performs a get operation at 411, typically with a suitable timeout specified. Once the Future is complete, Publisher 401 can publish Objects at 412 into the specified Scope which is now anchored.

In embodiments, anchoring a Scope may fail if the data fabric cannot locate the Anchor in a timely manner. Therefore, the data fabric creates an Anchored Scope 405 with corresponding Scope Metadata 404, including information about the identity of the Anchor. This metadata is inserted into the data fabric as before and is therefore replicated across the data fabric. Other Nodes in the data fabric now understand that this new Scope has an Anchored Lifecycle and, when necessary, will express interest in the Anchor in the form of an Object Future and an Object Monitor.

In a Distributed data fabric, the first time an Object is replicated into an Anchored Scope within a particular Node, that Node will attempt to Anchor the local representation of the Scope and therefore in each such Node in the data fabric, the local representation of a Scope having an Anchored Object Life-Cycle provides an implementation of an Object Monitor associated with the Anchor Future. The implementation of the Object Monitor will respond to an Object delete event (generated if the Anchor is removed from the data fabric for any reason) by removing from the data fabric the Anchored Scope and its contents from that local Node. This life-cycle management activity happens independently in each Node of the data fabric.

A Publisher removes an Object from the data fabric by passing to the Node the Object Type, the Scope Identifier, and the Object Identifier of the Object to be removed. When the Object is removed, the Node locates the relevant Scope and from there can determine if there are any Monitors for this particular Object or for the Scope. As before, interest in an Object may be local and/or remote and the fabric will notify any registered Object Monitors and Object Map Monitors that the Object has been removed. In this case, the reason will be given as an Explicit Removal.

In addition, if the removed Object is an Anchor, meaning there are other Scopes anchored to the removed Objects, the local Node will in turn remove all Objects in those scopes and also remove the Scopes. The reason given is Anchor Removed. Objects removed in this manner may also be Anchors (for one or more other Scopes), and therefore the removal process continues as necessary.

Remote Nodes that had interest in the Object removed by the Publisher will receive a notification, via the corresponding Distributed Object Monitor, that the Object has been removed. A key efficiency improvement in this process is that a Distributed Object Monitor does not forward remove events having a reason of Anchor Removed. Because remote Nodes understand the relationship between Anchors and Anchored Scopes, each Node has the means to manage the removal process autonomously. This minimizes the communication required to remove a tree of anchored Scopes and Objects.

2. Object Accessing and Monitoring

Figure 5:
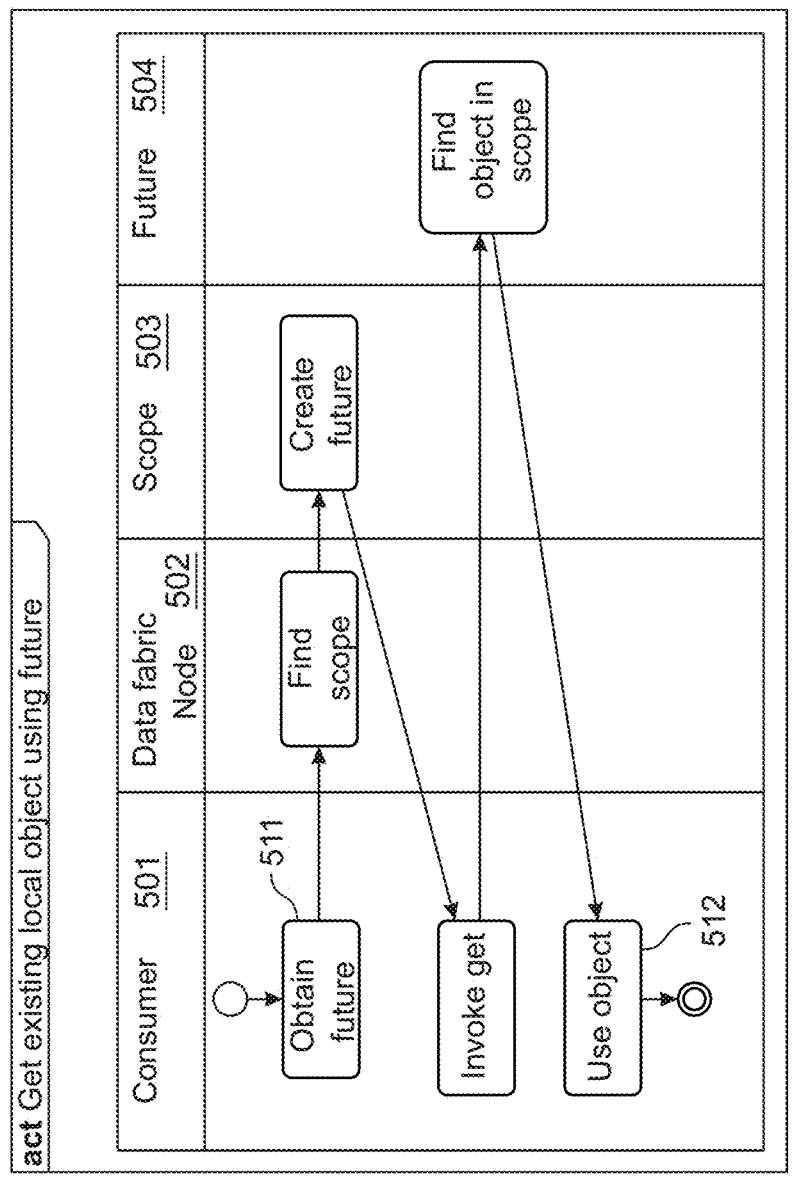
FIG. 5 is a swim lane diagram illustrating functionality for getting an Object with an Object Future in accordance to embodiments of the invention.

FIG. 5 is a swim lane diagram illustrating functionality for getting an Object with an Object Future in accordance to embodiments of the invention.

In FIG. 5, a Consumer 501 accesses an Object by requesting from a data fabric Node 502 an Object Future 504 at 511, specifying to the Node 502 the Object Type, the Scope Identifier and the Object Identifier.

Having obtained the Object Future 504, Consumer 501 can execute a get operation on that Future at 512. There are both blocking and timed-wait versions of the get operation available.

It is possible that Node 502 does not yet have the requested Object and further, it may not have any Scope Metadata for the request Scope. If the Scope Metadata is unknown, Node 502 will create a Scope 503 with Default Scope Metadata. This metadata is a placeholder that will be replaced if and when the metadata from the Publisher Node becomes available.

If there is a Publisher somewhere attached to the data fabric that is publishing to the requested Scope 503, the correct Scope Metadata will be replicated into the local Node and the Default Scope Metadata will be replaced. This has no impact on Consumer 501 but may influence the treatment of the Scope 503 by Node 502 as far as life-cycle management FIG. 6 is a swim lane diagram illustrating functionality for getting a blocking distributed get operation with a single remote node 605 in accordance to embodiments of the invention.

Figure 6:
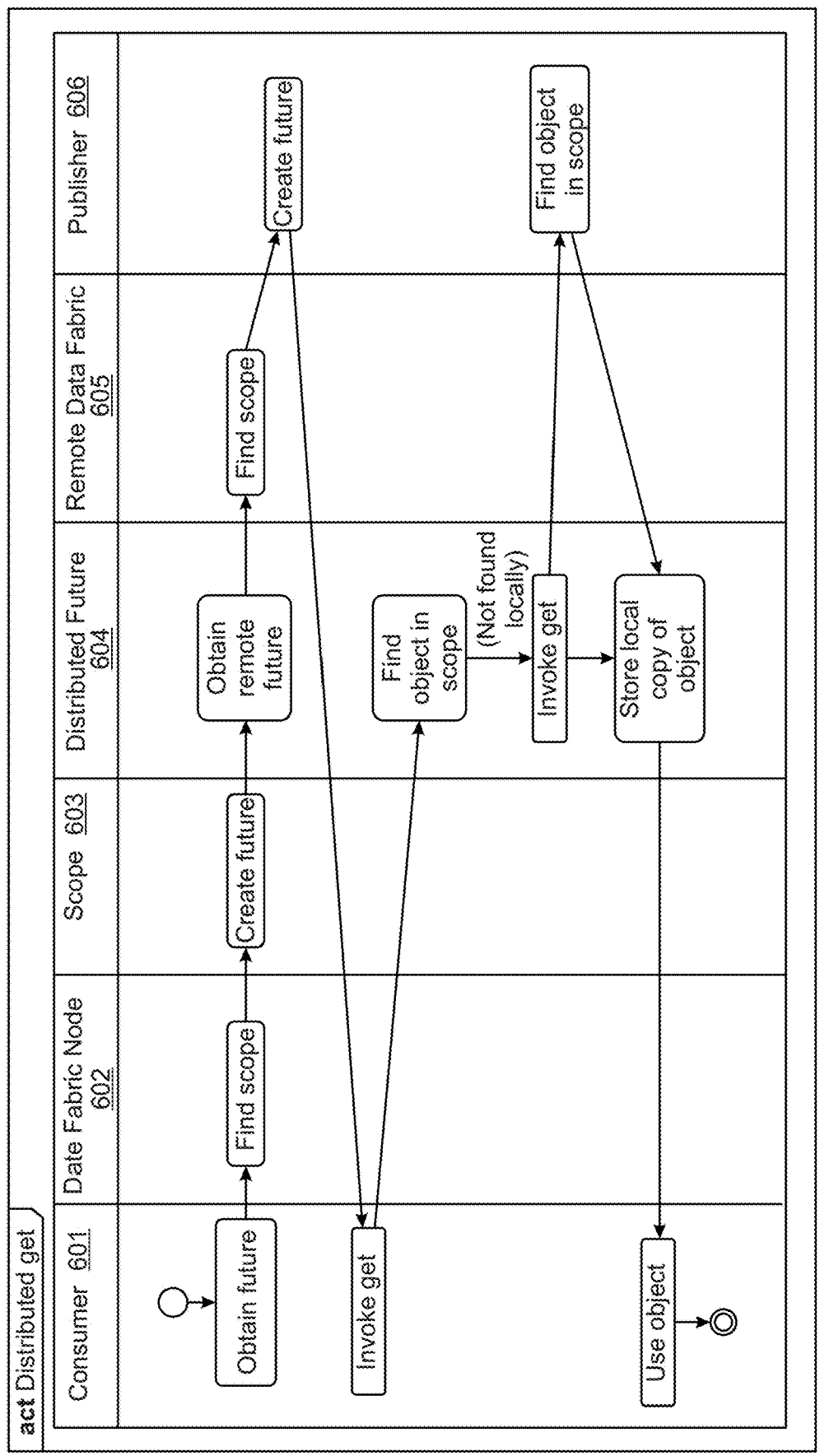
FIG. 6 is a swim lane diagram illustrating functionality for getting a blocking distributed get operation with a single remote node in accordance to embodiments of the invention.

In FIG. 6, if the Object is not available locally, Node 602 will create a Distributed Object Future for each connected Node, 602, 605, thus distributing the get operation across the entire data fabric. Once the Object is found it will be replicated locally and the Object Future will be complete and the Object is available to Consumer 601.

Figure 7:
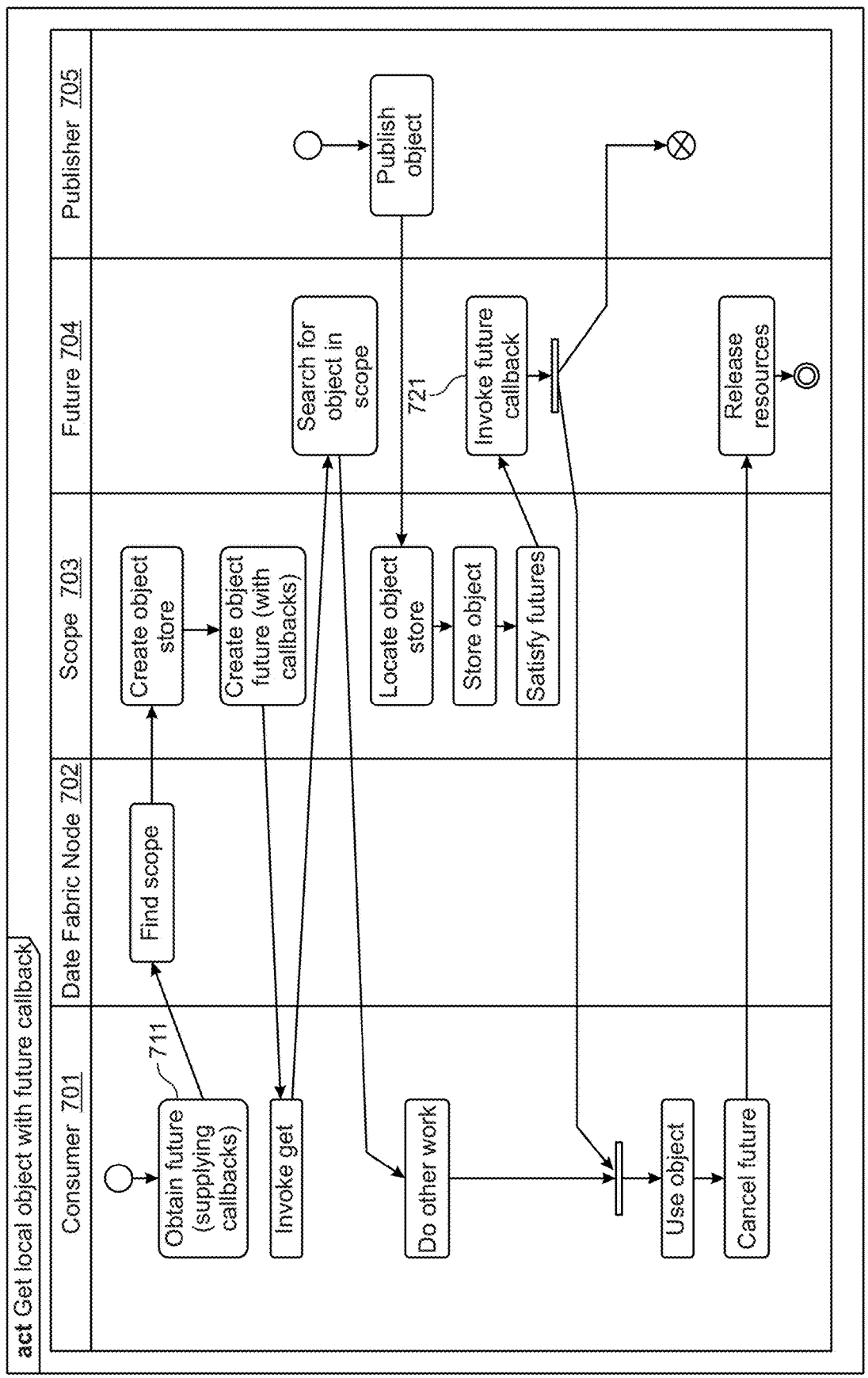
FIG. 7 is a swim lane diagram illustrating functionality for an asynchronous get operation within a single Node in accordance to embodiments of the invention.

FIG. 7 is a swim lane diagram illustrating functionality for an asynchronous get operation within a single Node 702 in accordance to embodiments of the invention.

In FIG. 7, if the Consumer 701 does not wish to block execution while waiting for a Future to complete, Consumer 701 can supply a callback (a "Future Callback") when obtaining the Future 704 at 711. If the Object is available when get is called, get will return the Object. If the Object is not available, the Node 702 will invoke the Future Callback at 721 once the Object has been located.

Since only one Distributed Object Future 704 will actually complete successfully, because there is only one path to the original Object, Node 702 will cancel any other Distributed Object Futures once the Object is found.

If the Object cannot be found and replicated in a timely manner (i.e., within the time-frame Consumer 701 has requested for a blocking get operation), the get operation will fail with a timeout error.

If a Consumer wishes to monitor the state of an Object after a get operation on an Object Future has completed successfully, the Consumer supplies an implementation of the Object Monitor abstraction when requesting the Object Future.

Figure 8:
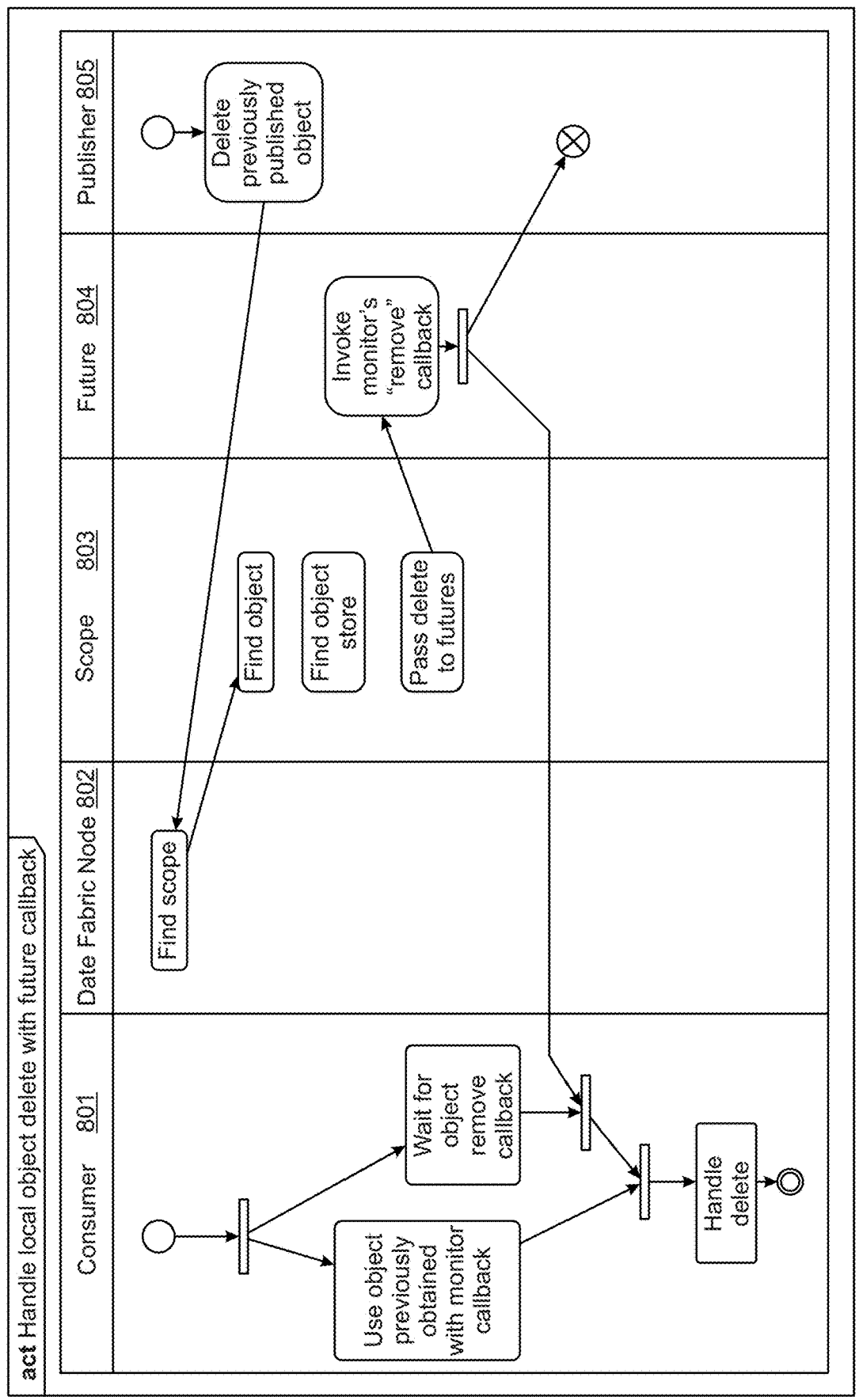
FIG. 8 is a swim lane diagram illustrating functionality of handling a local Object delete Future callback in accordance to embodiments of the invention.

FIG. 8 is a swim lane diagram illustrating functionality of handling a local Object delete Future callback in accordance to embodiments of the invention.

An Object Monitor supplied by a Consumer 801 will be notified if the Object is updated or removed. Canceling an Object Future 804 cancels any requested monitoring as well.

In a scenario where the Object Future 804 relates to a remote Object, the Distributed Object Future(s) created for remote Nodes will request that the remote Node monitors the Object. This triggers the required asynchronous notifications originating in from the remote Node.

If all Object and Object Map Futures for a Scope have been canceled, there is no local interest for that Scope. If there is no local interest in a Scope and the local Node is not the Publishing Node for that Scope, the local Node is free to release any resources for that Scope.

3. Scope Accessing and Monitoring

Figure 9:
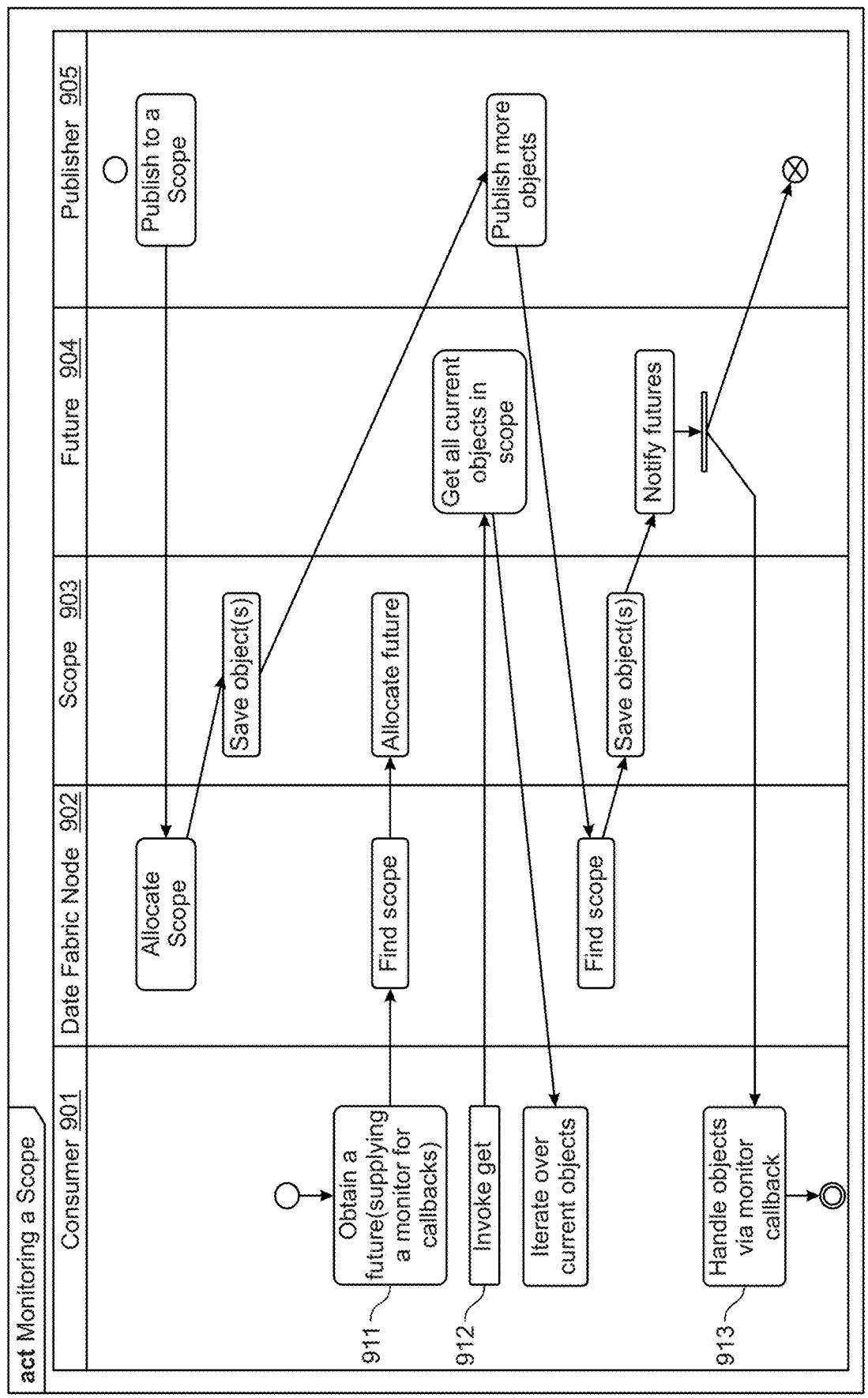
FIG. 9 is a swim lane diagram illustrating functionality of monitoring a Scope in accordance to embodiments of the invention.

FIG. 9 is a swim lane diagram illustrating functionality of monitoring a Scope in accordance to embodiments of the invention.

A Consumer 901 accesses an Object Map by requesting from a data fabric Node 902 an Object Map Future 904, specifying to Node 902 the Object Type and the Scope Identifier. Having obtained Object Map Future 904 at 911, Consumer 901 can execute a get operation on that Future at 912. An Object Map Future always completes successfully because the semantics of a map does not support any concept of completeness with respect to the contents of the map (i.e., a map is complete whether or not it contains any Objects).

Having obtained the Object Map, Consumer 901 can access the contents of the map using iteration or with random access using an Object Identifier.

As in the single Object access use-case, if the Scope Metadata is unknown, Node 902 will create a Scope with Default Scope Metadata. This metadata is a placeholder that will be replaced if and when the metadata from Publisher Node 905 becomes available.

Node 902 will create a Distributed Object Map Future 904 for each connected Node, thus distributing the get operation across the entire data fabric. Any Objects added to the Scope anywhere across the data fabric will be replicated into Consumer Node 90.

If Consumer 901 wishes to monitor the state of an Object Map after a get operation on Object Map Future 904 has completed successfully, Consumer 901 supplies an implementation of the Object Map Monitor abstraction when requesting the Object Map Future. An Object Map Monitor supplied by Consumer 901 at 913 will be notified if Objects are added to the map, removed from the map or updated within the map.

Cancelling an Object Map Future cancels any requested monitoring as well. In embodiments where the Object Future relates to a remote Object, the Distributed Object Future(s) created for remote Nodes will request that the remote Node monitor the Object. This triggers the required asynchronous notifications.

Example Use Case

With embodiments, the use of an anchored life-cycle provides improved resiliency and efficiency derived from the autonomous life-cycle management, as illustrated in the following example use case. Assume there is an large-scale distributed business application that processes queries from client applications in sessions, such that those queries result in tens of thousands of real-time data streams flowing from servers to the client application. For example, a business application that receives a query that then results in streams of real-time stock market data during a session with a client using a web browser.

The by-products of the client session and query analysis are session metadata, query metadata, result metadata and additional metadata regarding the active streams of data and the orchestration required to balance the load of those streams across a cluster of servers. All these types of metadata are expressed in the data fabric as instance of various type of objects. These instances are published into various scopes in a tree-like structure.

For example, the structure might be as follows:
- All sessions have a corresponding instance of session metadata type in a Default Scope;
- All queries expressed by a given session have a corresponding query metadata instance stored in a Scope with an Scope ID matching the session ID and anchored to the session metadata object;
- For each table referenced by the query, there is an query result object that confirms the query result columns describing the contribution of that table to the query result. The query result metadata for each table is stored in a Scope anchored to the query metadata object;
- All rows determined by the query analyzer to be in the query results have a corresponding row metadata instance stored in a Scope with a Scope ID matching the query result metadata ID and anchored to the corresponding query result metadata instance;
- For each unit of content referenced by the row metadata there is metadata expressing a relationship to a cache location for that content as determined by some kind of orchestration. Each of these instances of cache location metadata is stored in a scope with an ID matching the table-specific query result;

Because of the resource cost associated with maintaining real-time data streams, it is important that a solution releases unused resources in a timely manner.

Collectively, the metadata objects needed in this example would number in the hundreds of thousands or potentially millions, depending on the scale of the query. In a conventional known object replication/caching solution, these objects would have to be either persistent, or refreshed periodically to avoid automatically timing out.

If persistence of the objects is implemented, there would be a significant processing burden to either periodically validate the need for all the required objects and then delete them when necessary or to refresh the objects if using a timeout model. This clean-up activity must be implemented by some application-specific logic that understands the relationship and purpose of all the objects involved.

In contrast and in accordance to embodiments, applying an anchored life-cycle model to the metadata results in an directed graph of anchored scopes such that the session metadata is the anchor for a scope of queries, queries are anchors for scopes of query results, query results are the anchors for scopes of stream metadata, and so on.

With embodiments, it is only necessary to refresh the session metadata. As long as the session metadata remains valid, the associated queries and streams will also be valid and active. Once the client session terminates, the session metadata is either explicitly removed or is removed after a timeout period. Once the session metadata is removed, all the dependent anchored metadata will be recursively removed by the data fabric implementation of embodiments. Because each Node understands the structure of the graph (due to the metadata that drives the anchoring), the removal process happens independently and concurrently in each Node of the data fabric. No application-specific business logic is required to effect the appropriate removal of objects.

Therefore, with embodiments of the invention, since the anchored live-cycle is understood throughout the system, there is no need to propagate the remove operations themselves. Instead, each node in the system can independently execute the removal of anchored objects. This results in significant improvements in terms of processor and network resources. Because all parts of the system understand the anchoring relationship, resilience is improved because nodes in the system can operate independently.

Figure 10:
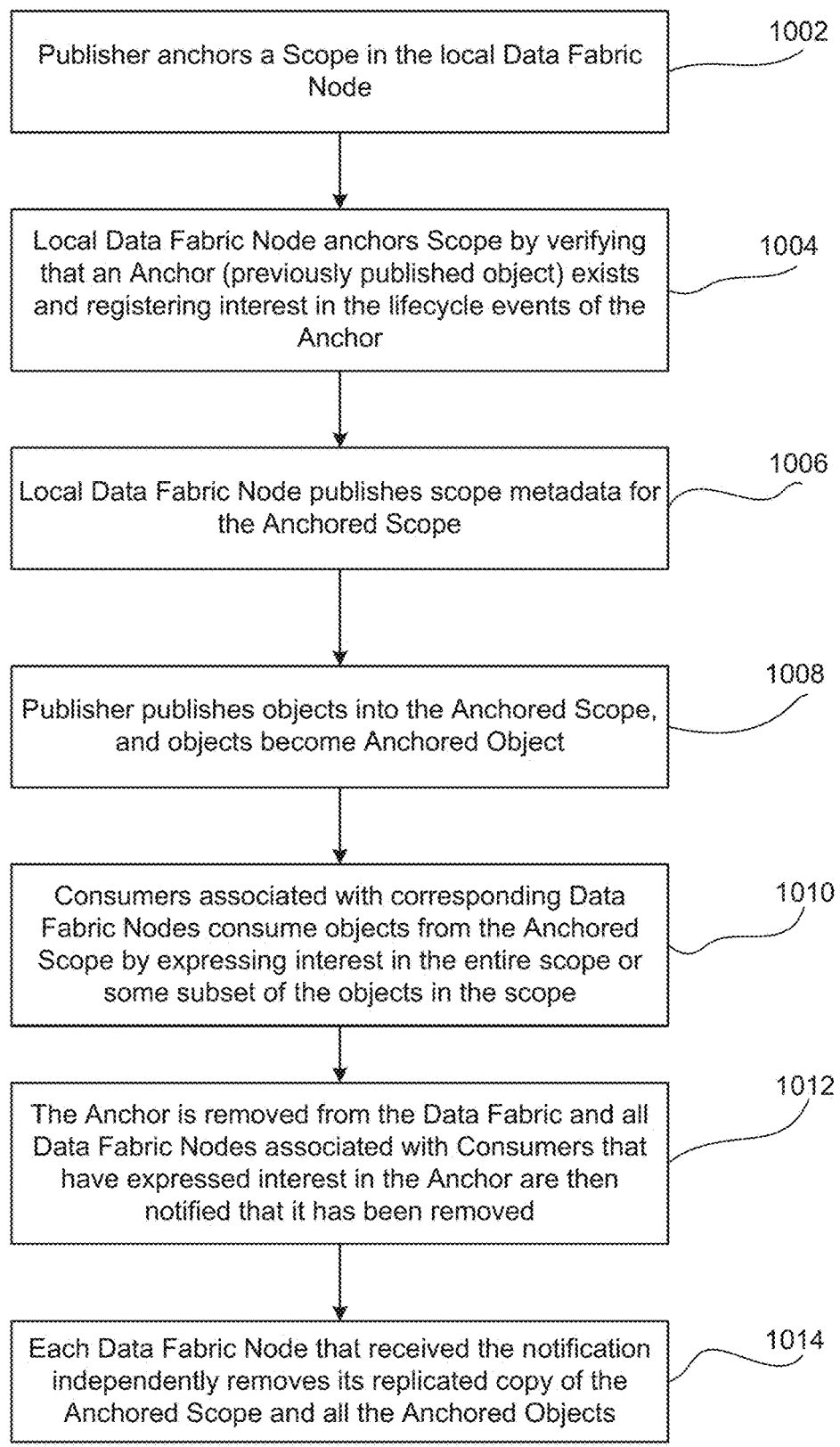
FIG. 10 is a flow diagram of the functionality of the data fabric Node module of FIG. 2 for operating a data fabric with an anchored life-cycle in accordance with one embodiment.

FIG. 10 is a flow diagram of the functionality of data fabric Node module 16 of FIG. 2 for operating a data fabric with an anchored life-cycle in accordance with one embodiment. In general, anchoring is an action performed on a Scope before publishing into that Scope. Anchoring ties the lifecycle of the Scope to some other arbitrary object, referred to as the "Anchor".

At 1002, a Publisher anchors a Scope (the "Anchored Scope") in the local data fabric Node before publishing any objects to that scope. It does this by designating, as determined by Publisher business logic, some arbitrary object, identified by type, scope and identity, as an "anchor". Anchoring is accomplished by the business logic choosing to anchor some arbitrary scope to a previously published object having itself an arbitrary lifecycle. The newly anchored scope now has an anchored lifecycle so that all objects published into the newly anchored scope have an anchored lifecycle, and are then referred to as "Anchored Objects."

At 1004, the Local data fabric Node that receives the anchor request from the Publisher performs the anchoring by verifying that the Anchor (i.e., a previously published object) exists and registering interest in the lifecycle events of the Anchor such that if the Anchor is removed, the Local data fabric Node will be notified using the Distributed Object Monitor disclosed above. Of necessity, the Anchor is in a scope other than the "Anchored Scope" as it must be a published object that already existed prior to anchoring of the dependent scope and therefore must have been already published somewhere into some other scope for the anchoring to succeed.

At 1006, the Local data fabric Node publishes scope metadata for the Anchored Scope that expresses the relationship between the Anchored Scope and the Anchor. If the specified Anchor does not exist, the attempt at anchoring will fail. The relationship between the Anchored Scope and the Anchor is expressed via a generic expression of dependency (i.e., the Distributed Object Monitor). The data fabric itself is uses the Distributed Object Monitor to keep track of the Anchor. Further, in any and all data fabric Nodes where the Anchored Scope has been replicated due to interest by business logic, that data fabric Node will go through the anchoring procedure by locating the Anchor and establishing a monitor.

At 1008, subsequent to successful anchoring, the Publisher publishes arbitrary Objects into the Anchored Scope as driven by Publisher business logic and may also remove those Objects over time. An object published into an Anchored Scope has, by virtue of being contained in that scope, an anchored lifecycle. An object in an Anchored Scope is therefore an "Anchored Object". An Anchored Scope (and implicitly all the objects contained by that scope) are "anchored" to the Anchor. Further, An Anchor (to which one or more Scopes have been anchored) may itself exist in an Anchored Scope and therefore be an Anchored Object. Therefore, its role as an Anchor is independent of its own lifecycle.

At 1010, an arbitrary number of Consumers associated with arbitrary data fabric Nodes consume objects from the Anchored Scope by expressing interest in the entire scope or some subset of the objects in the scope. Regardless of the degree of interest in the Anchored Scope, any data fabric Node where objects from the Anchored Scope are consumed, having determined from the scope metadata that the scope is anchored, also expresses interest in the lifecycle events of Anchor.

At 1012, subsequently, if and when the Anchor is removed from the data fabric, all data fabric Nodes associated with Consumers that have expressed interest in the Anchor are then notified that it has been removed through the use of the Distributed Object Monitor that is in place due to the anchoring.

At 1014, each data fabric Node that received such notification will independently remove its replicated copy of the Anchored Scope and all the Anchored Objects therein, notifying any Consumer of those Anchored Objects that they have been removed.

More than one scope may be anchored to an "anchor". Further, the object to which a scope is anchored may incidentally also be anchored, but only if the scope into which it was published was itself anchored to yet another arbitrary object, and so on.

In embodiments, in the context of anchoring, there are generally at least two different Publishers: a Publisher that publishes an object that arbitrarily may become an anchor, and some other Publisher(s) that anchors a Scope to that object, thus making the object an Anchor. The former is not really involved in anchoring per se.

As an example of the functionality of FIG. 10, and other embodiments, assume there is some business logic that handles session requests. This logic accepts session requests from remote client applications and validates them (e.g., via authentication). Once a session is validated, the session handler, acting as a Publisher, publishes a corresponding session-metadata object to a scope with a time-limited lifecycle (i.e., not anchored). Those session-metadata objects must be refreshed periodically or they will be removed from the data fabric due to a timeout. The session handler ensures that the session-metadata is kept "refreshed" and alive while the remote client session is known to be active.

Subsequently, a client having an active session issues a query in some manner, such that it can be received and interpreted by other business logic that performs query validation. Having validated a query, the query handler, acting as a Publisher, and distinct from the session handling publisher logic, anchors a new scope to the session-metadata corresponding to the session originating the query. Based on its analysis of the query, the query handler publishes into the newly anchored scope an instance of query-metadata. Thus, for each session (session-metadata) there is a distinct scope containing all the query-metadata for any and all queries associated with the session instance.

If the session goes away, either explicitly, such as what would happen in a logout action, or implicitly due a timeout, then the session metadata is removed from the data fabric. Once the session metadata is removed, the anchored query-metadata scope, and all the query-metadata therein, is also removed by virtue of being anchored to the session-metadata In this example, the session handler is a Publisher that publishes session-metadata instances. The query handler anchors the query-metadata scope to a session-metadata instance. That scope is now explicitly an Anchored Scope and the session-metadata is now implicitly an "Anchor". The query handler is a Publisher. It publishes query-metadata objects into the Anchored Scope. All of those query-metadata objects are implicitly Anchored Objects because they are contained in an Anchored Scope.

The session handler knows nothing of the query-metadata scope or query-metadata or the fact that anything has been anchored to the session-metadata(s) it creates. Therefore, while it is a Publisher of objects that will be used as anchors, it knows nothing of anchoring in embodiments.

Known solutions that offer persistence and/or "refresh" style lifecycle models include key-value store solutions. However, these known solutions generally require that the Objects must either be explicitly removed or they must be explicitly refreshed to keep them alive and in cache.

In contrast, embodiments of the invention provided an "anchored" life-cycle model that allows distributed and autonomous lifecycle management that is more efficient from a resource perspective as well as being easier to use from an application development perspective. Embodiments provide for collection of objects (i.e., a scope) to be anchored to another object, so when an object is deleted, everything anchored to that object is also deleted, including other collections of objects. With embodiments, when a session times out in a business logic embodiment, the session object is removed due to the timeout while anchored objects are removed due to the corresponding anchor removal, even though session metadata is kept alive during the session. All nodes in the system have knowledge of the anchored lifecycle. Futures are established that include a callback. Further, embodiments allow the anchoring to monitor when an object or Scope is deleted.

Data Integration And Distribution Platform

Embodiments are directed to a platform for client-driven (non-push and push or any other "orchestration target") access to real-time data with low-latency. Because it is client-driven, there is predictable resource consumption compared to conventional push distribution. Because client-driven push is inherently "batch oriented", network encoding is relatively more efficient that low latency asynchronous push distribution techniques. Embodiments provide practicality, resource control, developer productivity and, due to sharding, low-latency.

Resilient auto-scaling of resources are needed for the materialization and delivery of both raw and augmented content. Embodiments provide dynamic fine-grained resource allocation/deallocation for raw and computed content using stream-based orchestration. Stream-based orchestration and management provides:

Optimal resource efficiency in terms of cache resource management;

Tuning for latency by adjusting the CPU and I/O consumption across multiple client-to-infrastructure connections; and Increased resilience by reducing or eliminating single points of failure.

Embodiments provide on demand scalable computations and other forms of content augmentation such as joins by means of:

on-demand materialization of content from external systems (such as financial exchanges or other such data sources);

a computation framework supporting on-demand construction of query-driven content, combined with on-demand materialization of raw content;

auto-scaling, both up and down, of the resources required (memory, CPU and I/O) to deliver both raw and augmented content to client applications.

Multi-protocol distribution (i.e., in a unified platform with fined-grained orchestration and resource management for accessing and sharing content and computation resources among applications using a plurality of distribution protocols delivers resource efficiency (consistent cache management) and shared computations.

Distributed multi-phase query resolution combined with demand-driven content materialization and filtering optimizes resource consumption as disclosed. Embodiments provide resilient scalable in-line business logic for real-time computation and resource efficiency by reducing a need for data distribution to and from stand-alone business logic.

Embodiments provide one or more of the following features: Decentralized view construction; Content metadata for non-prescriptive, loosely structured data modeling and query resolution; Demand-driven synthetic content; Dynamic synthetic types abstraction for orchestration efficiency; Cooperative decentralized query resolution for demand-driven content integration; Function libraries as tables/types for extensible, resilient, demand-driven and scalable computations; Field-level access control; Client-side row construction for decentralized joins; Query syntax separated from query state and processing mechanisms; Multi-target, multi-phase orchestration for scalable and resilient construction of rich content; Transparent sharding for low-latency, throughput, scaling and resilience; Efficient refresh for non-push real-time; Stream-based orchestration for fine-grained resource control, scaling and resilience; Demand-driven ingest framework for resource efficiency; Separation of query and distribution for a unified content distribution architecture; Topics as a Join; Mapping topics to a table; Content relocation for resource scaling, performance and resilience; and Distributed shared state for scaling and resilience.

The architecture in embodiments relies on micro-service resilience and cooperation via the Data Fabric. Micro-services are logical components within the architecture that perform specific business functions. All such micro-services use the Data Fabric to receive and/or record the state of various types of transactions in the form of serialized objects stored in the Data Fabric.

Figure 11:
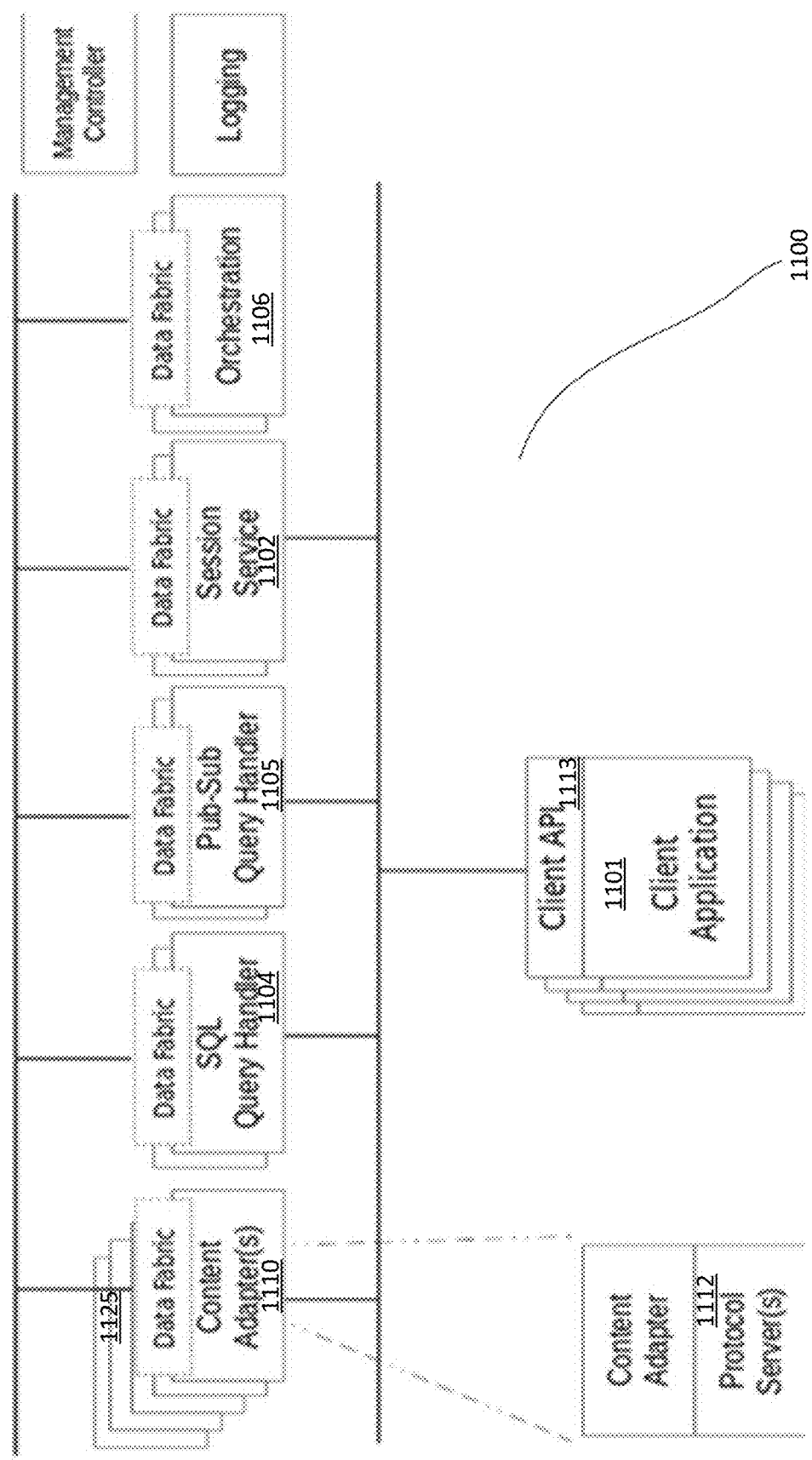
FIG. 11 is a block diagram of the data fabric node architecture, including the data fabric, in accordance to embodiments.

FIG. 11 is a block diagram of the data fabric node architecture 1100, including the data fabric 1125, in accordance to embodiments.

A Session Service 1102 is responsible for authentication and management of Client Application 1101 sessions. It also makes available to the Client Application 1101 various types of metadata and other descriptive information that allow the Client Application to route queries to the appropriate Query Handler 1104, 1105.

An SQL Query Handler 1104 is responsible for syntactic analysis of queries used by Client Applications and represented in a Standard Query Language ("SQL").

A Pub-Sub Query Handler 1105 is responsible for the analysis of topic names used by Client Applications implemented with a "publish-subscribe" type API.

An Orchestration service 1106 is responsible for applying policies to query results to determine how content is allocated across the various available Content Adapters 1110.

A Content Adapter 1110 is responsible for obtaining the content assigned to it by the Orchestration service 1106.

A Protocol Server 1112 is associated with one or more Content Adapter instances and is responsible for managing the interaction over a network with a Client Application. The network protocol is usually, but not always, encapsulated on the client side by a Client API 1113.

A Client API 1113 is an encapsulation of one or more protocols used to communicated with the Session Service, Query Handler(s) and Protocol Servers. A Client Application represents business logic that needs the services (data, etc.) provided by the system.

Figure 12:
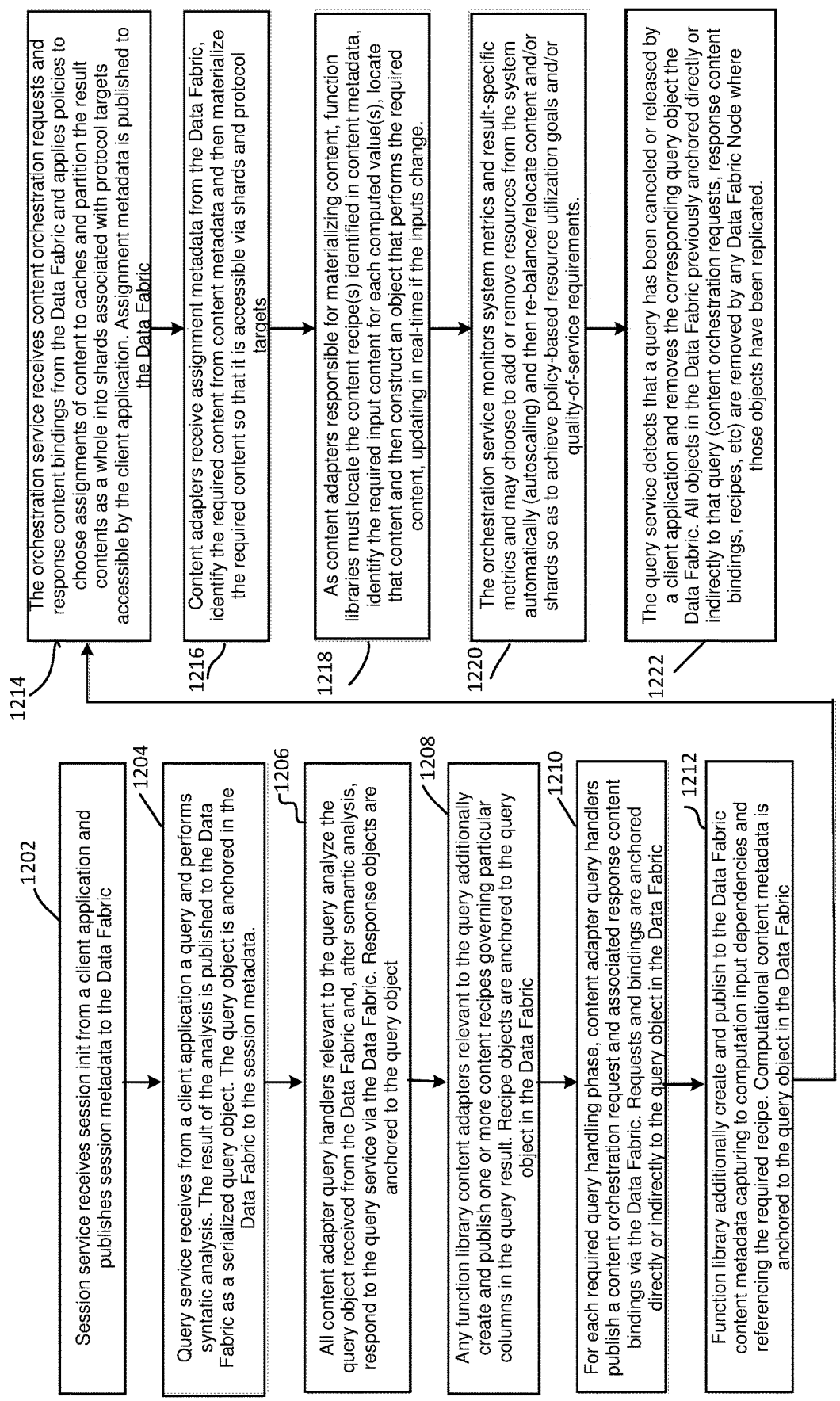
FIG. 12 is a flow diagram of the functionality of data fabric node module of FIG. 2 for operating a data fabric in accordance to embodiments.

FIG. 12 is a flow diagram of the functionality of data fabric node module 16 of FIG. 2 for operating a data fabric in accordance to embodiments.

At 1202, session service 1102 receives session initiation from a client application 1101 and publishes session objects/metadata to the Data Fabric 1125 (comprised of a plurality of data fabric nodes).

At 1204, the query service (e.g., query handlers 1104, 1105) receives from a client application a query and performs syntactic analysis. The result of the analysis is published to the Data Fabric 1125 as a serialized query object/metadata. The query object is anchored in the Data Fabric to the session metadata.

At 1206, all content adapter query handlers 1204, 1205 relevant to the query analyze the query object received from the Data Fabric and, after semantic analysis, respond to the query service via the Data Fabric. Response objects are anchored to the query object.

At 1208, any function library content adapters relevant to the query additionally create and publish one or more content objects/metadata governing particular columns in the query result. Content metadata is anchored to the query object in the Data Fabric. When the content metadata the content metadata is created by a standard library, storing an identity for externally sourced content in the content metadata. When the content metadata is created by a function library, a content recipe is created having an identifier and the identifier is stored in the content metadata.

At 1210, for each required query handling phase, content adapter query handlers publish a content orchestration request describing columns in the result and describing rows in the result with associated response content bindings via the Data Fabric. Requests and bindings are anchored directly or indirectly to the query object in the Data Fabric.

At 1212, the function library additionally creates and publishes to the Data Fabric content metadata capturing to computation input dependencies and referencing the required recipe. Computational content metadata is anchored to the query object in the Data Fabric.

At 1214, the orchestration service receives content orchestration requests and response content bindings from the Data Fabric and applies policies to choose assignments of content to caches and partition the result contents as a whole into shards associated with protocol targets accessible by the client application. Assignment metadata is published to the Data Fabric.

At 1216, content adapters receive assignment metadata from the Data Fabric, identify the required content from content metadata and then materialize the required content so that it is accessible via shards and protocol targets.

At 1218, as content adapters responsible for materializing content, function libraries must locate the content recipe(s) identified in content metadata, identify the required input content for each computed value(s), locate that content and then construct an object that performs the required content, updating in real-time if the inputs change.

At 1220, the orchestration service monitors system metrics and result-specific metrics and may choose to add or remove resources from the system automatically (autoscaling) and then re-balance/relocate content and/or shards so as to achieve policy-based resource utilization goals and/or quality-of-service requirements.

At 1222, the query service detects that a query has been canceled or released by a client application and removes the corresponding query object the Data Fabric. All objects in the Data Fabric previously anchored directly or indirectly to that query (content orchestration requests, response content bindings, recipes, etc.) are removed by any Data Fabric Node where those objects have been replicated.

Singleton Negotiation Via the Data Fabric with Anchored Life-Cycle

In some cases, there needs to be a system-wide singleton for some particular business logic or role. Depending on the system deployment configuration, there will typically be more than one candidate for the singleton role although only one can be active in the particular role. Therefore, the various candidates need to negotiate among themselves regarding which instance will assume that role. Once the singleton has been determined, the other candidates assume a standby role. In the event the singleton fails in some way or is removed from the system, the standby instances will renegotiate the singleton role:

- The negotiation happens via the data fabric.
- A candidate is represented by a serialized state object.
- All the candidates for a given type of singleton use a well-known scope to perform the negotiation by putting objects into this scope.
- Singleton objects have a timed life-cycle. This means that the owner of the singleton must keep it alive by refreshing or "touching" it periodically, This activity updates the timestamp recorded in the Data Fabric. The time value expires, the data fabric will automatically remove the singleton object.
- The various potential candidates for the singleton role are notified that the object has been removed thus triggering a new round of negotiation for the singleton role.

At start-up, the typical micro-service implementation reads from the data fabric to determine the current state of the system and use this state to initialize its own state and operations. Most micro-services in the architecture anticipate redundancy and the need for a singleton. If the micro-service design requires a singleton, this role is also negotiated at startup via the Data Fabric as described previously.

All micro-services use a hybrid synchronous/asynchronous pattern where at start-up the current state is read from the data fabric using a synchronous pattern. Any subsequent state mutations are conveyed by the Data Fabric to the micro-service logic via event callback. The use of the data fabric and an event-driven state replication pattern enables the efficient implementation of large-scale distributed algorithms without direct coupling between dependent services.

The other important design characteristic imparted by the use of the data fabric is location independence and state decoupling. Because micro-services communicate with each other via shared state, they do not care about the location of their peers or various interdependent services.

This enables location transparency which is a key factor in seamless resilience and other capabilities such as auto-scaling. Each service declares its own state by publishing to the data fabric. The life-cycle, state and location of any dependent services is transparent to the publisher.

Where location-specific metadata about a micro-service is required for some reason, e.g. to convey host/port connectivity, the micro-service publishes that information as part of its state representation stored in the data fabric.

The architecture in embodiments represents different data sources as tables. Each type of table has an associated description in the form of metadata. The description includes the schema name, the table name, possibly the name of the key for that table and other such information. Each table description also has a globally unique identifier.

The abstraction within the architecture response for content represented by a particular table is called a "content adapter". For any given table type, there will be one or more instances of content adapter active in a system deployment. The implementation and behavior of a content adapter varies depending on the type of data it manages. Each instance of a content adapter has its own metadata instance description that provides a globally unique ID for the instance and also references the globally unique ID for the table metadata supported by the particular instance.

A content adapter can support almost any type of data, including real-time market data, news, historical time-series, IoT sensor data, conventional structured relational data etc. Data can also be sourced in many different ways, including proprietary network protocols, from flat files, external databases, external REST APIs, etc.

A key activity of a content adapter is to participate in query handling. The architecture implements a decentralized query handling mechanism. Syntax analysis, where required, can be handled independently of the table(s) targeted by a query. Semantics-aware validation however, requires content knowledge and is handled by a component associated with the content adapter It is not necessary for more than one adapter associated with a particular table to respond to any given query. In fact, it is desirable to only have one respond as doing otherwise is a waste of computing resources. To this end, adapter instances engage in a singleton negotiation during initialization. The resolved singleton is responsible for the ContentTableMetadata for the adapter type and will construct the metadata if necessary. ContentTableMetadata uses a timed lifecycle and must be refreshed within the data fabric. This activity is the responsibility of the elected singleton. The time interval for the ContentTableMetadata typically exceeds that of the serialized singleton object. This ensures that, in the event of a failure of the active singleton, a standby has time to assume the singleton role and accept responsibility for keeping the current table/content metadata alive before Data Fabric removes the table metadata due to a timeout.

The Content Adapter

The singleton is also responsible for handling table-specific queries. Query handling responsibilities for the adapter include column validation and determining the rows to be included in a query result. This responsibility for query rows does not imply that the singleton will be the source of all the relevant content. The assignment of content to one or more adapter instances is handling by the "orchestration" micro-service.

Lastly, the singleton, as the "owner" of a "ContentTableMetadata" associated with the table, as disclosed below, is also responsible for constructing and managing descriptions of content (instances of "ContentMetadata").

ContentMetadata is a description of a particular unit of content and comprises a globally unique content ID, a reference to the table (via the globally unique tableID) and an arbitrary collection of named properties. The scope and nature of the properties is specific to a particular type of adapter and comprises an agreement between the query handling and content retrieval components of an adapter. A key aspect of the architecture is that the content data description (properties) is arbitrary. There are no system-wide assumptions about this description other than the existence of the content ID and the table ID.

The lifecycle of ContentMetadata within the Data Fabric is typically tied, via anchoring, to that of the associated ContentTableMetadata. As long as the table metadata is maintained and kept alive with the Data Fabric, all the related ContentMetadata will also be kept alive.

Note that for certain types of content, the associated ContentMetadata is specific to a query. In this case the ContentMetadata is tied to the query rather than the table.

Client applications 1101 connect to the system via network connections, typically but not necessarily encapsulated by a client-side API 1113. Initial connections are to the Session Service 1102.

The Session Service 1102 is responsible for authenticating applications. For each authenticated application, the Session Service publishes to the Data Fabric an instance of SessionMetadata.

Once a session has been established for a Client Application 1101, the application can make one or more queries so as to access data made available by Content Adapters 1110.

The architecture decouples the query processing from query language syntax, where that exists. If a client application request is expressed in a query language, such as SQL, the request is handled by the architecture using a language-specific syntax analyzer (e.g., with SQL an instance of SQLAnalyzer) but thereafter the query is represented in a serialized object form that can be published into the Data Fabric.

All queries are represented in the Data Fabric by an instance of StatementMetadata, published to the Data Fabric by the query analyzer into a scope anchored to Session Metadata associated with the client.

The architecture supports different types of queries and query language syntax. Therefore there may be more than one type of syntax analyzer. The Session Service provides a client-side API driver with a catalog of various analyzers (and their locations/access points) during session setup. The catalog updates as needed. Awareness of this catalog and the connection endpoints for query analyzers allows a client-side API driver to route a query to the appropriate syntax analyzer.

Micro-services of the architecture that consume the instances of DistributedQueryRequest that result from query analysis are not concerned with the origin of the object in terms of query language or where it came from (or even the existence of a query at all). In fact there are scenarios where query objects are constructed ad hoc without any initialize representation as query syntax. Likewise, the various query analyzers are not concerned with how or where the query object is interpreted.

While a query analyzer is not concerned with how or where a query is processed, it may need to assemble a response and will need to process any errors encountered during handling and convey the result, or errors, to the client application via the client-side API driver.

The required responses come in the form of DistributedQueryResponse objects, published into the Data Fabric by the relevant Content Adapter query handling components as serialized objects in a scope anchored to the original DistributedQueryRequest. Each singleton query handler associated with each table referenced by a query will produce its own DistributedQueryResponse.

The query handler functionality of the relevant content adapter(s) will validate requested columns and also determine what content is required from the underlying table.

Query handlers tie content to query results by creating instances of ResponseContentBinding that associate content rows with the query result. The binding represents an association between a row identifier and a content identifier. Recall that the content identifier uniquely identifies and instance of ContentMetadata. These bindings are anchored to an instance of ContentOrchestrationRequest. The purpose of the ContentOrchestrationRequest is to define the type of orchestration required for those bindings. The ContentOrchestrationRequest is serialized into the Data Fabric, along with all the associated binding. The orchestration micro-service detects instances of ContentOrchestrationRequest along with the associated instances of ResponseContentBinding and determines where that content request is best serviced. This process is referred to as "stream-based orchestration."

Simple queries only require one "phase" comprising ContentOrchestrationRequests associated with one or more tables (as needed by the query). Complex queries may involve multiple phases, each phase being represented by a corresponding ContentOrchestrationRequest from each of the tables relevant to the query. When multiple phases are required the results of earlier phases act as inputs to later phases. For example a query with some type of constraint has an earlier phase that reduces the number of rows delivered to a client application in the final phase.

The relationships between a statement or query, in the form of StatementMetadata, the corresponding DistributedQueryRequest, the resulting ContentOrchestrationRequest instances and their associated ResponseContentBinding instances are such that given a particular combination of session identifier and statement identifier, any component in the architecture can find within the Data Fabric the entire state of that query, its analysis and the corresponding content identifiers.

This well-defined relationship of objects within the data fabric enables distributed query handling within the architecture as well as the query-independent orchestration capability. The orchestration micro-service monitors all orchestration requests and can determine what needs to be orchestrated and the type of orchestration required.

Content orchestration is the process of monitoring the ResponseContentBindings associated with one or more ContentOrchestrationRequest instances and, by means of the content identifier associated with each binding, in turn binding that content to a specific combination of a Shard, OrchestrationTarget and content adapter instance. A Shard represents a grouping of some subset of the content referenced by the bindings encompassed by a particular ContenOrchestrationRequest. An OrchestrationTarget is abstraction for some kind of distribution mechanism. As previously described, there may be a plurality of Content Adapter instances for any given type of table. There may also be a plurality of OrchestrationTarget instances associated with a particular Content Adapter instance. For example, different network interfaces and/or different protocols are each represented as distinct targets with corresponding instances of OrchestrationTarget published into the Data Fabric.

Orchestration is not concerned with the nature of the request content. It only operates on content identifiers. Orchestration is also not concerned with the relationship between query phases or the types of targets. However, it may need to collect all the orchestration requests for a particular phase so that intra-phase dependencies are resolved correctly.

The interaction between session handlers, queries, query handlers, orchestration and content adapters is all conducted via the data fabric. Therefore the data fabric captures the entire present state of all queries and orchestration.

A key feature of the architecture is that content is not presumed to be presently available somewhere in the deployment. In other words, the assumption is that content may need to fetched from an external system. Fetching of content, if required, is the responsibility of an appropriate content adapter instance. Orchestration is in charge of determining which adapter instance should do the fetching. Orchestration assigns or binds content to an adapter instance and waits for the content to be available. All interactions between query handling, orchestration and adapter instances is conducted via the data fabric using serialized objects. The assignment is represented by an instance of AdapterContentBinding. The state of that content is represented by an instance of AdapterContentState.

Subsequent to the initial assignment, orchestration may also choose to move responsibility for a particular unit of content from one adapter instance to another. Movements of this type could be motivated by a need to increase or decrease the overall consumption of resources or to balance existing resource consumption.

In general the goal of the architecture is to reduce resource consumption and therefore to avoid cache duplication. However, duplication is sometimes unavoidable. When moving content from one cache to another, cache duplication is purposeful but temporary.

Orchestration uses policies to determine the most suitable location (adapter instance) for any particular unit of content. Policies can incorporate run-time factors such as CPU, I/O load and memory consumption. Policies may also consider the nature of the content required etc. Policies may therefore vary from one type of content to another. In other words polices can be data-source-specific. An administrator chooses which policy to apply to each type of data source.

Regardless of the policy details, orchestration will choose a content adapter instance for the required content. The content is then bound to that adapter instance. Fetching content from an external system may be relatively time consuming (milliseconds or event seconds) but once the content is available, orchestration will proceed with binding the associated content to a shard associated with a distribution target Content adapter instances are not concerned with why content is required. Their responsibility is to fetch or construct content when directed to do so by orchestration algorithms. In some cases, an adapter may pre-load content or otherwise assertively manage the content life-cycle. This is apparent to the orchestration algorithms via AdapterContentState instances found in the data fabric.

As previously described, an orchestration target is an abstraction representing what needs to be done with content and a particular phase of a query response. A target might implement a distribution protocol of some kind or it could implement some kind of value-added phase of query handling (e.g., aggregation). Orchestration binds content to targets via shards using a ShardContentBinding. These bindings are published to the data fabric and convey "row" identity and content identity.

Any given shard may have 10s, 100s or 1000s of rows or units of content assigned to it. A particular query may result in shards spread out across multiple targets associated with multiple underlying adapter instances.

In each case, the assignment of bindings to shards and shards to targets/adapter instances is policy driven.

An important type of orchestration target are those with responsibility for distributing content to client applications. For each different type of client distribution protocol there is a corresponding type of orchestration target and an associated shard implementation.

Client distribution typically involves some kind of network protocol and resources such as network interfaces and socket ports. The details of these resources vary from one implementation of orchestration target to another. The granularity of a target and its associated resources are such that orchestration policies can make effective use of available resources. For example, different network interfaces on the same host can be assigned as different targets associated with the same underlying content adapter instances. This allows orchestration policies to bind content to shards associated with different network interfaces and supports the reassignment of content from one network interface to another, e.g. for the purposes of latency tuning or network load balancing.

Shards are responsible for managing a set of shard content bindings assigned to a particular orchestration target by an orchestration algorithm. The exact nature of a shard's responsibilities depends on the type of shard. Where a shard implements a distribution protocol, the shard would handle the server-side of a client-server protocol. As such these responsibilities include initialization sequences, protocol message decode/encode etc. Reported metrics for distribution shards may include network statistics in terms of bandwidth consumption, network congestion events etc. Shards are responsible for content access and interaction with access control mechanisms.

Implementation of authorization checks in the shard is an additional consequence of a decentralized and demand-driven content distribution architecture. Some types of content (e.g., market data) have very fine-grained provisioning of content and require access to the content itself before authorization checks can happen. Obviously, centralized authorization checks (e.g., at query handling time) would therefore require centralized data access, violating an important design constraint.

Shards are also responsible for reporting relevant metrics to orchestration so they can be incorporated into orchestration algorithms.

Shards also serve a role in maintaining the client session with respect to avoiding session timeout etc.

Orchestration is not concerned with the details of shard initialization or the interaction between a shard and the distribution protocol. All interactions between shards and orchestration are done via serialized objects published and updated via the data fabric.

The partitioning of a result set across multiple shards enables parallel processing. This parallelism can reduce latency, improve throughput and provides increases resiliency. The benefits in terms of resiliency encompass both adapter instance failure and network interface failure.

As described earlier, orchestration algorithms are policy-based. The combination of client requirements, data type constraints, administrator-defined hard resource constraints, real-time data behavior and consideration of system resources, including CPU usage, network usage and memory usage, leads to a wide variety in the types of policies that can be implemented.

A key characteristic of a policy is the bias for either "deep" or "wide" consumption of resources. For example, a deep policy may choose to fill a shard to its maximum allowed binding count before assigning an additional shard. A wide policy would assign new shards before filling existing shards. These choices have an impact on resource consumption as well as operational metrics such as latency and resilience.

As described previously, orchestration targets and their associated shards may implement a distribution protocol. One type of client distribution protocol introduce by this architecture is called "smart refresh". It provides a very efficient mechanism where a client application can, via a local API/driver, maintain (synchronize) a local (client-side) real-time copy of server-side data with very low latency.

Shards that implement the smart refresh protocol use sequence numbers and efficient data encoding to track client-side state with respect to the server-side cache.

When combined with suitable resource allocations and orchestration policies, shards implementing this protocol can maintain client-side data copies with sub-millisecond latency with minimal resource consumption.

Standard Query Language ("SQL") is a an industry standard representation for queries against structured data. Originally designed for use with Relation Database Management Systems ("RDBMS") it since been adopted for other types of data storage solutions.

RDBMS terminology uses the terms such as "schema", "table" and "key". For convenience, the architecture in accordance to embodiments uses the same terms but with a much broader definition. In this architecture a "schema" is just a namespace for table names. And a "table" corresponds to a particular type of data. Any given table may or may not have a primary "key". Likewise, a table may have some well-known formal structure in terms of columns but that is not required by the architecture. The most important point here is that there is no centralized schema at all in embodiments. This means there is no central definition of or dependency on predefined tables, columns or keys.

It is also important to note that the architecture is not dependent on SQL per se and supports other query languages. However, because of widespread industry use, acceptance and training of the user community, SQL is useful as mechanism to express application content requirements The Use-Cases provide examples of SQL queries as used within this architecture.

All query related resources are allocated on the basis of serialized objects obtained from the data fabric. These objects are all in scopes that are either directly or indirectly anchored to a query. So query release is simply a matter of removing the query object from the data fabric. By virtue of the hierarchical use of the anchored life-cycle, this single remove event will be propagated by the data fabric throughout the system. Each data fabric node will independently remove the query object and any scopes that are anchored to the query. This removal action will cascade through all directly and indirectly anchored objects.

The session life-cycle is not tied to client connections per se but rather to the maintenance in the data fabric of the session metadata. This means the session life-cycle is not tied to some arbitrary physical connection but rather to activity by the client over any one of a number of possible protocol connections. For example, data connections such as those used for distribution protocol shards will keep a session alive as long as the client maintains the shard This decoupling improves overall resilience by not requiring a client to maintain an active connection to a session micro-service. So in the event of session service fail-over, client sessions may remain active.

Session release can be explicit, e.g. if a client specifically terminates a session, or implicit, e.g. if a client discontinues all activity and connections and the client session metadata is subject to a timeout removal by the data fabric. All queries are anchored to the session so the removal of the session for either reason causes a cascaded query release via the hierarchical anchored life-cycle relationship After initial orchestration of the bindings associated with an orchestration request, table-specific policies may require that the orchestration micro-service continues to monitor the state of the orchestration with respect to a policy-driven target. For example, a query may require certain latency targets and the observed latency (as recorded via shard metrics) may drift over time due to shifts in real-time update behavior for different units of content. If an orchestration monitoring policy detects a deviation from policy objectives corrective adjustments may be required by adjusting shard assignments and/or relocating content.

Orchestration can also monitor the consumption and availability of CPU and memory resources. There could be a change in CPU, memory, or network resource consumption due to dynamic changes in the underlying data such that content needs to be relocated to satisfy real-time latency requirements. Or there could be failure of a system node or a network interface.

If available resources are insufficient to meet the needs of client application activity with respect to assigned policies, orchestration can initiate the allocation of additional content adapter instances. This dynamic allocation of resources is called "autoscaling". Once new adapters are available, orchestration can apply the appropriate policies to determine what content to move to the new adapters.

Likewise, if orchestration detects a surplus of resources, it may downscale the existing resources by moving content and shutting down adapters.

As previously mentioned, orchestration may decide for various reasons to move a content assignment from one adapter instance to another. The relocation of content requires coordination between orchestration, adapters, shards and client API drivers. Orchestration-initiated relocation is a graceful activity. In the event of resource failure (non-graceful), content is simply reassigned based on available resources.

If content is moved deliberately to adjust resource consumption (perhaps for latency imbalances or if there is new additional resource available) the procedure involves temporarily duplicating the content and then using a protocol "hand-shake" to shift the client driver to use the new content location via a different shard. Once the transfer is complete, the original content can then be released if appropriate.

In the event of a scale-down activity (where system resources are being deliberately removed), all the content from the target adapter instance is moved to other adapters and then orchestration initiates a graceful shutdown procedure.

Because the architecture does not define or require well-defined schema, certain types of queries require more complex handling. This handling can be further complicated because is not required to be cached in the system prior to query analysis activity. If for example, a query requests "all columns", the content adapter may be required to fetch the relevant data in order to determine exactly what columns (fields) are available.

As described previously, a query handler associates content with a query result by creating the appropriate set of response content binding instances and associating those bindings with an orchestration request.

Any query that requires content from more than one content adapter (e.g., a join) is therefore being processed by multiple query handlers (one for each type of table referenced by the query). These handlers will each independently validate relevant columns and determine what content is required from the underlying table.

The "primary" table is the table which determines the rows in the result. "Secondary" tables determine what rows and content are required based on the rows established by the primary or by some other secondary table. They do this by monitoring the data fabric using the well-defined relationships between queries, orchestration requests and response content bindings to determine the bindings that have been produced by the tables on which they depend. Secondary tables in turn produce an orchestration request and associated response content bindings.

Primary and secondary orchestration requests are detected by the orchestration micro-service via the data fabric and acted on accordingly.

As described previously, a join entails content from different tables. Data from different tables is sourced from different adapter instances. These instances have their own orchestration targets and therefore their own shards. In most cases, the client-side API driver connects to these shards and implements a client-side join of the various rows. Without this ability to effect a client-side join, the architecture would have to provide centralized access to the data such that all the data for a given row could be obtained from one place. Views provide the ability for a query to create a new table where the table content is obtained from some other underlying table, or tables. Views provide a way to organize data or to simplify queries. For example a view may encapsulate some type of complex join. Effectively, a view used in this way provides a means to define new content and share that content with other applications. Sharing of content in this manner ensures that all interested applications are looking at a common data set. View creation is a form of declarative data sharing. The view does not contain any data, it's just a window into data available from underlying tables.

Financial market data often requires various dynamically define collections of content. For example, option pricing data is often grouped in "chains" comprising records with various expiration dates and strike prices. The content, or rows, of a chain often varies dynamically over time as new options are defined by market makers. These changes may happen frequently over the course of a single market session. In some ways, chains are like a view where the chain is defining a view of underlying content from the data source. This architecture supports data source-specific behavior such as is required to map external data structures, such as chains, to a standards representation within a table such that it can be queried using various types of standard query languages.

While SQL supports a well-defined function syntax, in practice, function definitions in the relational database world are not as standardized and vary from one vendor to another. There is a lot of flexibility and many vendors add their own useful functions.

This architecture treats functions as if they are defined in tables (i.e., "function tables"). Effectively, a function table is like a library of functions and the table defines the namespace for the library. The architecture supports dynamic loading of function libraries. As with any other table, a function library has its own ContentTableMetadata. Orchestration sees the function library as a table.

Function libraries are loaded by a function library manager. The mechanics of loading details are language-specific (e.g., when implemented with Java, a library is packaged as a jar file).

A function library manager provides a run time "context" in which functions operate and can access various system resources, such as the data fabric. The context also provides access to content from content adapters and/or other libraries.

As previously described, function libraries look like tables. Like other tables they have a role in query validation. While column validation for standard tables is relative straightforward, function library column validation needs to validate not only that the requested functions exist but also validate that the inputs passed to functions are sensible. Function validation therefore requires access to other adapters and related resources from the run-time context.

Functions effectively represent content that is "joined" to other content as a secondary table. For each content row, the function library has to synthesize the content described by the functions that are part of the query. Note that standard (non-function) content can be joined by a secondary query handler simply observing the primary row bindings and mapping that to a corresponding unit of secondary content. In other words, non-function content has a "simple" dependency on primary content. This is true no matter how complicated the join, i.e., the secondary content is never dependent on anything other than the primary, no matter how many tables are joined. Joining of content described by a function, i.e., "synthetic" content, is more complicated because a function may have a dependency on content from more than one table (including the primary table, one or more secondary tables, or even one or more other tables of synthetic content). Content derived from a function having no arguments is joined like standard secondary content, i.e., it only as a dependency on the primary.

As previously described, the architecture treats function libraries as tables. In practice the "content" produced by a function library table is synthesized by a function using content from zero or more other tables. To compute synthetic content, the computation framework must have access to the library (the function algorithm) as well as all of the tables required for the content that comprises the inputs to the functions. The exact nature of the dependencies depends on the details of the query as defined by some client To simplify the orchestration process for the resulting complex content, the combination of a function library and some particular combination of underlying content adapters is described by a "synthetic" table. Each synthetic table has its own ContentTableMetadata and is seen by the orchestration micro-service as just another table with content. For a given query, there may be more than one function that has the same set of inputs. In this case, the synthetic type is the same for each of the resulting columns. Note that synthetic tables are hidden from query parsing logic. This means that queries cannot reference a synthetic table, only the function library is visible to queries.

Content adapter instances supporting a particular synthetic types are created by the function library manager as needed, but only in nodes where the library AND all the required inputs are present. Content orchestration requests originating from function table query handlers reference the appropriate synthetic type and the associated response content bindings are then orchestrated in the same manner as any other content type. Orchestration does not need to analyze the complex dependencies because the function library has already done that during query handling. This means that, just like any other content, synthetic content derived from functions can be distributed across a cluster using the same algorithms and policies used for simple content. And, like other content, computed content can also be moved around the cluster to balance resource consumption, latency, etc., an effect autoscaling, up or down.

Constructing synthetic content involves a having a recipe for a creating the content described by one or more functions expressed in a query. Given a recipe for a given column, the ingredients (function inputs) are the values from other columns in the same row. So a column recipe needs to know the function as well as its inputs in terms of other columns. To construct a specific row (value) for a given column, the recipe also has to know the identity of the corresponding content contributed to a row by other tables on which that synthetic content is dependent. As described earlier, a query with functions implies some set of synthetic types. For each such synthetic type, there will be a single recipe. Each such recipe may be capable of producing one or more columns of data. The resulting recipe is stored in the data fabric and anchored to the query metadata.

As described earlier, ContentMetadata is a description of some unit of required content. Synthetic content is an implicit join, so the ContentMetadata resulting from that join indicates the identity of the column recipe (so it can be retrieved from the data fabric) as well as a mapping of table IDs to content IDs for the input dependencies for the particular row of secondary (synthetic content) described by the content metadata. Synthetic content has no lifecycle outside that of the query. Synthetic content has no identity that can be referenced outside the scope of query.

As described previously, orchestration sees synthetic type tables with a corresponding set of content adapter instances. By definition all required inputs are there available where these adapter instances exist. Orchestration sees orchestration requests associated with these synthetic tables (they look like any other content orchestration request). As with other content, orchestration operates on the response content bindings associated with these requests. However, orchestration can see content dependencies via the content metadata and policies may consider existence/location of input content when orchestrating computed content.

Once orchestration determines the assignment of synthetic content to an appropriate adapter, the adapter detects the binding and can construct the required content by analyzing the content metadata, locating the referenced recipe, extracting from the content metadata the identity (table identifiers and content identifiers) of any required inputs, determining the nature of the fields and the required functions and constructing objects representing those fields such that those function objects can reference inputs and monitor them for updates over time.

The computation framework and resulting synthetic Content Adapters (synthetic content) must handle initialization of content but also updates to content as inputs change:

Update events may originate from external events (ie from content that is an input to a function)

Input updates may or may not result in output events

Input updates may cause recursion through computations—still only one output event (i.e., one input event may cause value changes in multiple fields Pre and post-event notification for content clients to preserve atomicity of events Computation items are content clients and can notify other content clients"

The computation framework supports access control checks. The shard via which content is accessed by a client having identity represented as a "subject" the framework uses for authorization checks. This subject is conveyed to content during row-level initialization by the shard. Function-derived content delegates authorization to function inputs. Therefore authorization checks will cascade through the computation dependency tree (possibly passing through other function content) until some raw content input is found. Raw content from different data sources used as input may have different authorization constraints and may use different authorization mechanisms. For a client to obtain authorization to access content, they must be authorized for all content inputs.

Another form of distribution between a server and a client is server-driven "push" distribution that, based on one or more "subscription" requests from a client-side API driver, delivers initial values and a subsequent stream of data and updates. This type of distribution delivers the lowest possible latency. Optimal push distribution requires algorithms to combine multiple messages into single network buffer while at the same time not introducing arbitrary delays resulting in higher latency. Push distribution necessitates "fanout" where events from a particular unit of content are sent to multiple remote client endpoints. From the perspective of server-side resource consumption, it is optimal that in this scenario that data is only encoded once per event. Note that a query with different fields/columns in the result inherently produces a different data stream (different events, different data) and therefore a different event encoding even though the underlying content is common across the queries. A single "raw" stream may therefore have multiple stream representations depending on how many different queries are access the data with different field sets.

This architecture defines a "ContentStream" abstraction that represents a particular representation of the raw content.

A unit of raw content has a stream of events (the raw stream) that may be access directly by clients but may also pass through filtering logic to produce other derivative ContentStreams A ContentStream has a field list or dictionary A ContentStream can be shared across queries if the dictionaries match across queries The encoding for a shared ContentStream is the same for all endpoints accessing that stream.

A ContentStream may also include computed columns, i.e., columns originating as synthetic content as previously described.

Like any other shard, a Push shard is initiated by orchestration and has content bound to it by orchestration algorithms.

Push shards are tied to a specific query

Push shards have fields/columns that are query-driven

Push shards dynamically push events/data to client endpoints

Push shards need to manage buffers, bandwidth and flow-control over distribution channels to client endpoints (e.g. non-blocking socket operations)

Push shards must implement packing and distribution algorithms to provide the lowest possible latency This architecture implements one possible implementation of push distribution using the industry standard JMS API. JMS topics names are arbitrary strings. Client application subscribe using JMS topics. This architecture supports both "single-stream" and "multi-stream" topics where single-stream topics provide events and data relating to a single unit of content and multi-stream topics provide events and data relating to multiple streams of data. Multi-stream topic events provide messages and metadata that allow an application to different which messages apply to which data stream and also to provide ordering of streams.

JMS topics are identified by names. This architecture maps single stream topic names to content using a "schema.table.key pattern". Conceptually this pattern could be mapped to a SQL as follows: SELECT * FROM schema.table WHERE KEY='key'. Given that a JMS application may use tens of thousands of distinct data streams an implementation with this simple mapping of topic to query would result in tens of thousands of queries. Instead, this architecture represents single-stream topic subscriptions as a join between an artificial "watchlist" table and the target data table. Single stream topic subscriptions result in new entries in the artificial watchlist table. When the subscriptions are dropped the corresponding entry is removed from the watchlist table. So the conceptual query looks more like: SELECT * FROM schema.table INNER JOIN on schema.table.key=MyWatchlist.key. Where "MyWatchlist" is actually a uniquely generated name relating to the session doing the subscriptions.

In this architecture, JMS subscriptions for multi-stream topics follow a naming convention pattern of "schema.table". The implication of this is that a multi-stream topic subscription retrieves an entire table. Note that not all content adapters support a "give me all the rows" functionality such as is implied by this conceptual query. A key use-case for this multi-stream topic pattern is to subscribe to a view. As previously described, a view may contain a variety of raw and augmented content, including joins and synthetic content.

In SQL there are implicit functions, namely all the "operators" such as >, <. +, – etc. This architecture treats this implicit functions as an implicitly defined function library (as previously described). The SQL parsing micro-service implemented in the architecture recognizes these implicit functions and infers the use of the implicit library. This mapping of SQL operators to an implicit function library is transparent to SQL clients. It is also transparent to the previously described orchestration micro-service and computation framework.

A constrained query generates rows based on content values, e.g., select stocks from a chain where trade volume >X million shares. This architecture implements constraints as a multi-phase query. The initial phase yields an orchestration activity that encompasses the entire input domain, in this example a market data chain. The constraint value is by definition a computation with a boolean result and is constructed by the query handler for the implicit library (the constraint is always expressed in terms of the one of the implicit comparison operatorors such as >, <, =etc). Primary table query handler components in the subsequent phase of query processing use the output of the initial phase to access the computed values of the constraint clause and filter the response content bindings such that the various secondary table query handlers can determine the filtered set of rows that match the constraint clause.

Use Cases

The following use cases may be implemented by architecture 1200 accordance to embodiments: (1) Content Adapter Initialization; (2) Simple Query with a JDBC/SQL (with autoscale up/down and rebalancing for latency); (3) Select All Columns with JDBC/SQL; (4) Join Standard Content with JDBC/SQL; (5) Query a Market Data Chain with JDBC/SQL; (6) Select Computations with JDBC/SQL; (7) Subscribe to Simple Content by JMS/Topic; (8) Subscribe to a Table by JMS/Topic; (9) Use an JDBC/SQL Constraint to Filter Rows in Real-time.

Logical View

Content Adapter

Figure 13:
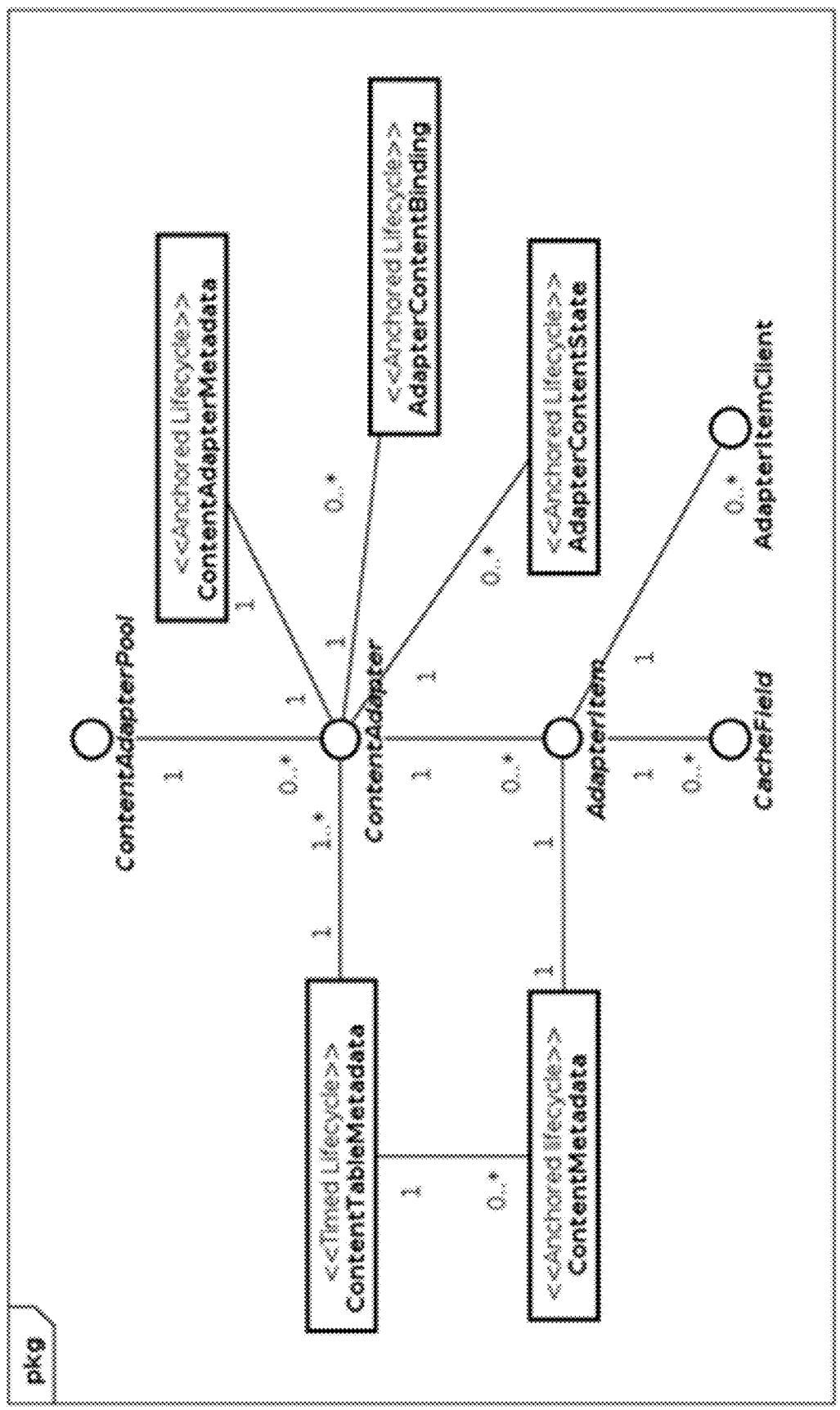
FIG. 13 is a content adapter class diagram of the architecture in accordance to embodiments.

FIG. 13 is a content adapter class diagram of the architecture in accordance to embodiments. ContentTableMetadata describes a particular data type, or table. ContentTableMetadata instances are stored in the Data Fabric within a default scope having a timed lifecycle. A Content Adapter is responsible for keeping the table metadata "alive" in the DataFabric. This responsibility is negotiated among several candidates instances using a singleton/standby pattern as described previously.

A ContentAdapter instance manages a collection of AdapterItem instance. An adapter is associated with a particular type of content as described by an instance of ContentTableMetadata. The set of items cached by a content adapter instance is typically driven by the orchestration process. An adapter monitors a particular scope for instances of AdapterContentBinding and uses these bindings to determine what content should be fetched/created and cached.

A ContentAdapterMetadata is metadata that identifies a particular instance of Content Adapter. It is constructed by the adapter instance and stored in the DataFabric in a scope having the same ID of the as the ContentTableMetadata and anchored to that instance of ContentTableMetadata.

ContentAdapterPool provides other components within a process with a single point of access to zero or more content adapter instances within that process.

ContentMetadata is a description of a particular unit of content. This description has a globally unique ID and comprises arbitrary metadata that describes the required content in the form of name-value pairs. The content of the metadata contained in a ContentMetadata instance is determined by the Content a\Adapter and the associated query handler implementation. The rest of the architecture only depends on the unique ID associated with the ContentMetadata.

ContentMetadata for query-independent content is stored in a scope having the ID of the ContentTableMetadata and anchored to the table metadata instance. Query-specific ContentMetadata is stored in a scope anchored to a ContentOrchestrationRequest.

FieldMetadata describes a CacheField in terms of its name and data type etc

CacheField is the abstraction representing a single field within a ContentAdapterItem. A CacheField has a sequence number that increments as the field value changes. Each CacheField instance is described by an instance of FieldMetadata.

AdapterItem is identified by ContentMetadata and is a collection of CacheField instances. Items provide random and sequential access to fields. They also provide access to the FieldMetadata corresponding to each cached field. An AdapterItem maintains a sequence number tracking updates. An update applied to an item causes the item sequence number to update and that sequence number is applied to any CacheField affected by the update.

AdapterItem instances support the registration of AdapterItemClient instances that want to receive events relating to the item. E.g. when new data is received, when data condition changes or when access control updates necessitate a review of access rights, items notify any registered clients of these changes.

An AdapterItemClient is an abstraction for handling the events generated by an AdapterItem. These include:

IMAGE—indicates that the content is now complete and ready

UPDATE—indicates that one or more fields have updated. The activity increments a sequence number STATUS—indicates that data condition has changed. State values include OK, STALE, and ACCESS_DENIED PERMISSION—indicates that access rights should be re-assessed.

IMAGE, UPDATE and STATUS events all have pre-event indications. The pre-event indications allow recipients to preserve the atomic nature of events. This is especially import where there is synthetic content cascaded from "raw" content.

AdapterContentBinding defines an association between ContentMetadata (via the content ID) and a particular ContentAdapter instance. These bindings are created as a result of orchestration and indicate that a particular ContentAdapter instance should obtain the requested content. Once the content is available the ContentAdapter instance will create a corresponding instance of AdapterContentState. The binding and the state are stored in a DataFabric scope having a UUID of the adapter instance and anchored to the ContentAdapterMetadata associated with the ContentAdapter instance.

AdapterContentState is an indicator of the state of a particular ContentAdapterItem as cached by a particular ContentAdapter instance. Typically, the adapter instance initiates caching of content in response to the detection by the adapter of an AdapterContentBinding instance.

An AdapterManager is an abstraction that provides an operating context for a content adapter. It also is responsible for negotiating the singleton state for the table type it represents SubjectAccessController is an abstraction for checking the read/write access privileges of a Subject with respect to a particular unit of content or fields within a unit of content. A SubjectAccessController is associated with a content adapter. A SubjectAccessController may be shared among several adapters. Different types of ContentAdapter may associated with different implementations of the SubjectAccessController abstraction.

Derived Content Adapter

Figure 14:
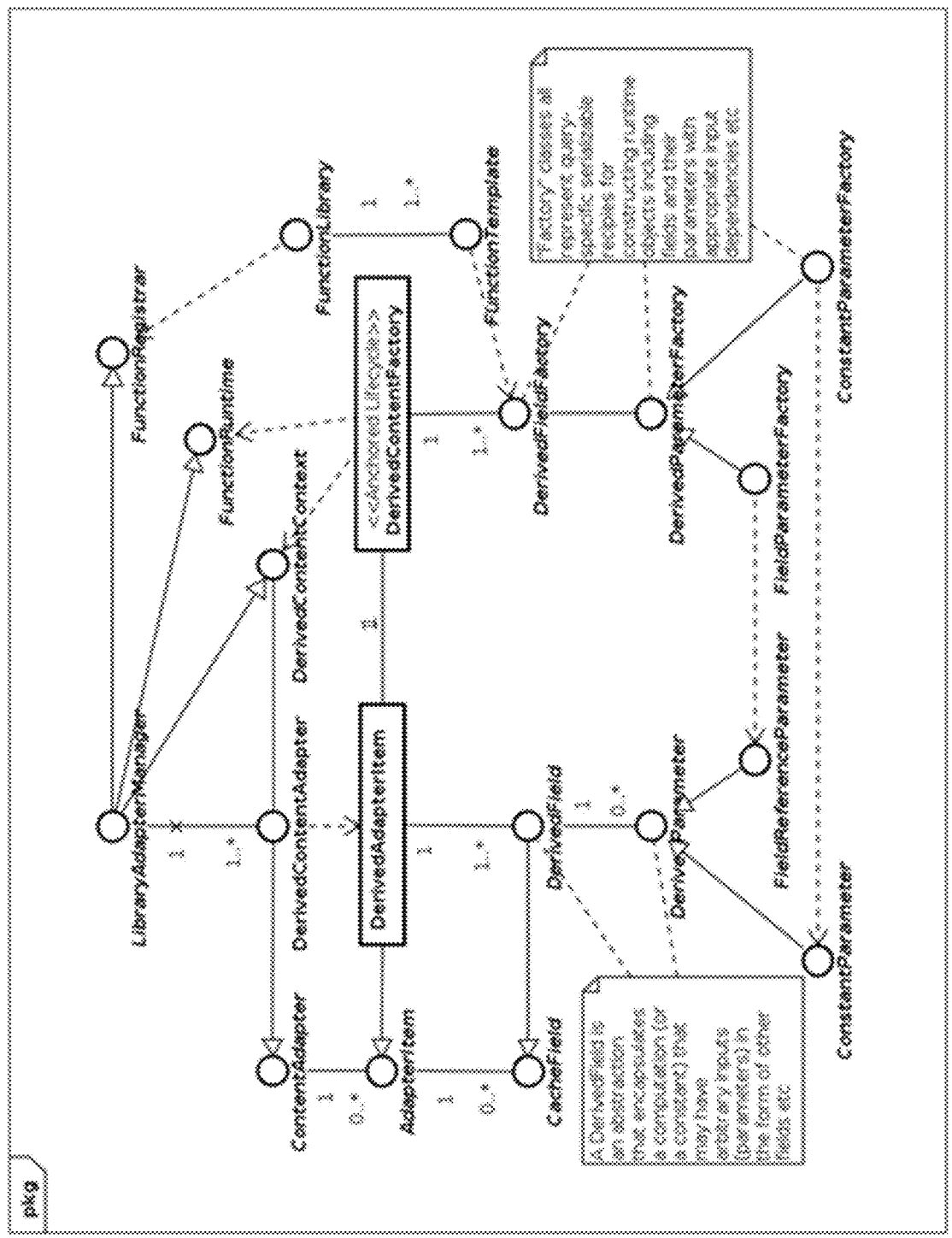
FIG. 14 is a function library adapter class diagram of the architecture in accordance to embodiments.

FIG. 14 is a function library adapter class diagram of the architecture in accordance to embodiments.

A DerivedAdpaterItem is a type of AdapterItem that comprises DerivedCacheField instances. A DerivedCacheField is a specialized implementation of CacheField. A DerivedAdapterItem relies on an instance of ContentMetadata to understand what fields should be produced. ContentMetadata for derived content includes information about how to construct the required content. This information includes:

the identifier of a DerivedContentFactory;
a map of input type IDs and input content IDs The DerivedContentFactory acts like a recipe with knowledge about how to construct each required field. Given the recipe, the map of type and content IDs are the ingredients required to construct a particular instance of content and its constituent fields. The ContentMetadata used by a DerivedContentAdapter is constructed during the query analysis process.

A DerivedContentAdapter is a type of content adapter that creates derived content (rather than fetching raw content). Derived content is computed from raw content and perhaps other derived content. A DerivedContentAdapter manages a collection of DerivedAdapterItem. Like other types of adapter it monitors the DataFabric for AdapterContentBinding instances and produces instances of AdapterContentState.

A DerivedContentFactory is a uniquely identified serializable collection of DerivedFieldFactory and associated DerivedParameterFactory instances, ie a recipe for content. A DerivedContentFactory is specific to a particular queries and applies to all rows in that query corresponding to a particular synthetic type (a synthetic type is a derived type representing a particular function library/table in conjunction with all the input types required by a query).

A ConstantParameter is a DerivedParameter whose value is a constant. Implementations of ConstantParameter include ConstantDoubleParameter, ConstantStringParameter, ConstantBooleanParameter etc.

A ConstantParameterFactory is a specialization of DerivedParameterFactory that creates instances of ConstantParameter. Implementations of ConstantParameter factory include ConstantDoubleParameterFactory, ConstantStringParameterFactory, ConstantBooleanParameterFactory etc.

A DerivedParameter is a parameter passed to a DerivedField and whose value is used in the computation of the field value. A DerivedParameter offers various type conversion mechanisms by which the underling value can have different representations. The field determines the required representation and requests the appropriate type conversion from the parameter.

A DerivedParameterFactory is an abstraction representing the source of DerivedParameter instances.

A FieldParameterFactory is a type of ParameterFactory, a serializable parameter recipe, that produces a parameter whose value is obtained from some input CacheField found in an AdapterItem (either raw or derived).

A FieldReferenceParameter is a DerivedParameter whose value is taken from some other field. The value of a FieldReferenceParameter may change over time. The use of a FieldReferenceParameter in computing a DerivedField value therefore triggers a dependency between the DerivedAadapterItem containing the computed field and the AdapterItem containing the field that is referenced by the parameter.

A DerivedContentFactory is constructed by a SyntheticAdapterContentCoordinator and is known to the DerivedContentJoiner. All ContentMetadata produced by a particular DerivedContentJoiner references the same DerivedContentFactory.

A DerivedCacheField is specialization of the CacheField abstraction and is a constituent of a DerivedAdapterItem. It supports initialization and ongoing maintenance of derived field data.

A DerivedFieldFactory is a serializable object that both describes the "recipe" for a field and, given a DerivedContentContext, a DerivedContentFactory, and a DerivedContentItem as context, can create the required DerivedField along with its input DerivedParameter instances. One or more DerivedFieldFactory instances are serialized within a DerivedContentFactory. Zero or more DerivedParameterFactory instances are serialized within a DerivedFieldFactory.

A FunctionLibrary is a named collection of FunctionTemplate instances. The name of the function library represents a namespace for the functions it contains. FunctionLibrary instances are loaded into the system via a FunctionLibraryManager. A FunctionLibrary looks to the rest of the architecture like a content table and participates accordingly in query validation by implementing the FunctionValidator abstraction.

A FunctionLibraryManager loads one or more FunctionLibrary instances. The role of the manager is to provide an operating context for the registration of libraries and access to other aspects of the runtime environment need for functions to, umm, function.

A FunctionRegistrar is an abstraction whereby FunctionLibrary instances can register themselves. This facilitates the dynamic loading of function libraries.

A FunctionRuntime is abstraction that provides access to runtime resources needed for the construction and maintenance of derived content and derived content fields, e.g. logging, thread pools and content adapter instances.

A FunctionTemplate represents a particular function available within a FunctionLibrary and participates in query analysis to create an instance of DerivedFieldFactory. The analysis process includes analyzing the input parameters expressed in the query, determining the nature of those parameters, and constructing the appropriate implementations of DerivedParameterFactory.

A LibraryAdapterManager is responsible for creating instances of DerivedContentAdapter associated with a particular library (including those for synthetic types)

A synthetic type is a dynamically realized table type that represents the intersection of a particular function library and a specific set of dependencies on other tables, both "standard" and "derived".

Figure 15A:
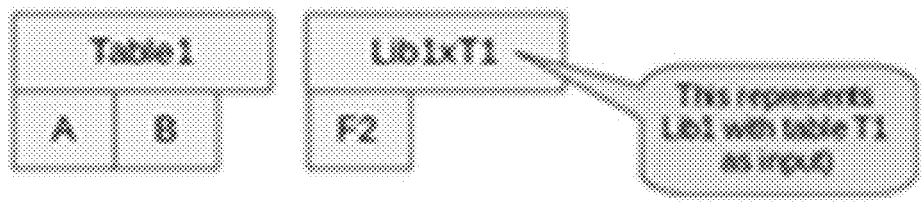
FIG. 15A illustrates a simple synthetic type analysis in accordance to embodiments.

FIG. 15A illustrates a simple synthetic type analysis in accordance to embodiments where a library "Lib1" with a function "F2" is used in a query such that the result of the query depends on a table "Table1" (T1) with columns A and B used by the function F2 to perform a calculation. This query example involves a join between two tables: the primary table T1 and the synthetic table "Lib1xT1".

Figure 15B:
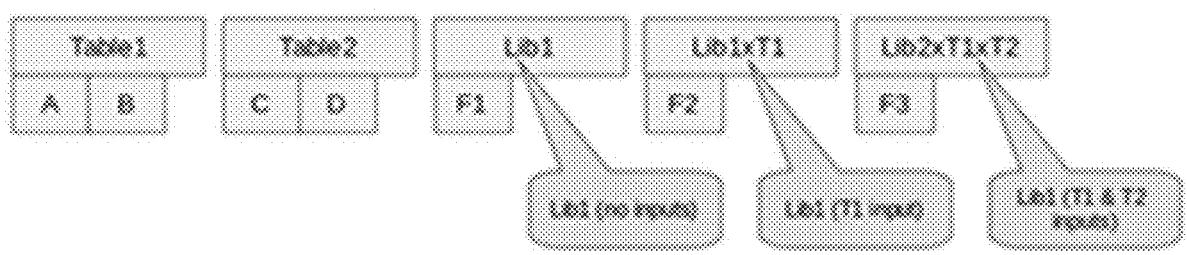
FIG. 15B illustrates a complex synthetic type analysis in accordance to embodiments.

FIG. 15B illustrates a complex synthetic type analysis in accordance to embodiments where a library "Lib1" has a function "F1" with no inputs, a function "F2" with one input from a table "Table1" (T1), and a second library "Lib2" has a function "F3" with inputs from T1 as well as table "Table2". (T2). This query involves a join between 5 tables: the primary table T1, a secondary table T2, a secondary function table Lib1, a secondary synthetic table "Lib1xT1" and a secondary synthetic table "Lib2xT1XT2".

Protocol Server

Figure 16:
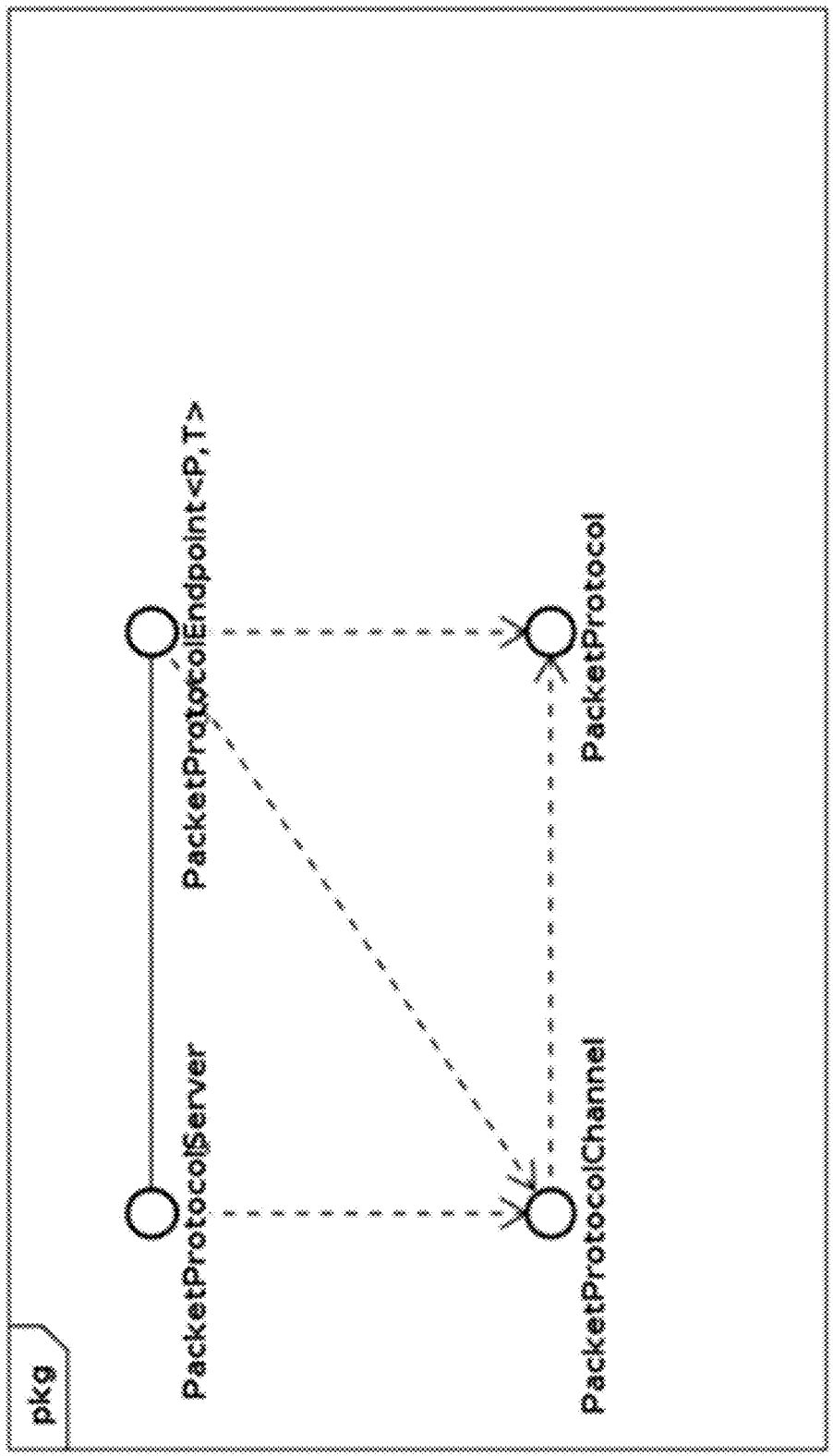
FIG. 16 is a protocol server class diagram in accordance to embodiments.

FIG. 16 is a protocol server class diagram in accordance to embodiments. A PacketProtocol is an abstraction representing a packet/message-oriented protocol. The messages associated with the protocol are encoded/decoded by a PacketProtocol instance. The communication mechanism is encapsulated by the PacketProtocolChannel abstraction.

A PacketProtocolChannel is an abstraction representing a communication channel over which PacketProtocol payloads are transmitted. A PacketProtocolEndpoint is an abstraction for a client or server-side endpoint that uses a PacketProtocol to communicate over some type of PacketProtocolChannel. A PacketProtocolServer is an abstraction for a server that allocates PacketProtocolChannel instances to manage to new PacketProtocol channels.

Orchestration Targets

Figure 17:
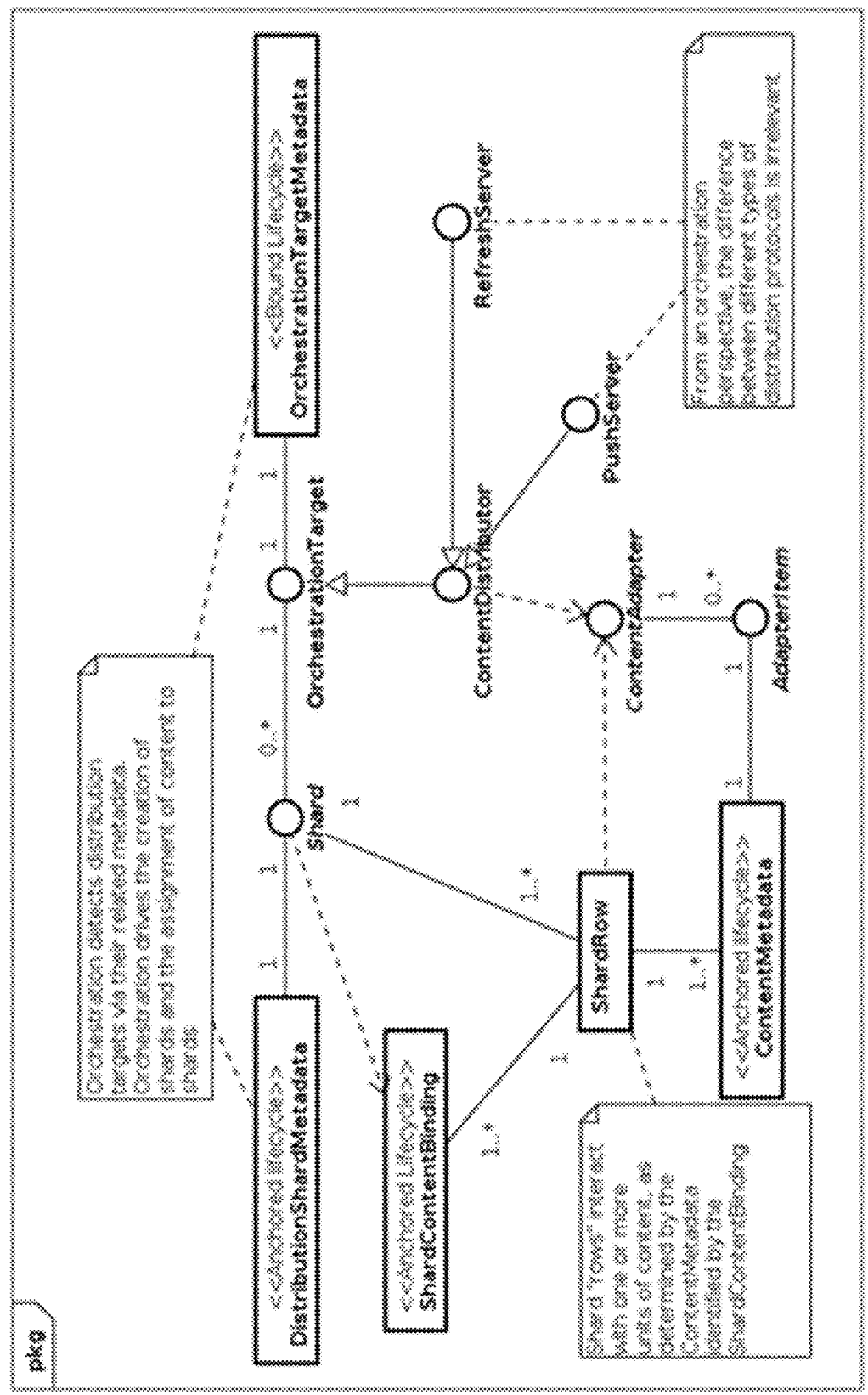
FIG. 17 is an orchestration target class diagram in accordance to embodiments.

FIG. 17 is an orchestration target class diagram in accordance to embodiments. OrchestrationTargetAdapterBinding is metadata representing the binding between a ContentAdapter instance and an OrchestrationTarget. OrchestrationTargetMetadata is metadata representing an OrchestrationTarget instance.

A Shard is a collection of content associated with a given query and assigned to a particular OrchestrationTarget for distribution purposes. ShardContentBinding is metadata representing the binding between content from a particular orchestration request and a Shard.

ShardMetadata is metadata created by the orchestration server describing a shard to be created by and associated with some OrchestrationTarget. Detection of ShardMetadata within a scope having the unique Identifier of the OrchestrationTarget triggers the creation of a corresponding Shards by the OrchestrationTarget. DistributionShardMetadata is description of a Shard created by a client-facing distribution server for a particular distribution protocol containing, in particular, host and port information indicating how a client can connect to the shard.

A Shard creates a ShardRow corresponding to one or more instances ShardContentBinding each having the same row identifier. The ShardRow interacts with one or more instances of AdapterItem corresponding to the ContentMetadata identified in the ShardContentBinding instances.

A ContentDistributor is an abstraction for a type of OrchestrationTarget that communicates with remote client applications via some type of distribution protocol.

Examples of distribution protocols include, but are not limited to, "refresh" and "push" For each type of protocol there is a corresponding implementation of ContentDistributor.

Figure 18:
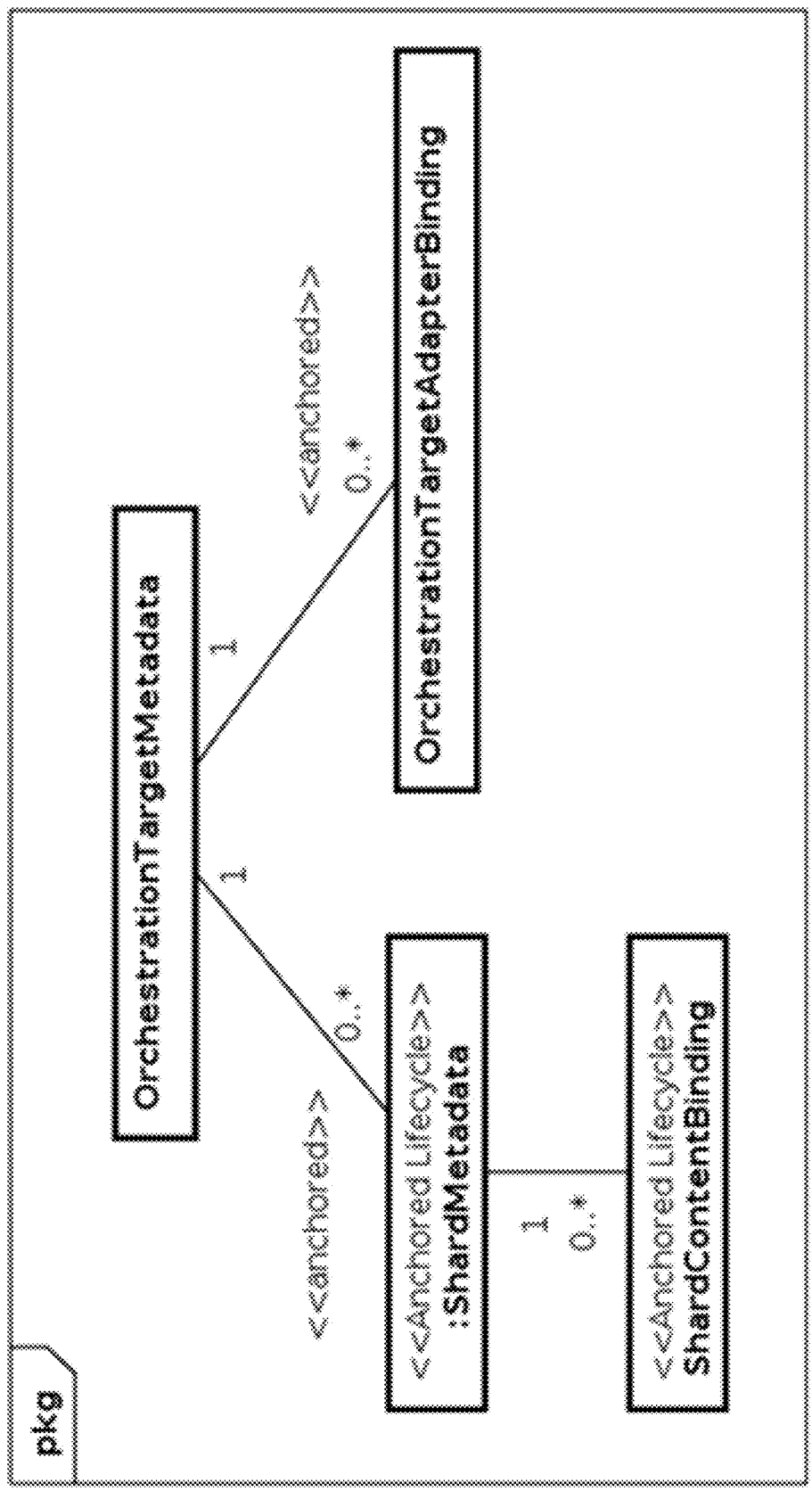
FIG. 18 illustrates orchestration target entity relationships in accordance to embodiments.
Figure 19:
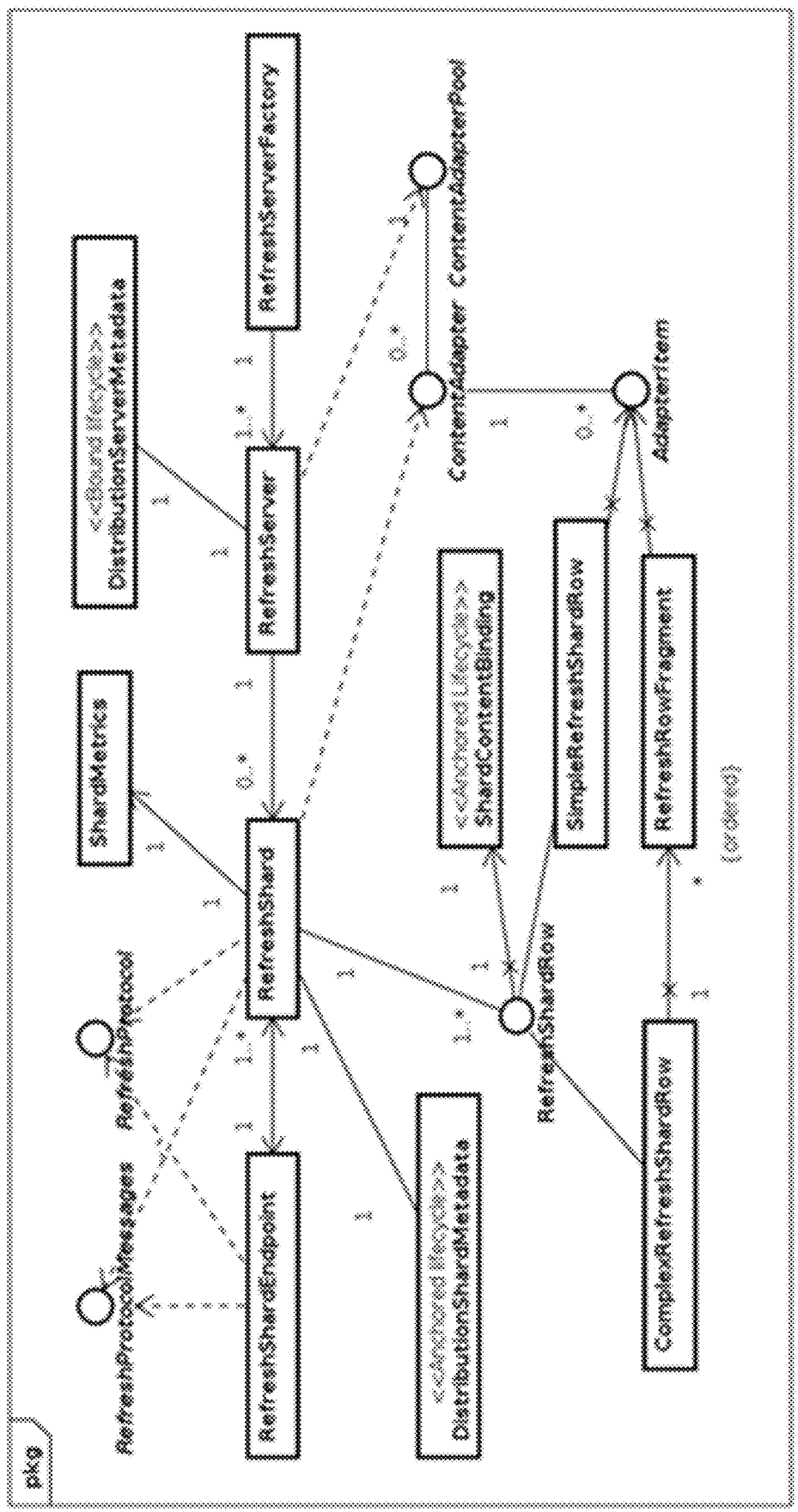
FIG. 19 is a refresh server class diagram in accordance to embodiments.

FIG. 18 illustrates orchestration target entity relationships in accordance to embodiments. A given OrchestrationTarget has an associated instance of OrchestrationTargetMetadata. Anchored to the orchestration target metadata in the Data Fabric are zero or more instances of ShardMetadata describing the required shards for various queries. Also anchored to the OrchestrationTargetMetadata are instances of OrchestrationTargetAdapterBinding. These bindings reveal to the Orchestration service the availability of OrchestrationTarget instances for each ContentAdapter instance in a particular process. Lastly, anchored to each ShardMetadata instance in the DataFabric are zero or more ShardContentBinding instances Refresh Protocol Distribution FIG. 19 is a refresh server class diagram in accordance to embodiments. Client-side Refresh API Driver is an abstraction for the client-side implementation of the Refresh Protocol.

RefreshServer is a server supporting remote connections from applications using the Client-side Refresh API Driver. For each remote connection the server creates a RefreshEndpoint. A RefreshServer is an orchestration target and as such it monitors the output of orchestration in the form of ShardMetadata. The RefreshServer creates (and destroys) corresponding instances of RefreshShard. An instance of PacketProtocolServer encapsulates the communication channel implementation details and constructs instances of PacketProtocolChannel as required A RefreshServer has an associated instance of DistributionServerMetadata stored in the DataFabric that conveys metadata about connectivity, e.g. host and port.

RefreshEndpoint is a server-side implementation of the Refresh Protocol handling a client connection to one or more instances of RefreshShard. Implementation of the client communication channel is encapsulated by a PacketProtocolChannel.

RefreshProtocol is a encapsulation of client-server Refresh Protocol supporting the refresh mechanism for obtaining real-time dataRefreshShard is a collection of result rows exposed over a particular RefreshEndpoint as orchestrated to a particular refresh server target by an orchestration algorithm. As ShardContentBinding instances are assigned to a RefreshShard, the shard will connect to the corresponding content identified in the binding and make that content available to the client.

RefreshShardRow is a type of ShardRow created by a RefreshShard. A RefreshShardRow interacts with one or more instances of AdapterItem to expose content to a client. The row uses the item and field sequence numbers previously described to determine what content needs to be sent (refreshed) to the client.

Push Protocol Distribution

Figure 20:
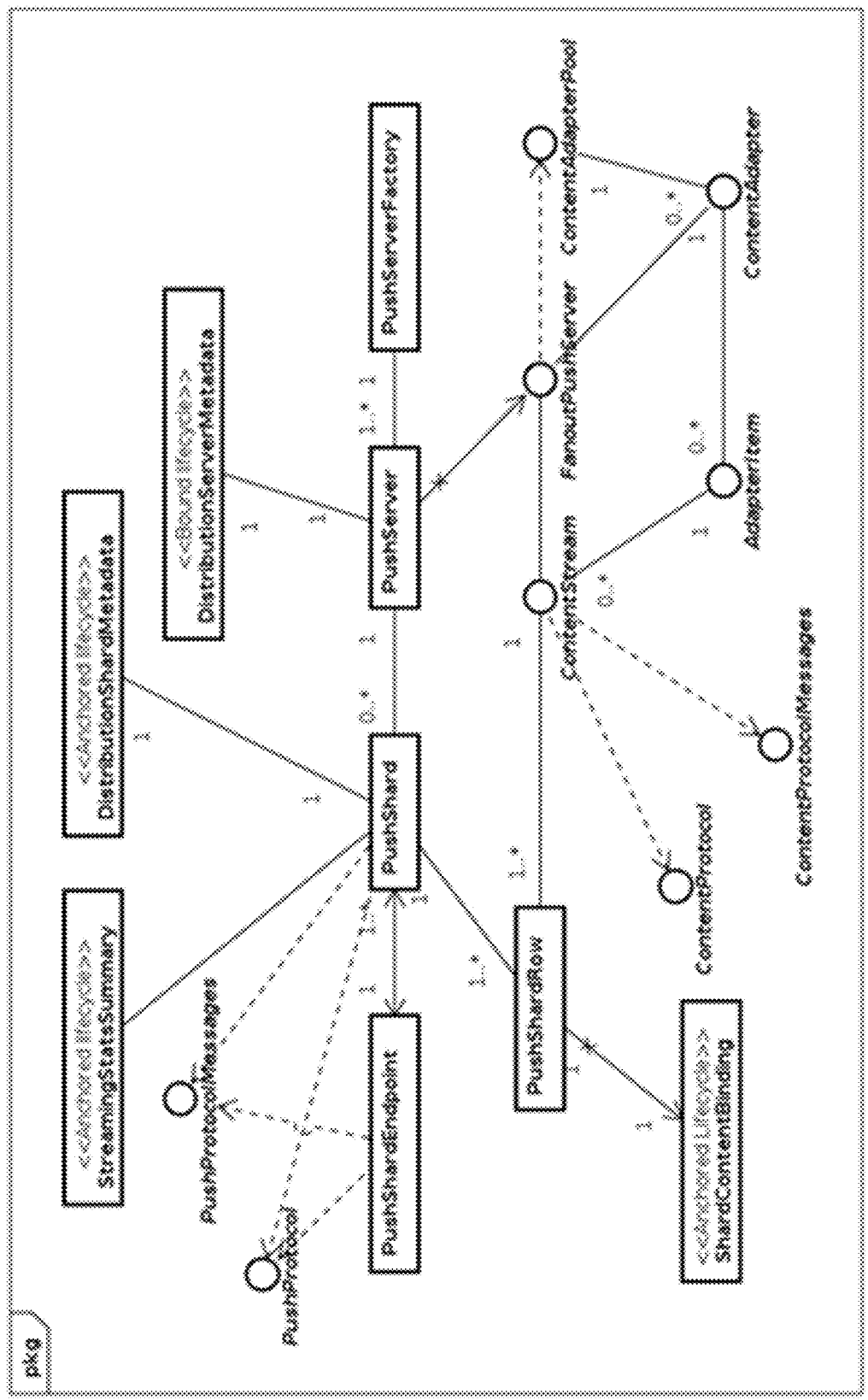
FIG. 20 is a push server class diagram in accordance to embodiments.

FIG. 20 is a push server class diagram in accordance to embodiments. Client-side Push API Driver is the client-side implementation of the push protocol.

A FanoutPushServer manages the construction of ContentStream instances that "fan out" events from instances of AdapterItem to multiple ContentStream instances, where the each stream has a unique list of fields for the same underlying content.

ContentStream is an abstraction encapsulating the PushProtocol event stream for a single unit of content having a particular field list/dictionary. A PushShardEndpoint supports the PushProtocol interaction of one or more PushShard instances push protocol streams for a remote client over a PacketProtocolChannel. The PushProtocol encapsulates the encode/decode logic for the Push Protocol used between a client-side push API driver and a PushEndpoint. A PushServer accepts new PacketProtocolChannel connections and creates corresponding PushEndpoint instances. An instance of PacketProtocolServer encapsulates the communication channel implementation details and constructs instances of PacketProtocolChannel as client application initiate communication with the server.

A PushShard is a collection of ContentStream instances corresponding to ShardContentBinding instances assigned by an orchestration policy for a particular query.

Session Server

Figure 21:
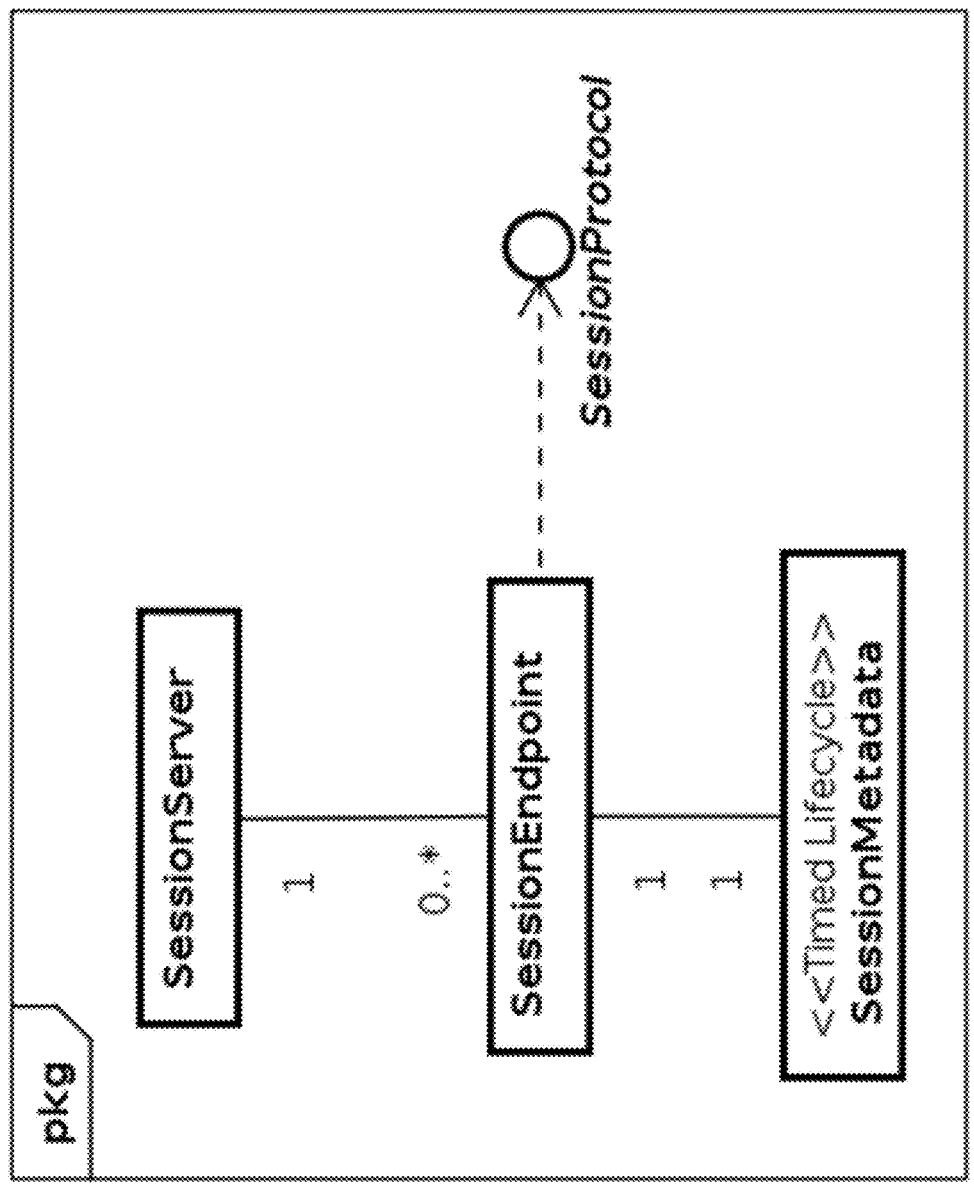
FIG. 21 is a session server class diagram in accordance to embodiments.

FIG. 21 is a session server class diagram in accordance to embodiments. An application client must have an active session in order to access or create content. Here the abstract concept of a "driver" means the client-side implementation of the Session Protocol referred to as a "Client-side Session API Driver".

A SessionServer accepts connections from various types of client applications via one or more arbitrary communication channel servers (e.g. TCPIP connections). It is independent of any specific channel implementation. For each new channel connection detected by an associated channel server, a SessionServer creates a SessionEndpoint instance to manage interactions with that client. An instance of PacketProtocolServer encapsulates the communication channel implementation details and constructs instances of PacketProtocolChannel as required.

A SessionEndpoint handles session protocol messages delivered over some type of communications channel. The session protocol allows a client to create a session and determine the location of relevant query handling services. The channel implementation is encapsulated by an instance of PacketProtocolChannel Every active session as an associated instance of SessionMetadata stored in the DataFabric. The metadata is constructed after session validation, i.e. a successful login. An instance of SessionMetadata describes a particular client session. The describes indicates client identity, location information, API type, API version, application type, application version, CPU count etc. It also indicates what type of query mechanism the client will use. Instances of SessionMetadata are stored by the SessionServer in a well-known scope. This means that any micro-service or system component that has access to the sessionID can locate the corresponding SessionMetadata.

SessionProtocol encapsulates the encoding/decoding of Session Protocol messages.

Relational Query Server

Figure 22:
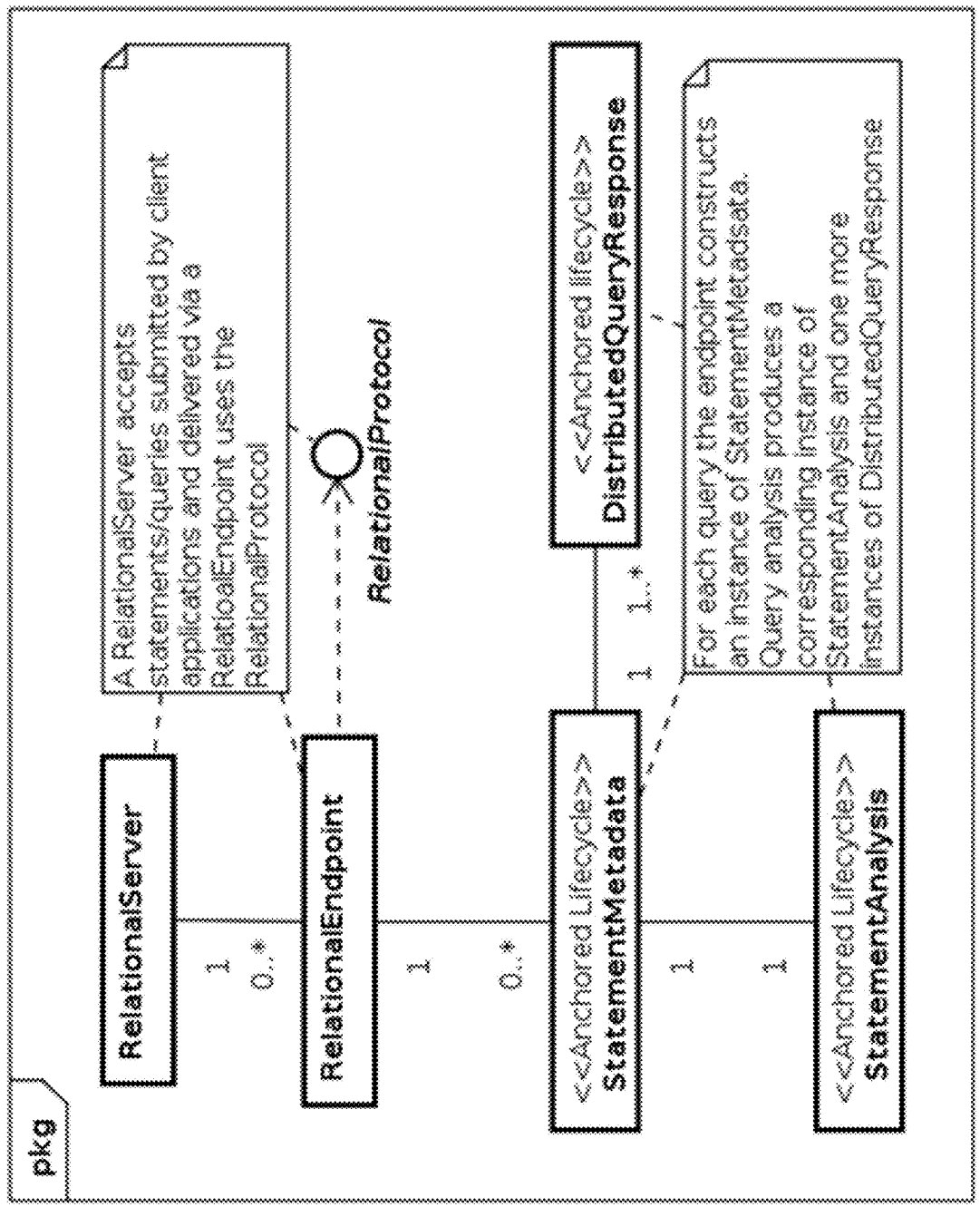
FIG. 22 is a relational query server class diagram in accordance to embodiments.

FIG. 22 is a relational query server class diagram in accordance to embodiments. When an API is used to initiate requests, a client-side API "driver" initiates content requests by interacting with a query handler. Here "driver" is an abstract concept for the client-side implementation of the Relational Protocol used to convey SQL-based requests and referred to as the "Client-side Relational API Driver".

A RelationalServer is a connection point by which remote clients initiate SQL-based queries via a RelationalEndpoint. The server is responsible for the construction and destruction of endpoints. An instance of PacketProtocolServer encapsulates the communication channel implementation details and constructs instances of PacketProtocolChannel as required.

A RelationalEndpoint is the server-side implementation of the Relational Protocol. The implementation of the communication channel used to communicate with the client is encapsulated by a PacketProtocolChannel. RelationalProtocol is the encapsulation of the Relation Protocol.

A client application issues a query (more broadly, a statement) expressed in a relational query language (ie SQL). For each query, the RelationEndpoint constructs an instance of StatementMetadata and stores it in a DataFabric scope anchored to the corresponding SessionMetadata. Query interpretation is deferred to a SQL Query Analyzer. The result of the analysis is an instance of StatementAnalysis, also stored in a DataFabric scope anchored to the SessionMetadata.

The RelationalEndpoint monitors the DataFabric for both the StatementAnalysis and the corresponding DistributedQueryResponse instances related to each query and uses those to construct a response conveyed to the client via the RelationalProtocol over the RelationalEndpoint.

SQL Query Interpretation

Figure 23:
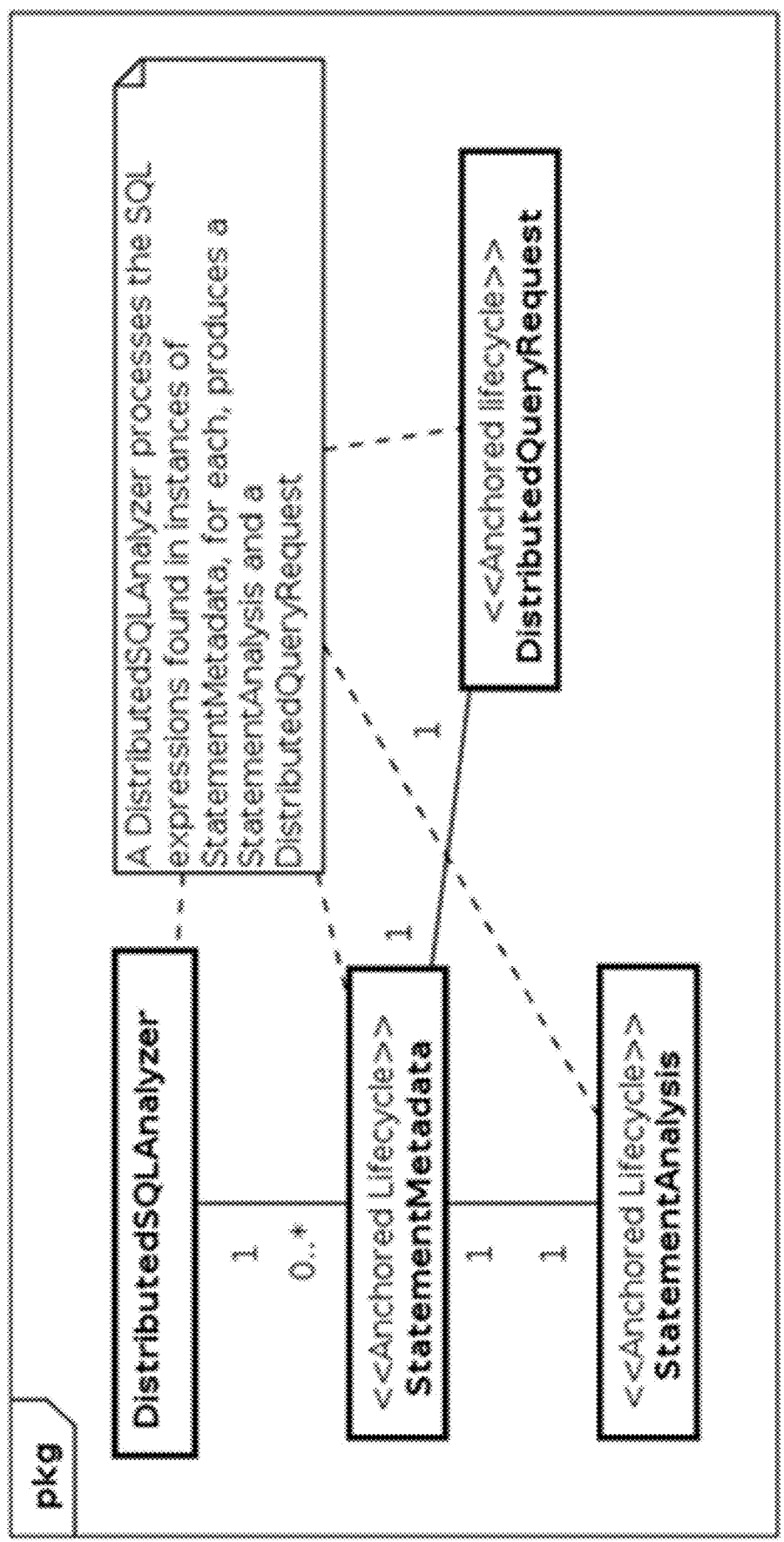
FIG. 23 is an SQL query analyzer class diagram in accordance to embodiments.

FIG. 23 is an SQL query analyzer class diagram in accordance to embodiments. An SQLAnalyzer is responsible for analyzing the syntax of SQL expressions. Interaction between the SQLAnalyzer and other micro-services and servers is implemented via the DataFabric.

An SQLAnalyzer monitors the SessionMetadata scope for new instances and then monitors those sessions for new instances of StatementMetadata. If the analyzer finds a relation expression it does a preliminary analysis and creates a StatementAnalysis instance and, if parsing is successful, a DistributedQueryRequest. If there is a parsing error the analysis object conveys the error message.

StatementAnalysis is the result of syntactic analysis by an SQLAnalyzer. It conveys basic information regarding the result of parsing an SQL expression. Notably, it indicates what type of response is needed or, in the event of a parsing error, detailed error information.

Figure 24:
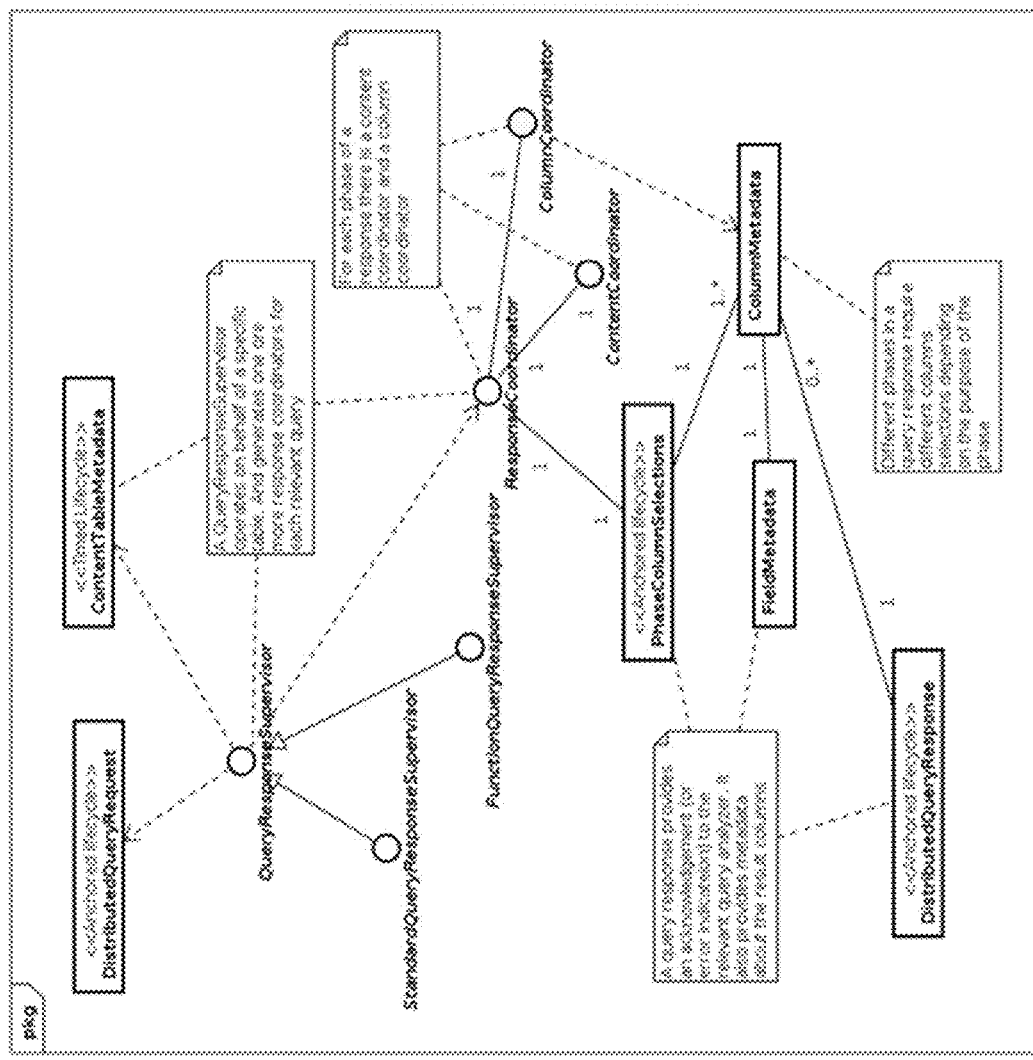
FIG. 24 is a query handling class diagram in accordance to embodiments.

A DistributedQueryRequest is an object representing a query. It provides a semi-validated view of a query and targets one or more tables. It indicates what columns/fields have been selected, table join criteria and content constraints FIG. 24 is a query handling class diagram in accordance to embodiments. QueryResponseSupervisor is an abstraction for the entity responsible for responding to a particular query, expressed as a DistributedQueryRequest, targeted at a particular content type, identified by an instance of ContentTableMetadata. It does this by monitoring the DataFabric for new sessions and queries and matching the queries by schema and table name. For each request identified as relevant, the supervisor allocates a corresponding instance of ResponseCoordinator specific to the query.

A StandardQueryResponseSupervisor is a type of QueryResponseSupervisor that supervises requests for standard tables.

A FunctionQueryResponseSupervisor handles query supervision for function tables.

A ContentCoordinator coordinates the response for a particular query response phase in terms of the rows or content assigned to the result. The implementation of ContentCoordinator used varies depending on the query and the query handling phase.

ColumnMetadata describes a column or field in a query result and comprises an instance of FieldMetadata (describing the underlying field), an optional query-specific alias and a selection index indicating the columns position in a result. In the case of "wild-card" queries, the selection index may be indeterminate.

An instance of PhaseColumnSelections associates a collection of ColumnMetadata with a ContentOrchestrationRequest which in turn is associated with some query response phase and a particular table that is the target of that request.

A DistributedQueryResponse is the response from a table query handler to a particular instance of DistributedQueryRequest. The response indicates what columns have been selected for the particular table. It may also indicate an error details in the case of validation failures. The response is used by client-facing protocol handlers to produce a response for client-side API drivers.

Figure 25:
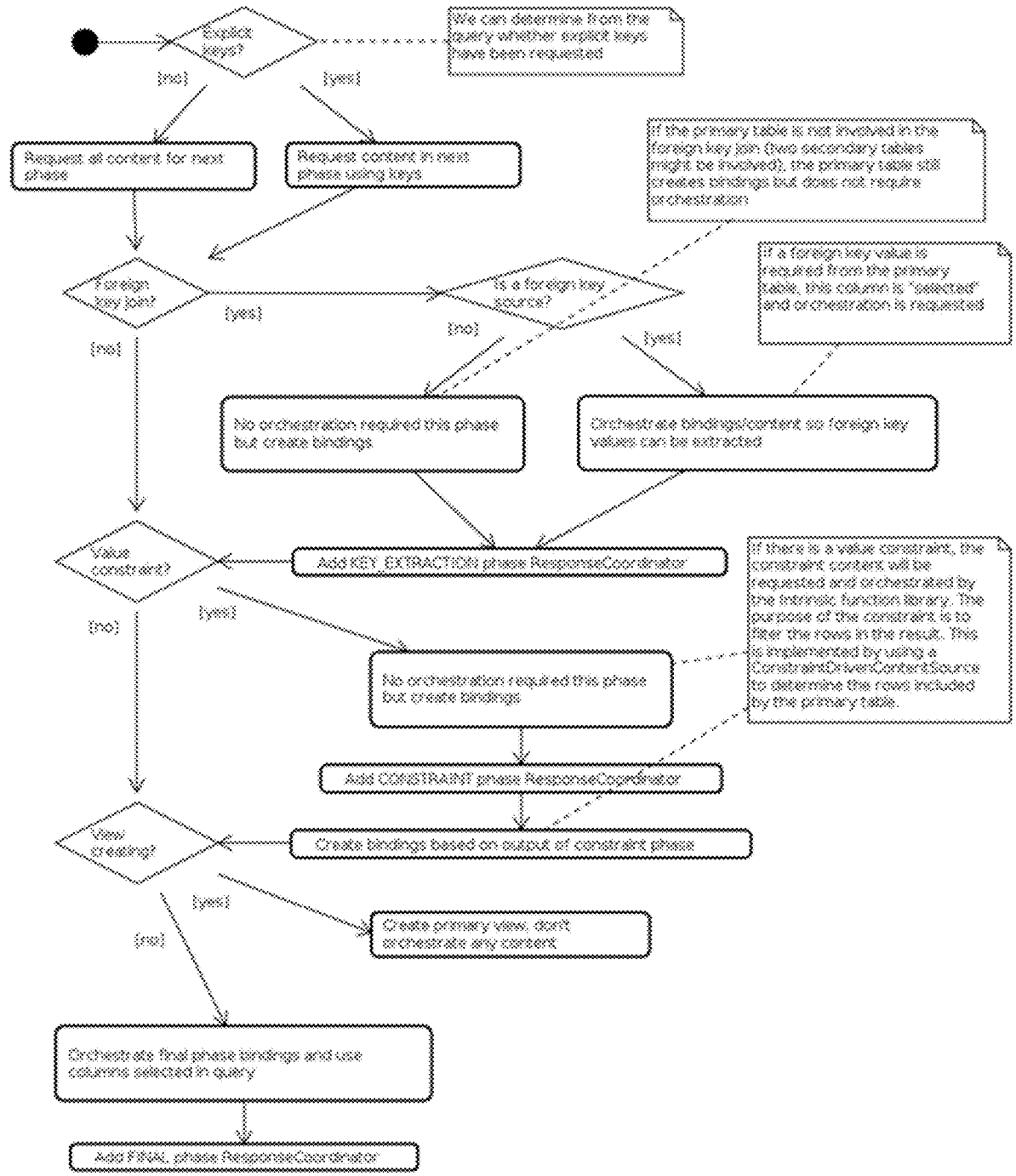
FIG. 25 is primary table response planning flow diagram in accordance to embodiments.

FIG. 25 is primary table response planning flow diagram in accordance to embodiments.

Figure 26:
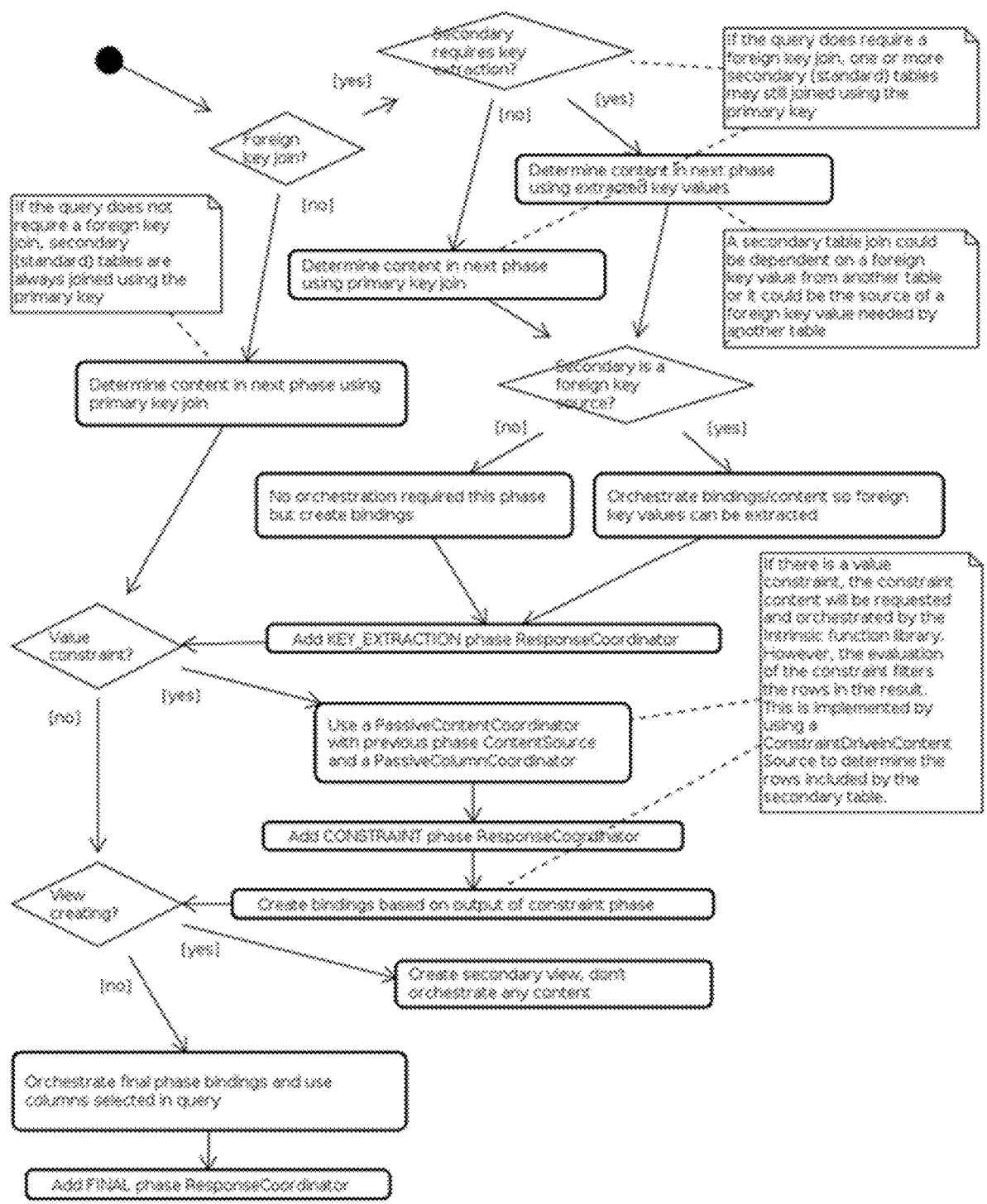
FIG. 26 is a secondary table response planning flow diagram in accordance to embodiments.

FIG. 26 is a secondary table response planning flow diagram in accordance to embodiments.

Figure 27:
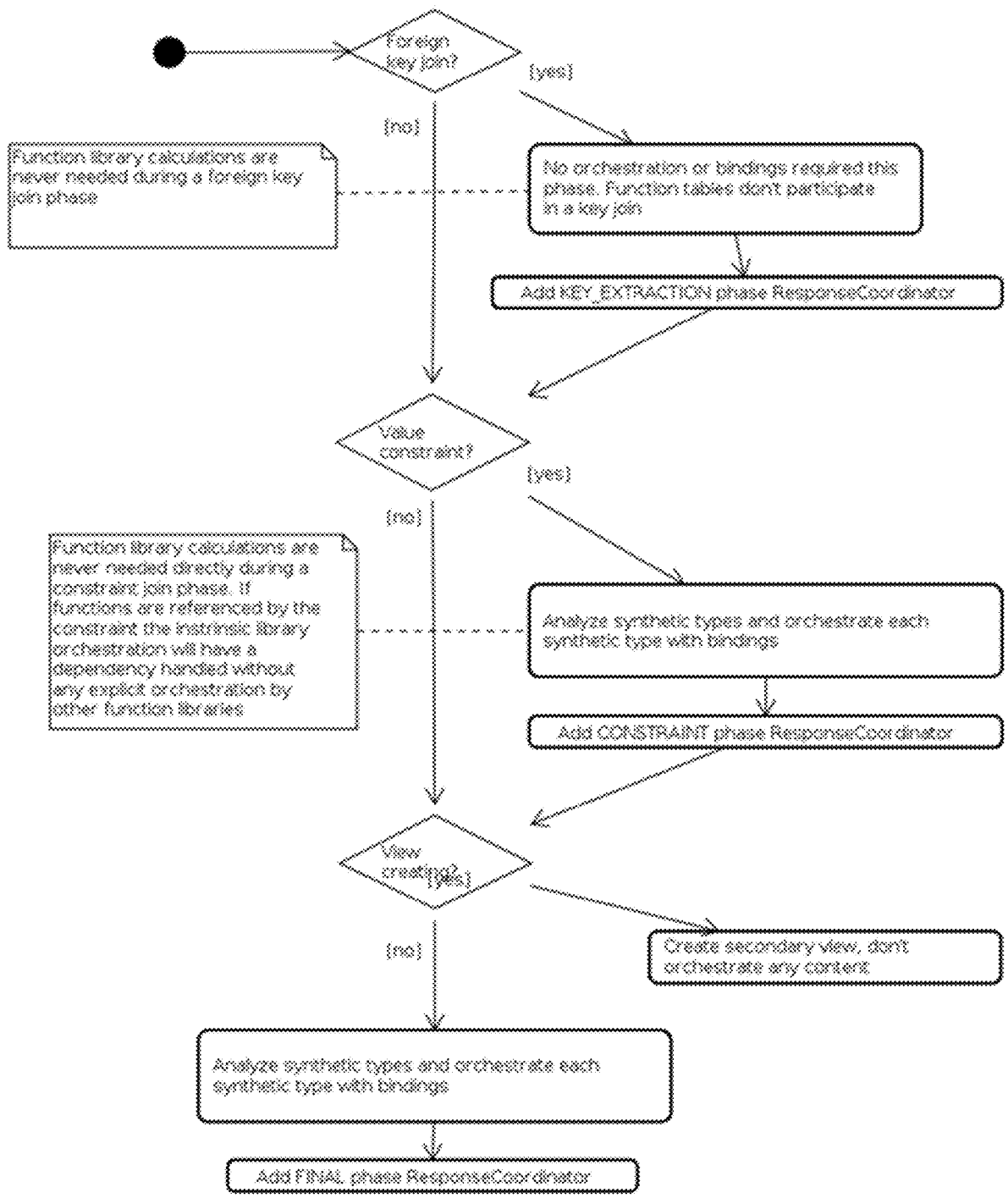
FIG. 27 is a function table response planning flow diagram in accordance to embodiments.

FIG. 27 is a function table response planning flow diagram in accordance to embodiments.

Figure 28:
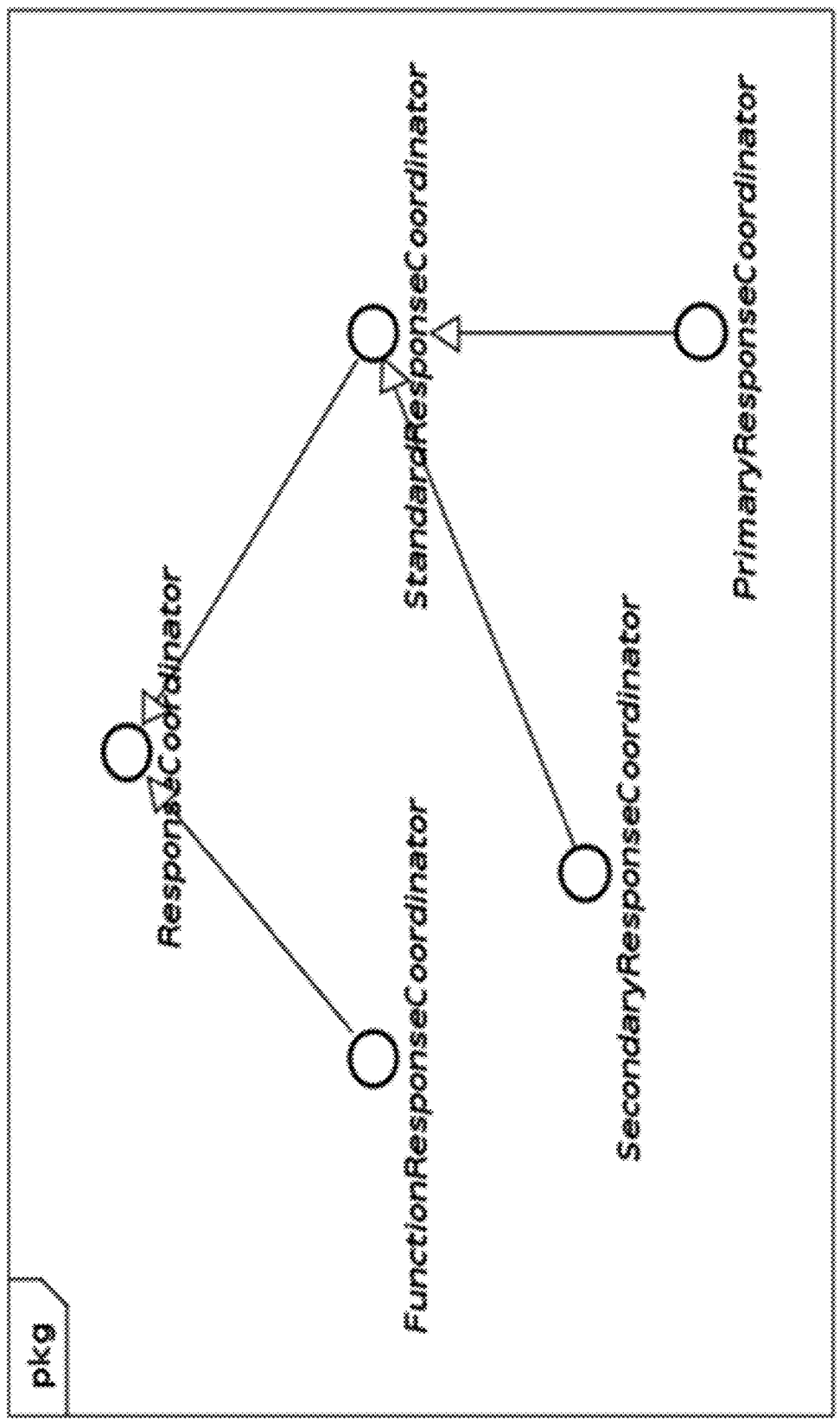
FIG. 28 is a response coordinator class diagram in accordance to embodiments.

FIG. 28 is a response coordinator class diagram in accordance to embodiments. A ResponseCoordinator coordinates the query response for a specific phase of the response to a given query. Each response phase uses a ContentCoordinator and a ColumnCoordinator to produce the required content (rows and columns) and requests orchestration to a specific OrchestrationTarget associated with the response phase. Where query handling requires multiple phases, a ResponseCoordinator will be linked to the ResponseCoordinator from a predecessor phase such that the ResponseCoordinator for the predecessor phase executes first A SecondaryResponseCoordinator handles the query responses for a secondary table.

A StandardResponseCoordinator is a ResponseCoordinator that handles standard tables.

A FunctionResponseCoordinator is a ResponseCoordinator that handles function tables.

Figure 29:
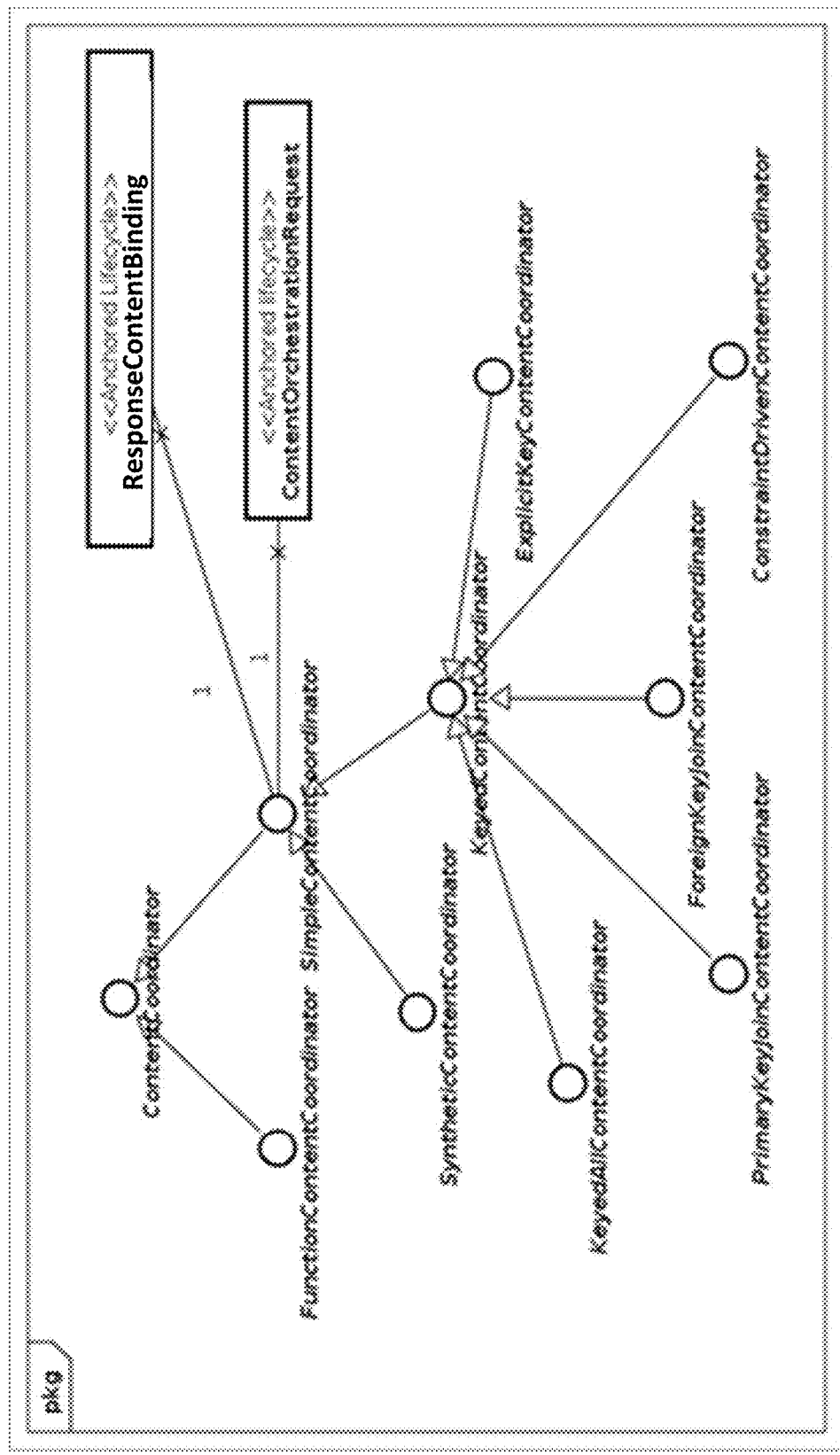
FIG. 29 is a content coordinator class diagram in accordance to embodiments.

FIG. 29 is a content coordinator class diagram in accordance to embodiments. A ContentCoordinator is an abstraction for an entity responsible for producing the content for a given phase of query handling. A ContentCoordinator generates a ContentOrchestrationRequest specifying a type of OrchestrationTarget. The target may be NONE, meaning no orchestration is required. In some cases, content bindings are required even if orchestration is not required (e.g. for determining content joins). For each unit of content required to be included in the result, the ContentCoordinator generates a ResponseContentBinding. Bindings convey ordering information (linking a row to its neighbors in the result (n.b. the ordering may be arbitrary).

A SimpleContentCoordinator is an intermediate abstraction representing a ContentCoordinator that produces a ContentOrchestrationRequest and ResponseContentBinding instances for either a standard table type or a synthetic table type.

A SyntheticContentCoordinator is an implementation of SimpleContentCoordinator representing a synthetic table type (a function library and some specific combination of input types).

A FunctionContentCoordinator is an implementation of ContentCoordinator that handles function library columns. A FunctionContentCoordinator analyzes the DistributedQueryRequest and determines the set of unique synthetic types (combinations of the base library plus input parameter types). For each synthetic type that results from this analysis, the FunctionContentCoordinator produces a DerivedContentFactory and a corresponding SyntheticContentCoordinator.

The DerivedContentFactory contains the recipe(s) for producing fields (and content) relating to a particular query. The SyntheticContentCoordinator handles the ContentCoordinator responsibilities for the synthetic type, including the production of ResponseContentBinding instances as required by the query.

A KeyedContentCoordinator is an intermediate abstraction for ContentCoordinator derivatives that handle tables with keys.

An ExplicitKeyContentCoordinator is a type of KeyedContentCoordinator used by a primary table when the query defines an explicit constraint on the keys from the primary table (e.g. as with an 'IN' clause in SQL). A ConstraintDrivenContentCoordinator is an implementation of ContentCoordinator that acts on behalf of the primary table and monitors the output from a previous query handling phase so as to determine those rows for which the constraint evaluates to be true and includes those rows in the output of the constraint phase KeyedAllContentCoordinator is an implementation of KeyedContentCoordinator that handles expressions that request all rows from a standard (keyed) table.

A PrimaryKeyJoinContentCoordinator source is an implementation of ContentCoordinator created by a secondary table to monitor the ResponseContentBinding instances from the primary table and create corresponding secondary bindings. Since this is a primary key join, the key values from the primary correspond to directly to key values from the secondary. To obtain the key value for a primary binding, the PrimaryKeyJoinContentCoordinator locates the ContentMetadata for the primary binding, extracts the key value and uses a KeyedContentManager associated with the secondary table to obtain the corresponding secondary table ContentMetadata.

A ForeignKeyJoinContentCoordinator is an implementation of ContentCoordinator that extracts from the DataFabric the DistributionShardMetadata associated with a the KEY_EXTRACTION phase orchestration of content from the primary table (or a different secondary table). Having obtained the shard metadata, the ForeignKeyJoinContentCoordinator uses the RefreshAPI to connect to the shards and obtain the row identifiers and corresponding foreign key values extracted from the primary content. Given the key values, the ForeignKeyJoinContentCoordinator uses a KeyedContentManager associated with the secondary table to obtain ContentMetadata for the secondary content. A ContentManager is responsible for managing the life-cycle of the ContentMetadata associated with a query result. Depending on the query and the nature of the table or adapter, the lifespan of ContentMetadata may be constrained by the query or may transcend the query.

A ResponseContentBinding is an association between a content and a phase of a query response (as represented by a ContentOrchestrationRequest).

A ContentOrchestrationRequest identifies a specific ResponsePhaseType, OrchestrationTarget and dependencies, if any, on other tables. Associated with a request is a set of ResponseContentBinding instances that require orchestration. A ContentOrchestrationRequest has an OrchestrationTargetType attribute that indicates the type of distribution required, if any, for a particular query response phase.

Figure 30:
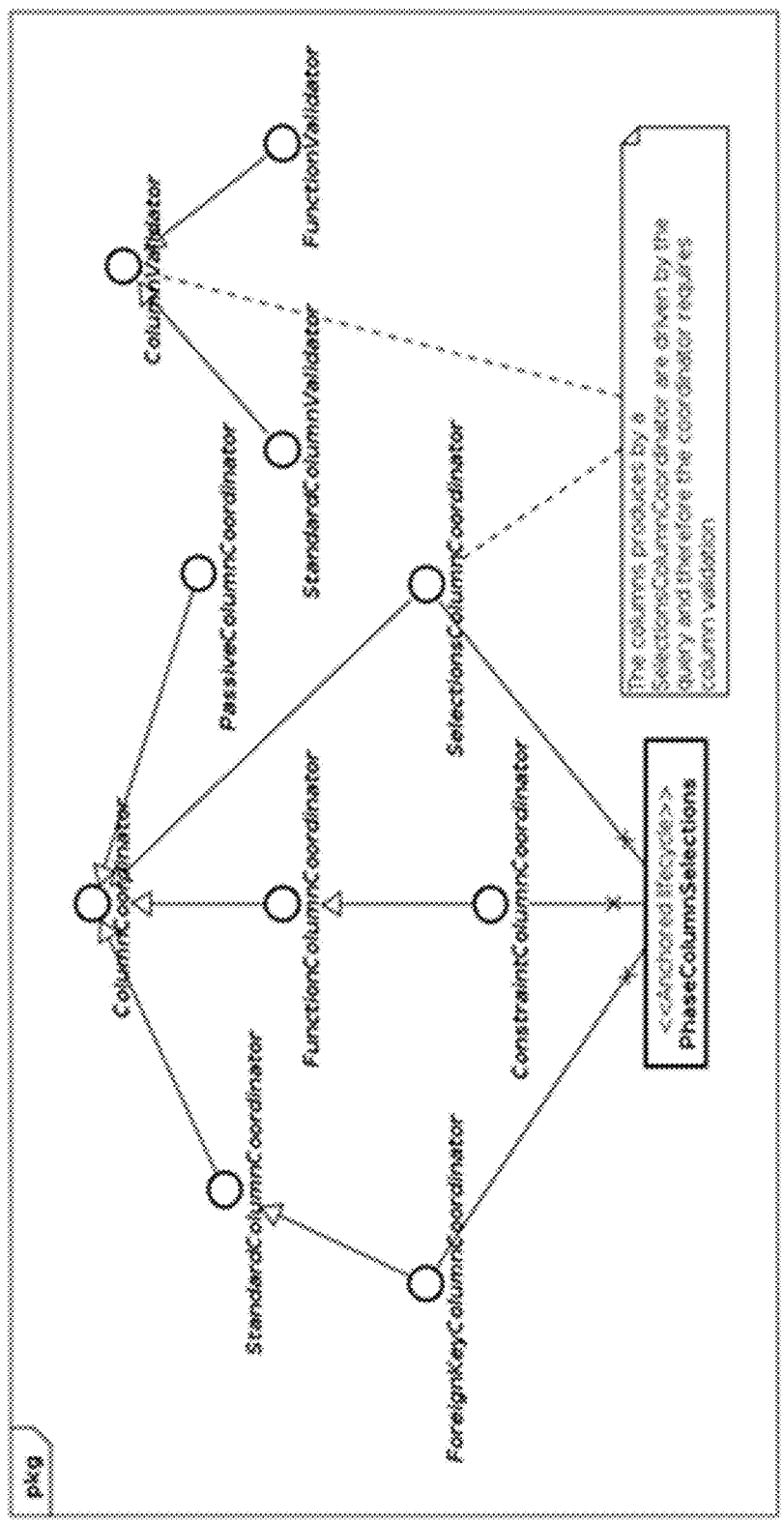
FIG. 30 is a column coordinator class diagram in accordance to embodiments.

FIG. 30 is a column coordinator class diagram in accordance to embodiments. A ColumnCoordinator coordinates the response for a particular query response phase in terms of the columns or fields selected for a that phase. Columns selected do not necessarily correspond to explicit selections in the query itself. Column validation, where required, is deferred to a ColumnValidator. A ColumnCoordinator is also responsible for handling "wild card" requests where a query asks for all available columns. Since the architecture is schema-less, answering this type of query may require fetching some data from an external system.

A ColumnValidator is responsible for validating columns, i.e. making sure that the request columns are valid for the underlying data. The mechanism for column validation varies with different types of data adapter.

A StandardColumnCoordinator is an intermediate abstraction representing any ColumnCoordinator for a standard table.

A StandardColumnValidator is an intermediate abstraction representing any ColumnValidator that handles standard tables.

A FunctionColumnCoordinator is an intermediate abstraction representing any ColumnCoordinator that handles function columns.

A FunctionValidator is a type of ColumnValidator specific to function tables. It validates functions and provides access to FunctionTemplate instances.

A ForeignKeyColumnCoordinator defines the columns for extracting foreign key values from content that is the basis for a join to a secondary table. Content containing the foreign keys is orchestrated to shards during the KEY_EXTRACTION phase.

A ForeignKeyContentSource in the subsequent phase will extract the foreign key values found in the shard rows and use those values to drive content for the joined table.

A ConstraintColumnCoordinator generates columns for a CONSTRAINT phase where the constraint value (a single derived field) is assigned to shards and those shards are monitored for results by an instance of ConstraintDrivenContentSource.

A ConstraintColumnCoordinator is allocated by the ResponseCoordinator associated with the Intrinsic function table.

A SelectionsColumnCoordinator is a ColumnCoordinator that constructs columns as defined by the selection clause of a query. This type of ColumnCoordinator is always used in the FINAL phase of query processing.

A PassiveColumnCoordinator generates an empty set of ColumnMetadata.

Figure 31:
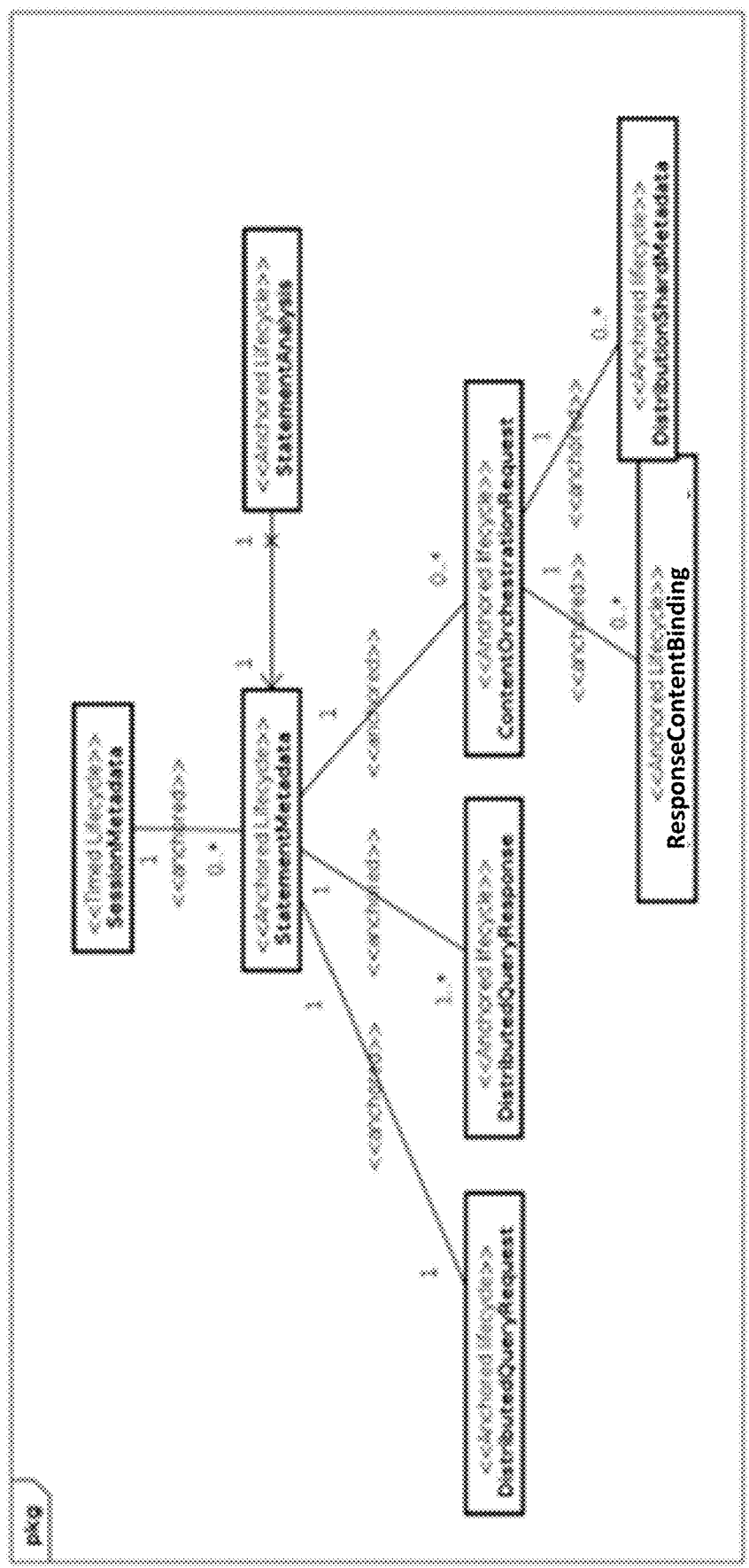
FIG. 31 is a session metadata entity relationship diagram in accordance to embodiments.

FIG. 31 is a session metadata entity relationship diagram in accordance to embodiments. All query related metadata is stored in DataFabric scopes anchored directly or indirectly to the corresponding SessionMetadata. A session has zero or more statements represented by StatementMetadata For each statement there is a corresponding StatementAnalysis. Anchored to the StatementMetadata is a single DistributedQueryRequest instance, one or more DistributedQueryResponse instances and zero or more ContentOrchestrationRequest instances. Anchored to each ContentOrchestrationRequest instance are zero or more ResponseContentBinding instances and zero or more DistributionShardMetadata instances.

From this metadata, any component/micro-service attached to the DataFabric can determine and monitor the current state of all active queries.

Market Data Chains Adapter

Figure 32:
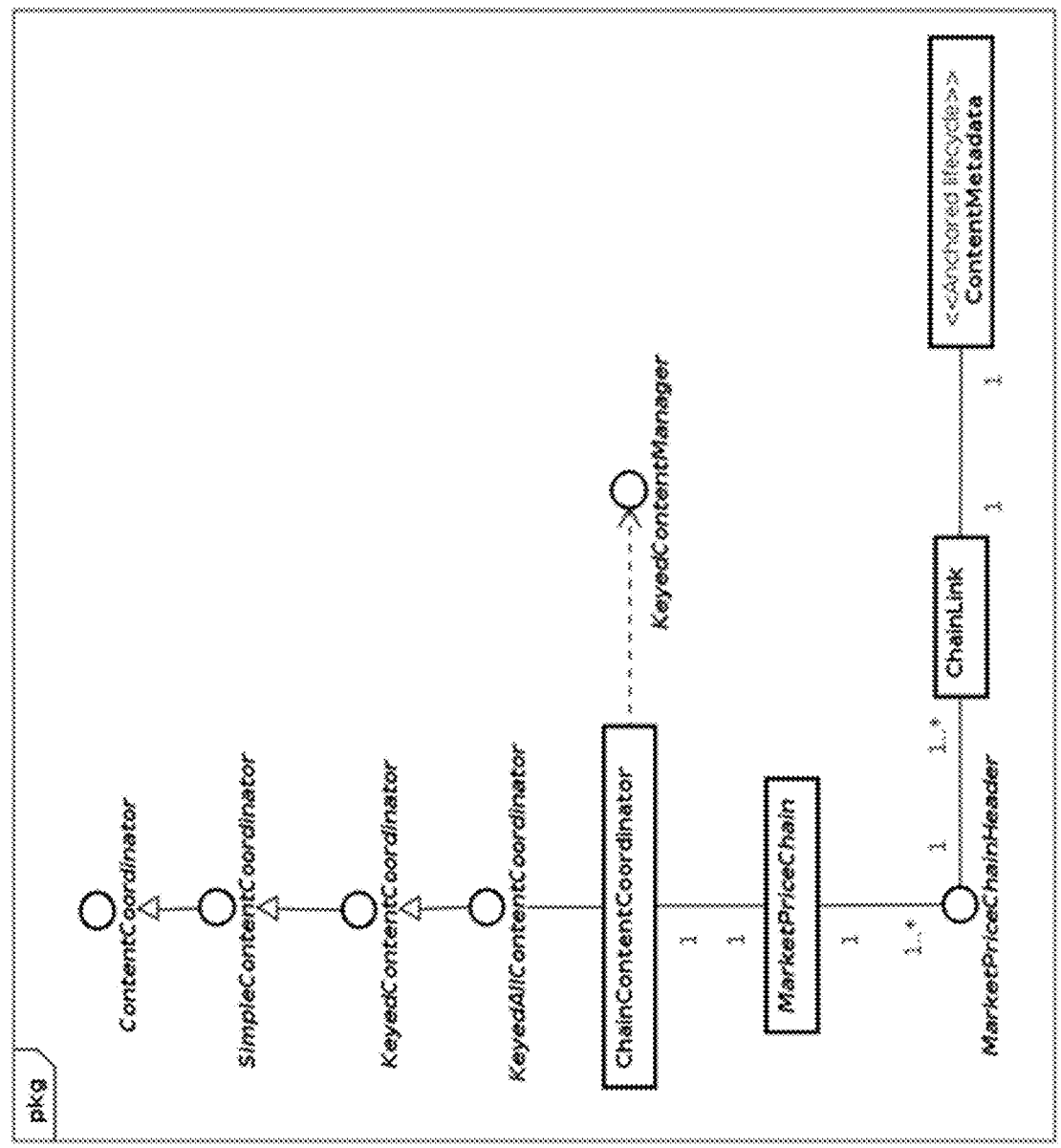
FIG. 32 is a market data chains query handler in accordance to embodiments.

FIG. 32 is a market data chains query handler in accordance to embodiments. A ChainContentManager is an implementation of ContentManager whose scope of available content is determined by a "chain" obtained dynamically from an external market data source.

A ChainLink represents one link in a chain. Links are grouped into headers. Each link provides the symbol (key) for some underlying unit of content.

A MarketPriceChain represents a single chain entity and comprises multiple instances of MarketPriceChainHeader. Each header in turn comprises multiple instances of ChainLink. Links can be dynamically added and removed from the chain. Also a chain may grow and shrink by means of adding/removing headers. A MarketPriceChainHeader manages the links associated with an externally defined chain header that conveys the data for some number of links. For each link the header creates an instance of ChainLink.

Pub-Sub Topic Interpretation

Figure 33:
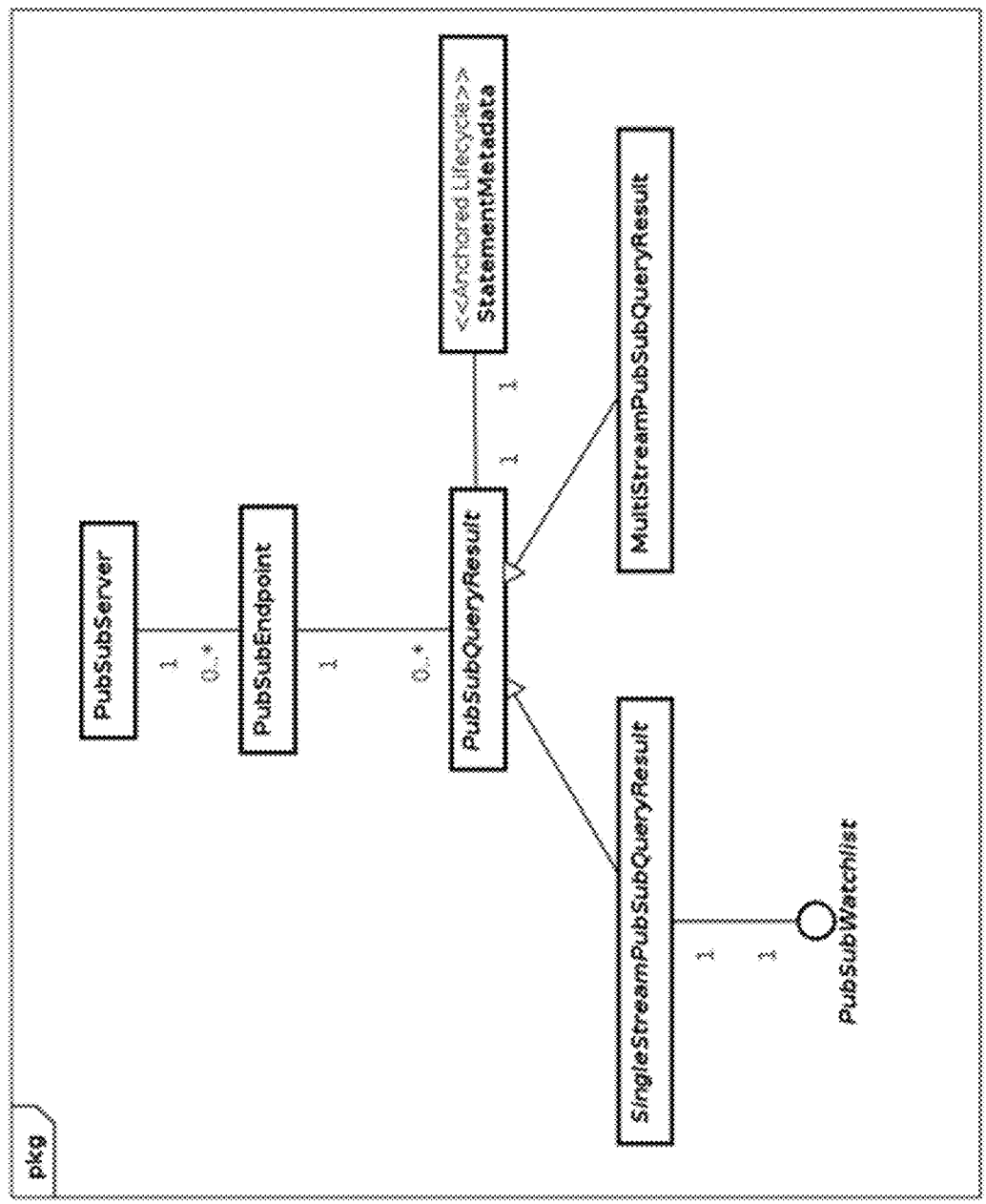
FIG. 33 is a pub-sub query server class diagram in accordance to embodiments.

FIG. 33 is a pub-sub query server class diagram in accordance to embodiments. Client-side Pub-Sub API Driver is an abstraction representing the client side driver for a pub-sub protocol API.

A PubSubServer is an implementation of PacketProtocolServer that handles the server side of the PubSubProtocol.

PubSubQueryResult is an abstraction a pub-sub query result. A PubSubQueryResult is associated with a corresponding instance of StatementMetadata.

A PubSubEndpoint is a PacketProtocolEndpoint that handles the client or server side of a PubSubProtocol channel.

A PubSubProtocol is an implementation of PacketProtocol that handles the pub-sub protocol.

A SingleStreamPubSubQueryResult is a PubSubQueryResult for a topic that produces a single-stream response.

A MultiStreamPubSubQueryResult is a PubSubQueryResult for a topic/query that produces a multi-stream response.

A PubSubWatchlist represents a session-specific table comprising the set of single-stream subscriptions (individual content streams) that a particular session makes with respect to a specific content table. A PubSubWatchlist creates a table whose purpose is to be the primary table in a join. The table is temporary in that it is associated with a session and goes away when the session goes away. Like any other watchlist table has ContentTableMetadata, a QueryResponseSupervisor, and provides implementations of ContentCoordinator, ContentManager, ColumnCoordinator, and ColumnValidator. The namespace for the content rows in the watchlist is the same as that for the underlying table. The only column in the table is the key. As the client makes new subscriptions, specifying a key as part of the topic syntax, the watchlist creates a new ResponseContentBinding and publishes to the DataFabric.

The query handler for the secondary table (the target of the subscription request) is notified by the DataFabric of this binding, and as part of the join process, creates and publishes its own ResponseContentBinding for the corresponding key. The ResponseContentBinding from the secondary is detected by orchestration and results in a ShardContentBinding attached to a push distribution shard. Unsubscribe requests from the client result in the ResponseContentBinding for the corresponding key being removed from the DataFabric which in turn leads to the secondary table removing the corresponding ResponseContentBinding from the join.

Figure 34:
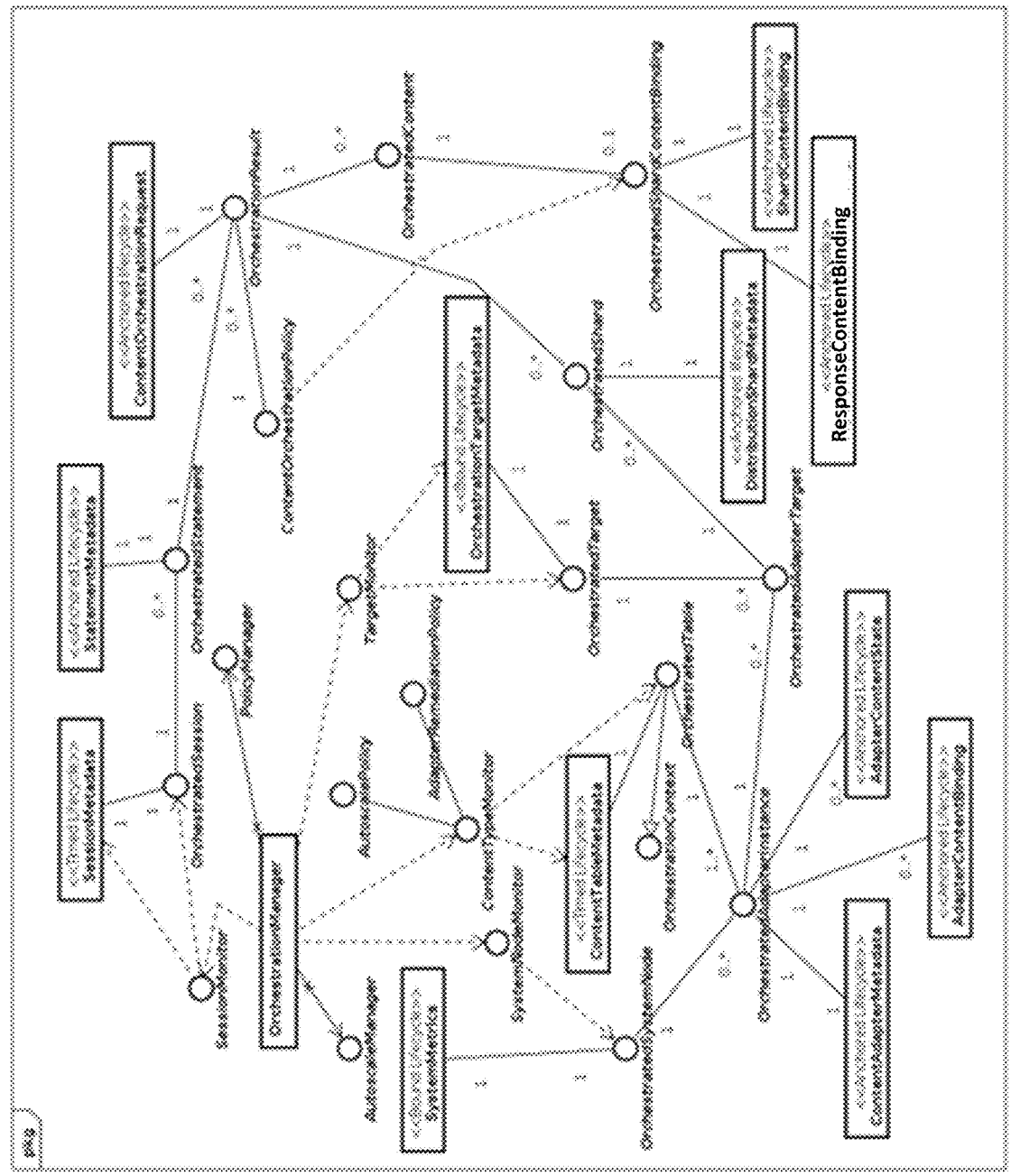
FIG. 34 is an orchestration service class diagram in accordance to embodiments.

PubSubWatchlistFactory manages a set of PubSubWatchlist instances. SingleStreamPubSubQueryResult is a PubSubQueryResult for a collection of topics that produce single-stream responses where the topics are mapped to a join of a PubSubWatchlist with content from some underlying table Stream-Based Orchestration Service FIG. 34 is an orchestration service class diagram in accordance to embodiments. AdapterCacheAssignment links a content cache assignment with orchestrated content. It monitors active assignment and if removed, triggers re-orchestration.

A ContentOrchestrationPolicy assesses the assignment of resources to existing content adapter instances. It can use system metrics such as CPU, memory or content metrics such as cache assignments, and message rates. Adjustments entail moving content from one adapter instance to another.

AutoscaleActivity is an activity that collects cache re-orchestration tasks. When all tasks are complete the autoscale activity is ready to finish (e.g., container shutdown is triggered).

AutoscaleManager is an abstraction that encapsulates the mechanism(s) for adding and reducing per-table resources.

AutoscalePolicy is a policy used to determine the allocation of adapter resources. It can use system resources metrics such as CPU, memory, bandwidth. It can use content metrics such as number of cache assignment, update rates, etc. It can scale-up the system by initiating the launch of new adapter instances. It can scale-down the system by initiating the shut-down of existing adapter instances.

CacheAssignmentActivity is an activity that executes a cache assignment policy. It is complete when an AdapterContentState for the requested content is available. It results in a AdapterCacheAssignment.

A ContentOrchestrationPolicy is an abstraction representing a content orchestration policy. The purpose is to bind content to an adapter/target/shard. ContentTypeMonitor is a utility that works on behalf of the OrchestrationManager to monitor the DataFabric for new table types.

GetContentActivity is a task that waits for confirmation that content assigned to a cache is ready.

An OrchestratedAdapterInstance represents a ContentAdapter instance from the perspective of orchestration. It is responsible for creating AdapterContentBinding instances and monitoring AdapterContentState instances. It manages cache assignments and tracks adapter instance metrics.

OrchestratedAdapterTarget is a resource representing a particular combination of orchestration target and adapter. It tracks state from an orchestration perspective (e.g., the orchestration view of shards associated with a target).

OrchestratedContent is the finest granularity of orchestration with respect to a particular ResponseContentBinding associated with some ContentOrchestrationRequest. It is a state machine for content orchestration. It has a current activity and handles synchronous and asynchronous state transitions. After orchestration is completed, it monitors resulting cache assignment and triggers reorchestration if assignment is removed.

OrchestratedShard represents a shard from the perspective of orchestration. It manages content shard bindings and tracks shard metrics such as latency, thread utilization, etc.

OrchestratedShardContentBinding associates a ResponseContentBinding with a ShardContentBinding on behalf of an instance of OrchestratedContent.

An OrchestratedTable represents a particular type of content, a table, from the orchestration perspective.

An OrchestrationContext is an abstraction for the context of various types of orchestration activities.

An OrchestrationManager is a micro-service that manages various capabilities related to initial content orchestration, re-orchestration for resource management, and auto-scaling.

An OrchestrationResult is an encapsulation of the orchestration results associated with a particular orchestration request. It also provides a resource context for policy decisions. It filters available resources by looking at table and target types. It differentiates between resources that have result content assigned and those that do not. It tracks shards associated with the result. An OrchestrationResult is a collection of OrchestratedContent corresponding to the rows in the query result.

A PolicyManager is responsible for determining what type of policy to apply to a particular activity for a particular table. Policies are serializable objects that encapsulate policy logic and configuration. A PolicyManager may incorporate table metadata, system metrics, request context (what application? What user? What inbound network?) etc., to determine which policy to apply. Types of policies include:
 Content orchestration (initial content to cache assignment)
 Auto-scaling (orchestration-initiated addition or subtraction of resources)
 Adapter Remediation (adapter node failure)
 Target remediation (target failure, e.g. network interface failure)

An AdapterContainerManager is an abstraction representing an entity responsible for managing containers associated with a particular ContentAdapter. Orchestration policies drive the allocation and deallocation of container instances by interacting with the appropriate AdapterContainterManager.

Use-Case Realization—Content Adapter Initialization

Figure 35:
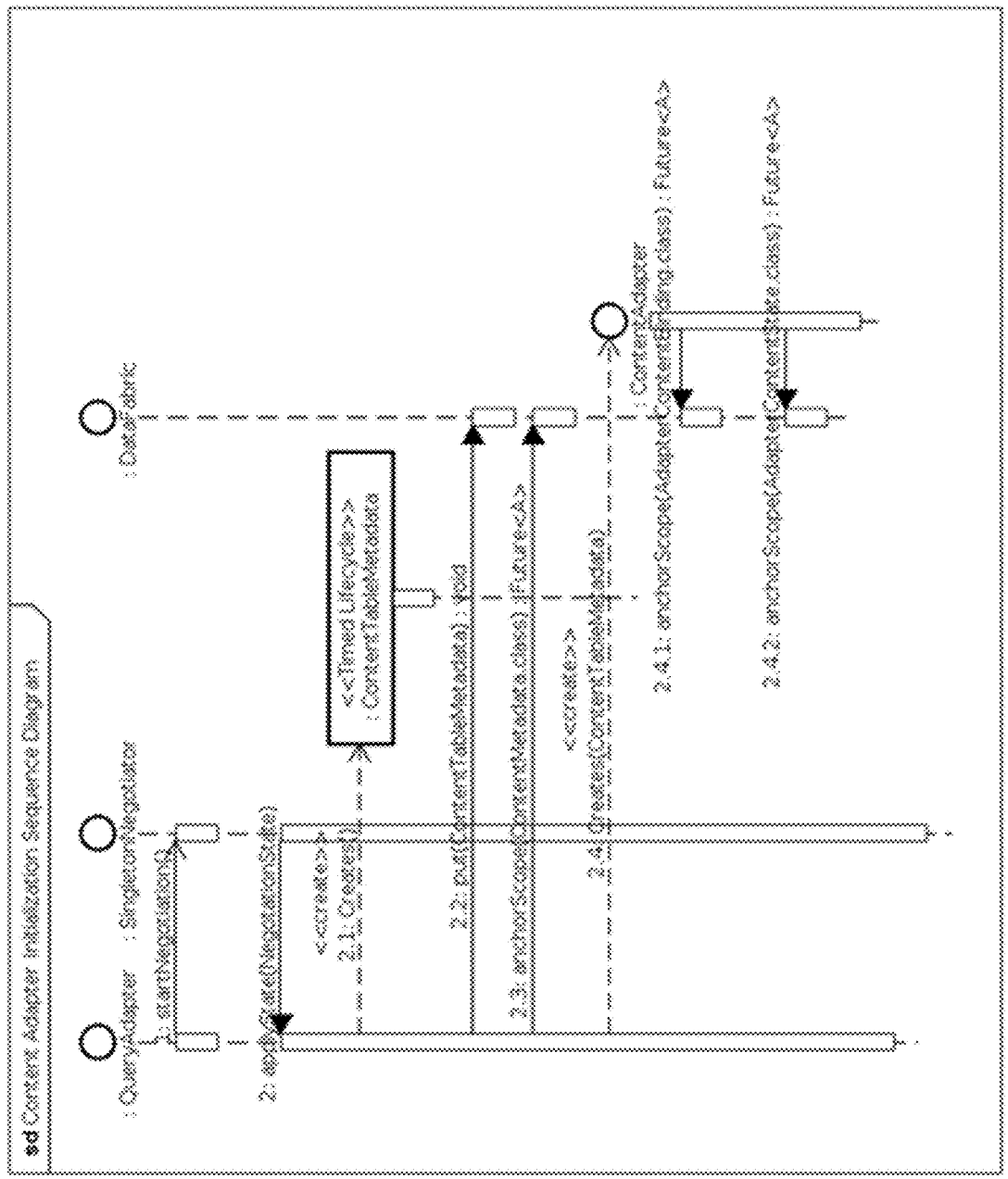
FIG. 35 is a content adapter initialization sequence diagram in accordance to embodiments.

FIG. 35 is a content adapter initialization sequence diagram in accordance to embodiments. AdapterManager uses a SingletonNegotiator to determine NegotiationState. After the negotiation, if this adapter is the singleton, the QueryAdapter creates and publishes ContentTableMetadata. After the negotiation, if this adapter is in a standby state, the QueryAdapter locates the existing ContentTableMetadata in the DataFarbric. QueryAdapter anchors a scope of ContentMetadata to the ContentTableMetadata. N.B. this scope may already exist and may already have been anchored. The redundancy does not matter.

QueryAdapter initializes the ContentAdapter using the acquired ContentTableMetadata. ContentAdapter creates a ContentAdapterMetadata corresponding to itself and publishes it to the DataFabric. ContentAdapter anchors a scope of AdapterContentBinding to its own ContentAdapterInstance object. ContentAdapter anchors a scope of AdapterContentState to its own ContentAdapterInstance. AdapterManager adds ContentAdapter to the ContentAdapterPool.

Use-Case Realization—Create a Session

Client-side Session API Driver: SessionServer accepts a new socket request and creates a SessionEndpoint. Client-side Session API Driver: SessionEndpoint receives a Session message from a Client. SessionEndpoint authenticates the client and creates SessionMetadata. SessionEndpoint publishes the SessionMetadata to the data fabric. SessionEndpoint sends session ack with current catalog of available query handling servers. Client-side Session API Driver: SessionEndpoint receives SessionRefresh message and "touches" the corresponding SessionMetadata in the control plane. SessionEndpoint refreshes ("touches") SessionMetadata instance in the data fabric. SessionEndpoint replies to client with current catalog of available query handling servers. Client-side Session API Driver repeats the refresh sequence while session is active.

Use-Case Realization—Singleton Negotiation

Figure 36:
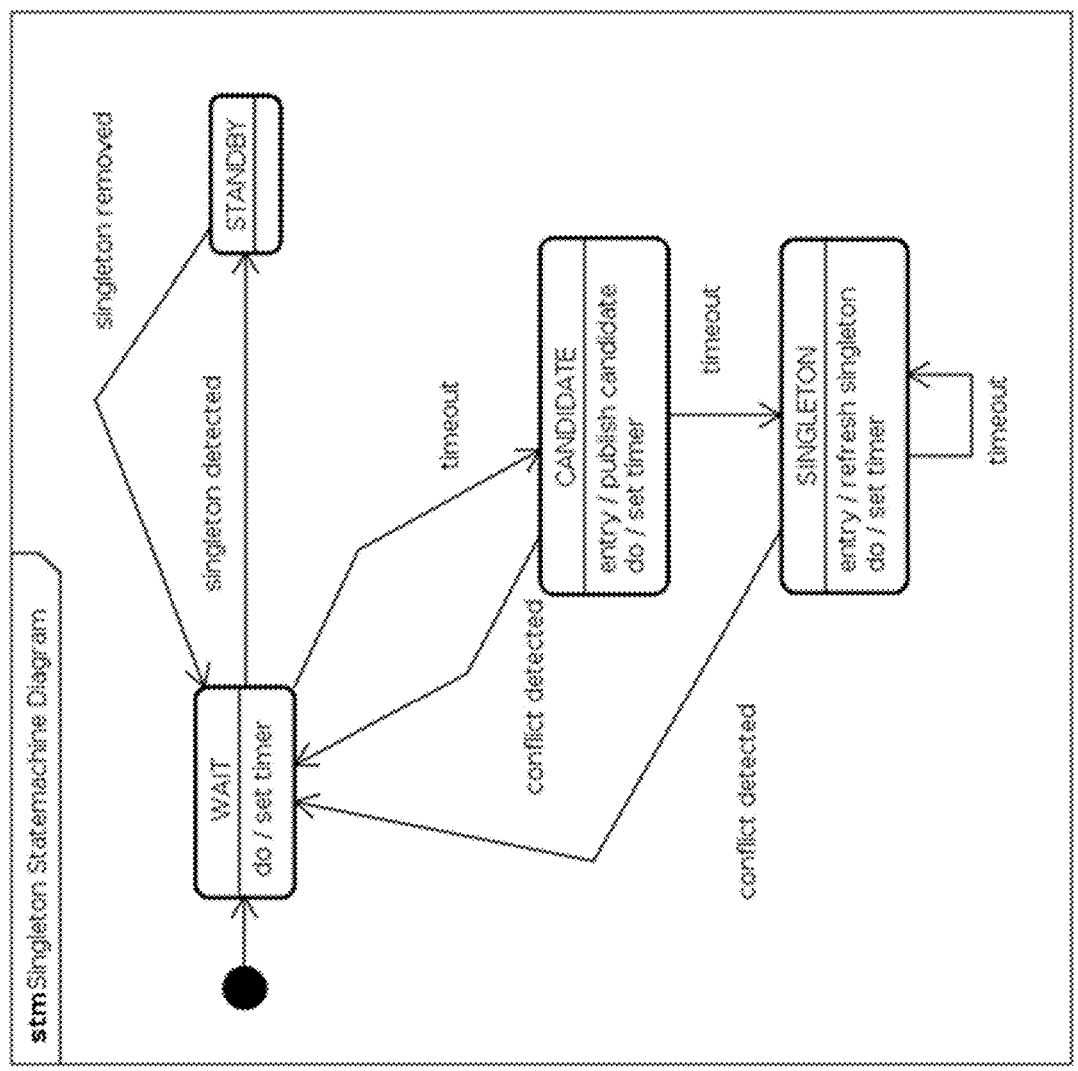
FIG. 36 is a singleton state diagram in accordance to embodiments.

FIG. 36 is a singleton state diagram in accordance to embodiments.

Use-Case Realization—Relational Query Server

Figure 37:
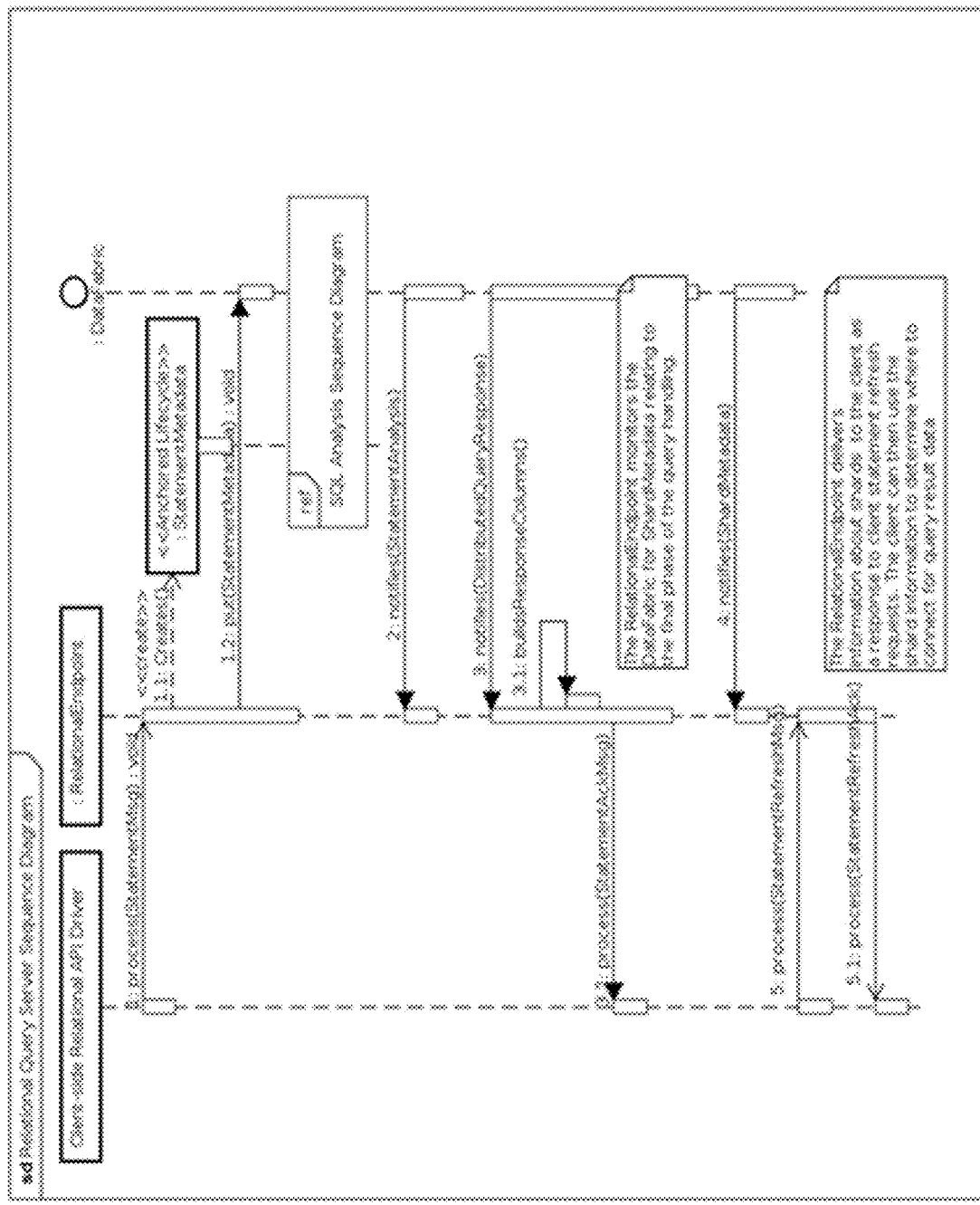
FIG. 37 is a relational query server sequence diagram in accordance to embodiments.

FIG. 37 is a relational query server sequence diagram in accordance to embodiments. Client-side Relational API Driver delivers a statement msg to the RelationalEndpoint. RelationalEndpoint creates an instance of StatementMetadata, publishes the StatementMetadata to the DataFabric, monitors the DataFabric for the corresponding instance of StatementAnalysis and monitors the DataFabric for the corresponding instances of DistributedQueryResponse (one per query table). SQLAnalyzer sends statement response to client.

Figure 38:
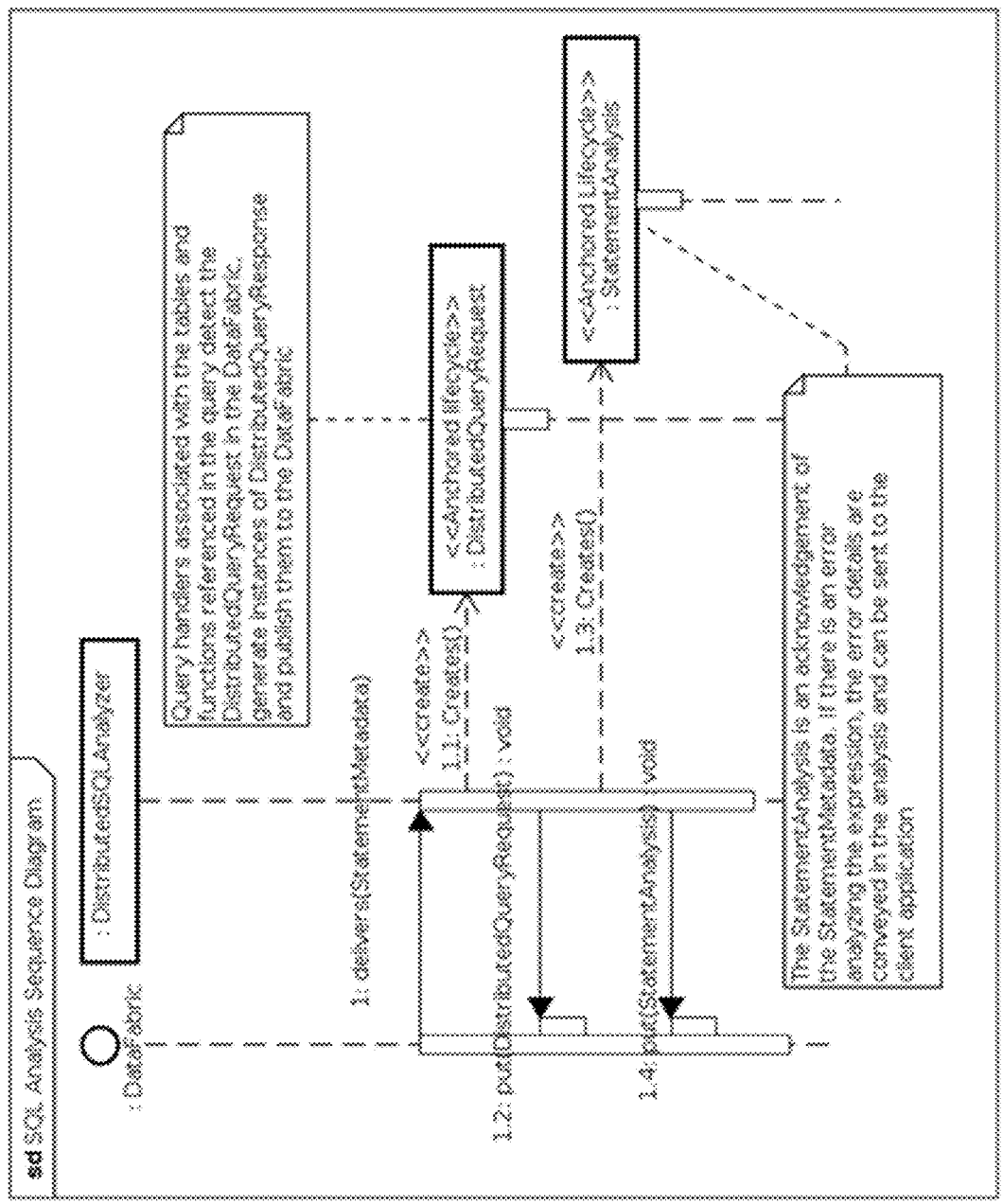
FIG. 38 is a SQL analysis sequence diagram in accordance to embodiments.

FIG. 38 is a SQL analysis sequence diagram in accordance to embodiments. DataFabric delivers to the SQLAnalyzer an instance of StatementMetadata. SQLAnalyzer analyzes the query and produces a DistributedQueryRequest (a serializable object representation of the query). Other micro services (such as orchestration) will detect and process this new query request associated with the statement and session.

SQLAnalyzer publishes the request object to the DataFabric, creates a StatementAnalysis object as a response for the query server handling the client request, and publishes the StatementAnalysis to the DataFabric.

Use-Case Realization—Basic Query Handling

Figure 39:
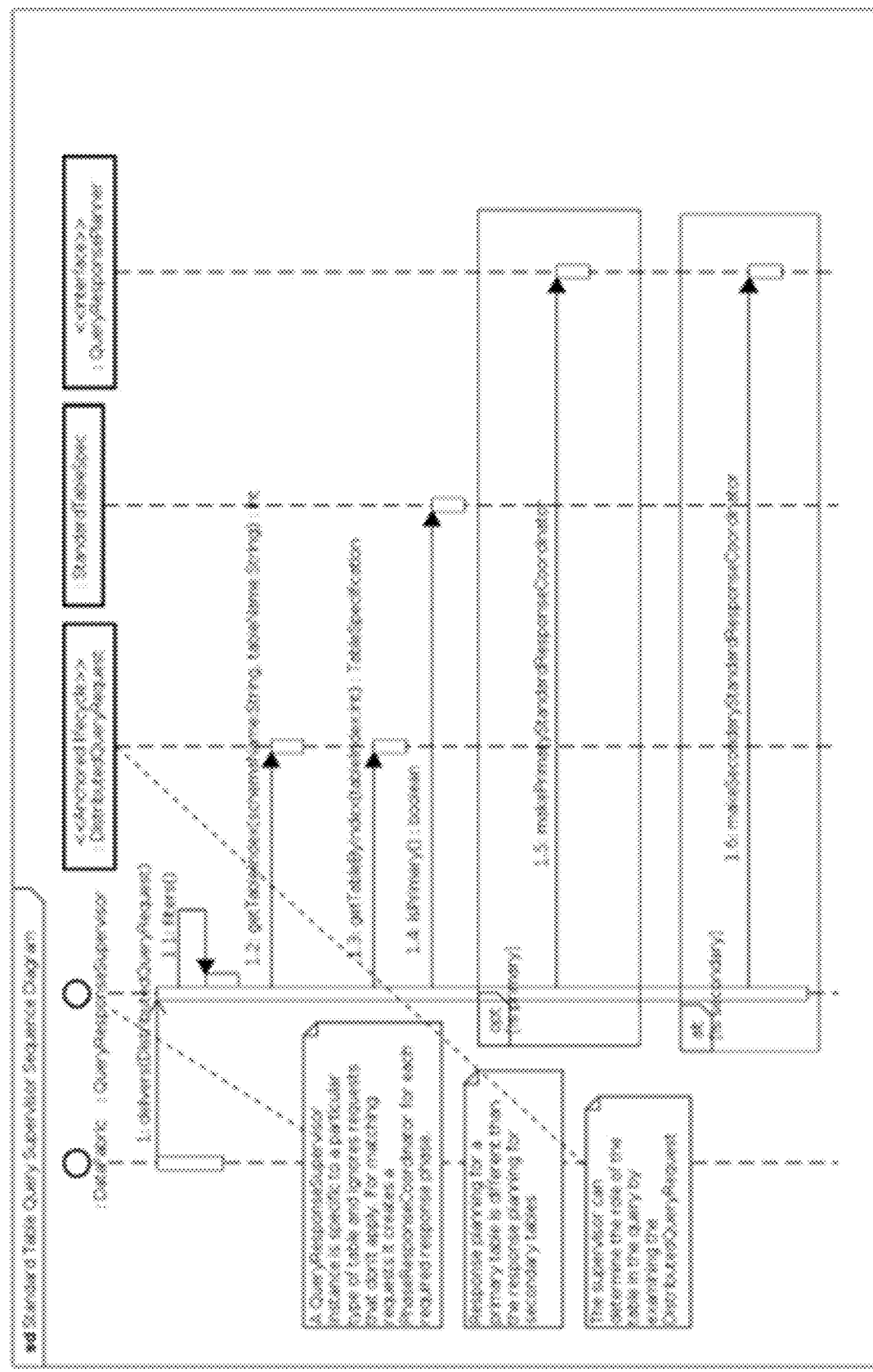
FIG. 39 is a standard table query supervisor sequence diagram in accordance to embodiments.

FIG. 39 is a standard table query supervisor sequence diagram in accordance to embodiments. DataFabric delivers DistributedQueryRequest to the QueryResponseSupervisor. The supervisor discards queries not targeting the table it represents.

QueryResponseSupervisor processes only DistributedQueryRequest instance that apply to the underlying table, analyzes the query to determine how many phases are required and obtains from the QueryAdapter a ResponseCoordinator for each phase, passing references to early phase coordinators to later phase coordinators.

ResponseCoordinator obtains a ColumnCoordinator, obtains a ContentCoordinator, initializes the ColumnCoordinator, initializes the ContentCoordinator. ResponseCoordinator, if not a view-creating query, publishes DistributedQueryResponse with the columns selected by the query in the final phase of processing.

Use-Case Realization—Standard Query Response

Figure 40:
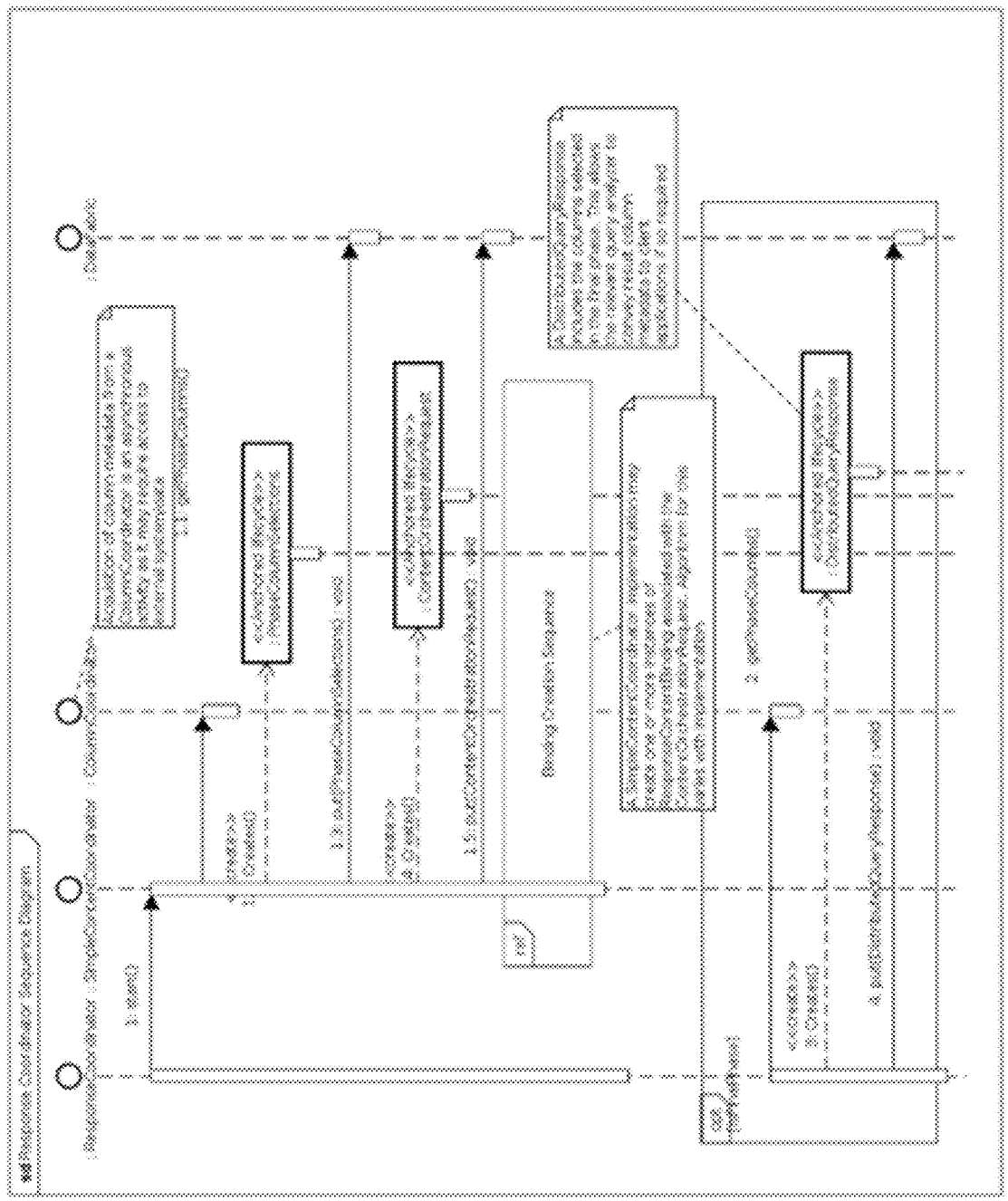
FIG. 40 is a response coordinator sequence diagram in accordance to embodiments.

FIG. 40 is a response coordinator sequence diagram in accordance to embodiments. ResponseCoordinator initializes the ContentCoordinator. SimpleContentCoordinator requests ColumnMetadata from the ColumnCoordinator. ColumnCoordinator ColumnMetadata (the details of this process vary with different implementations of ColumnCoordinator). SimpleContentCoordinator creates PhaseColumnSelections. SimpleContentCoordinator publishes PhaseColumnSelections to the DataFabric. SimpleContentCoordinator creates and publishes a ContentOrchestrationRequest. SimpleContentCoordinator creates and publishes instances of ResponseContentBinding (details vary with implementation). ResponseCoordinator: if this is a final phase, the Response Coordinator obtains the ColumnMetadata and publishes the DistributedQueryResponse to the DataFabric.

Use-Case Realization—Select Specific Columns

Figure 41:
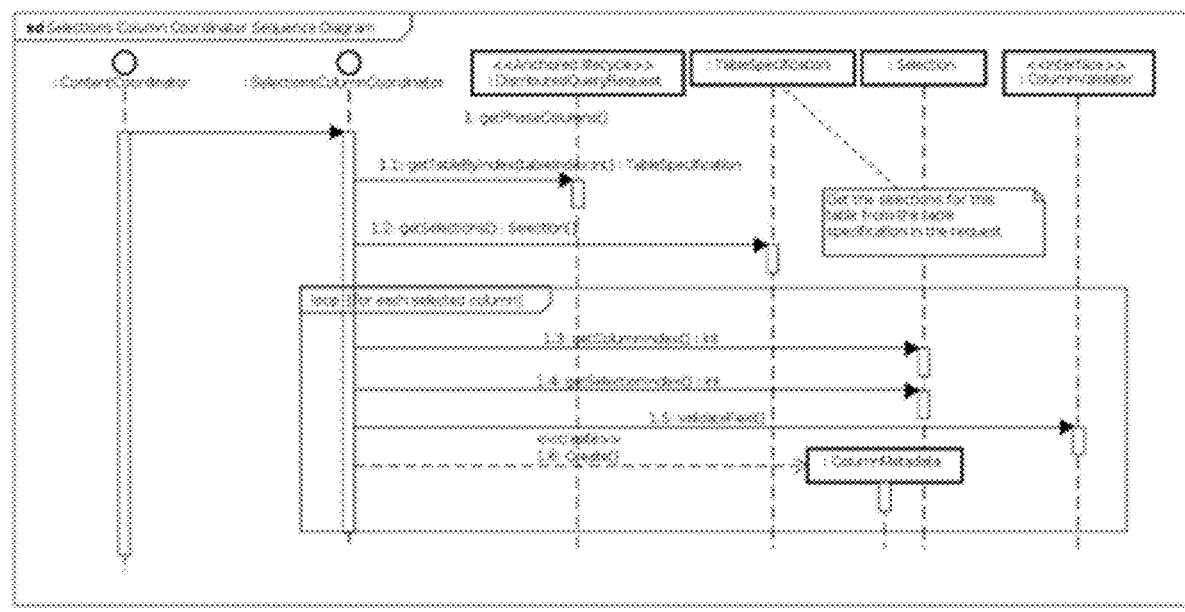
FIG. 41 is a selections column coordinator sequence diagram in accordance to embodiments.

FIG. 41 is a selections column coordinator sequence diagram in accordance to embodiments. ResponseCoordinator initializes SelectionsColumnCoordinator. SelectionsColumnCoordinator extracts the column selections for the relevant table from the DistributedQueryRequest, for each selection the column is validated by name with the ColumnValidator. The FieldMetadata that results from column validation is used to create ColumnMetadata. The resulting collection of ColumnMetadata is used to create an instance of PhaseColumnSelections. The instance of PhaseColumnSelections is published to the DataFabric.

Use-Case Realization—Select all Columns from a Table

Figure 42:
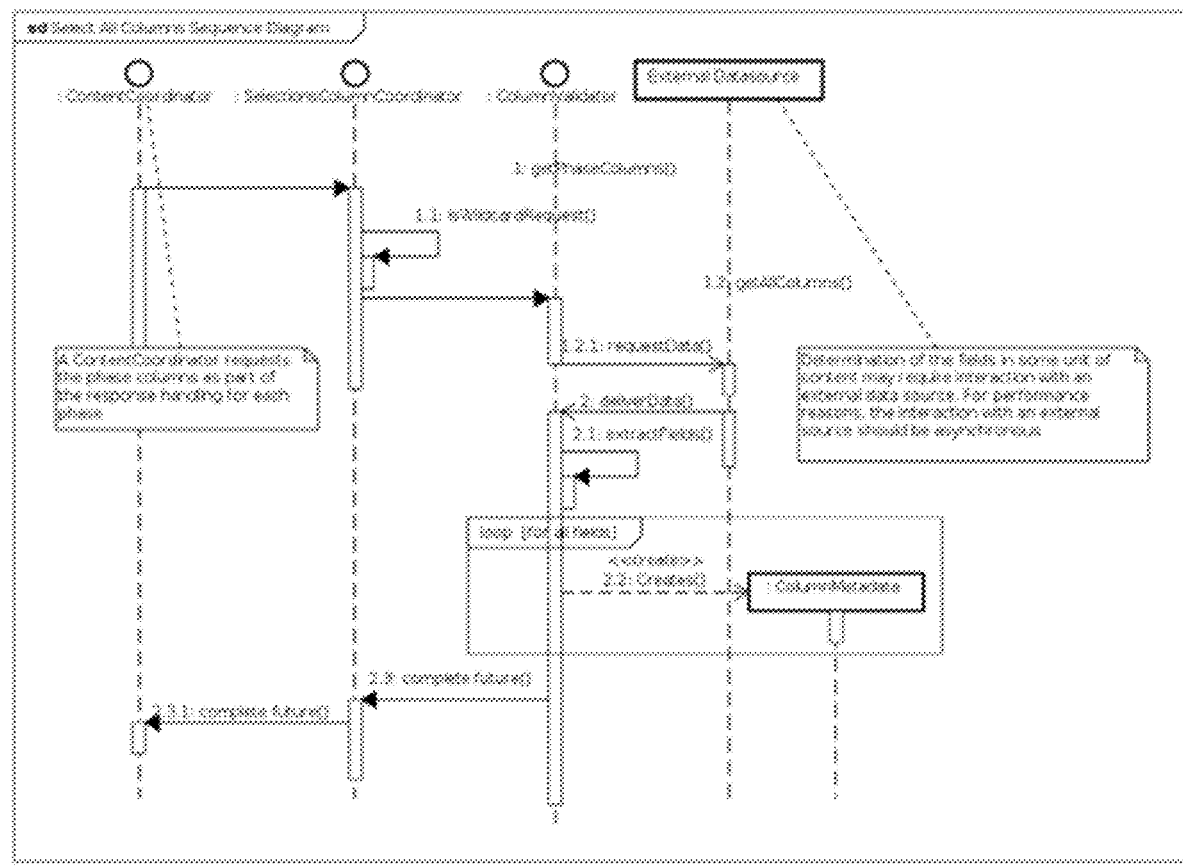
FIG. 42 is a select all columns sequence diagram in accordance to embodiments.

FIG. 42 is a select all columns sequence diagram in accordance to embodiments. ColumnCoordinator detects wild-card expression "*" and requests all columns from ColumnValidator. N.B. response may be asynchronous. ColumnValidator requests requested content and, when available, analyzes the content to extract the fields and obtain a collection of FieldMetadata. ColumnCoordinator for each field constructs a ColumnMetadata, uses the set of ColumnMetadata to create a PhaseColumnSelections and publishes the PhaseColumnSelections to the DataFabric.

Use-Case Realization—Select Specific Keys

Figure 43:
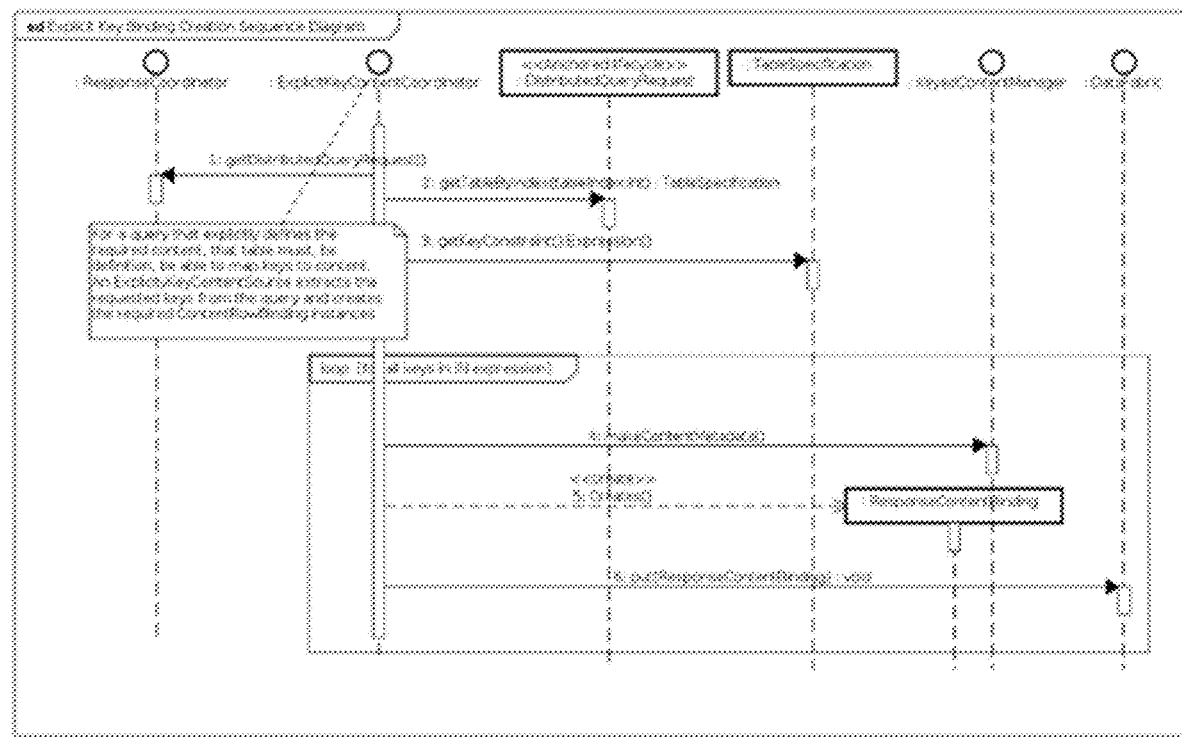
FIG. 43 is an explicit key selection content coordinator sequence diagram in accordance to embodiments.

FIG. 43 is an explicit key selection content coordinator sequence diagram in accordance to embodiments. ResponseCoordinator initializes EplicitKeyContentCoordinator. ExplicitKeyContentCoordinator obtains query request from response coordinator and extracts key constraint for the primary table. ExplicitKeyContentCoordinator for each explicit key uses the KeyedContentManager to obtain the corresponding ContentMetadata. ExplicitKeyContentCoordinator for each ContentMetadata, creates a ResponseContentBinding and publishes to the DataFabric.

Use-Case Realization—Select all Keys

Figure 44:
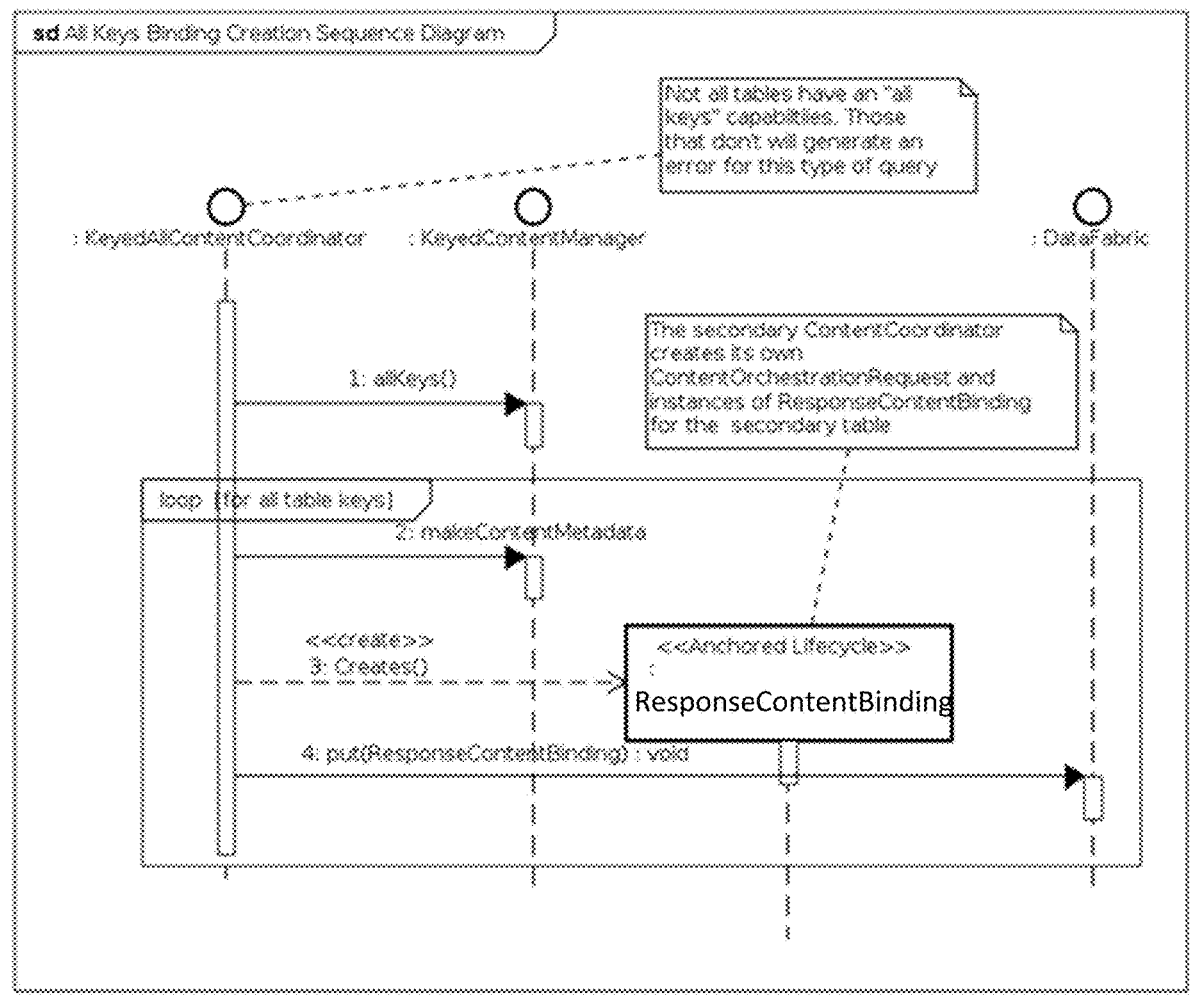
FIG. 44 is an all keys content coordinator sequence diagram in accordance to embodiments.

FIG. 44 is an all keys content coordinator sequence diagram in accordance to embodiments. KeyedAllContentCoordinator requests all keys from KeyedContentManager. KeyedAllContentCoordinator requests ContentMetadata instances for all keys, creates a ResponseContentBinding for each key/ContentMetadata and publishes to the DataFabric.

Use-Case Realization—Orchestration Request Handling

Figure 45:
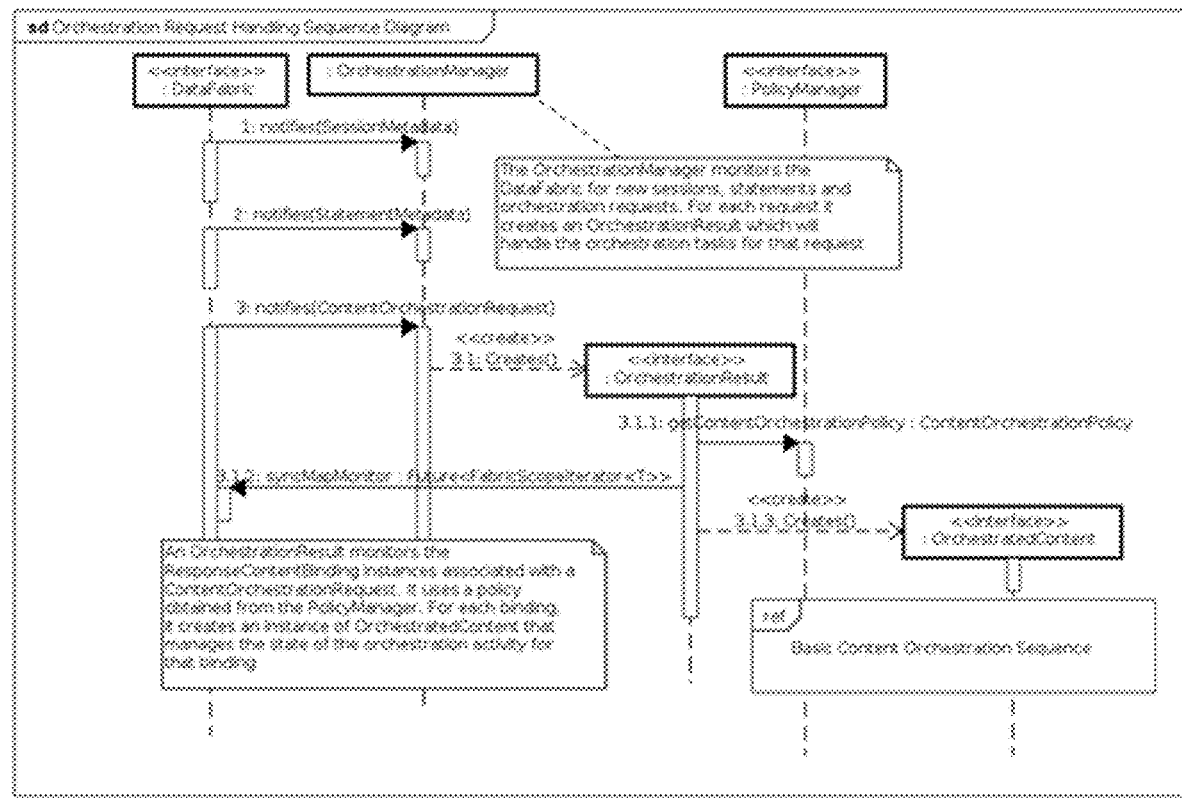
FIG. 45 is an orchestration request handling sequence diagram in accordance to embodiments.

FIG. 45 is an orchestration request handling sequence diagram in accordance to embodiments. DataFabric notifies OrchestrationManager with new instance of SessionMetadata. OrchestrationManager creates a new SessionMonitor. DataFabric notifies SessionMonitor with a new instance of StatementMetadata. SessionMonitor creates a StatementMonitor. DataFabric notifies StatementMonitor with a new ContentOrchestrationRequest. StatementMonitor creates an OrchestrationResult. OrchestrationResult acquires a ContentOrchestrationPolicy from the PolicyStore. PolicyManager creates a suitable ContentOrchestrationPolicy DataFabric OrchestrationResult obtains the current set of ResponseContentBinding instances from the DataFabric and processes subsequence add and remove events received from the DataFabric. OrchestrationResult for each ResponseContentBinding, creates an instance of OrchestratedContent which executes the Basic Content Orchestration Sequence.

Use-Case Realization—Basic Content Orchestration

Figure 46:
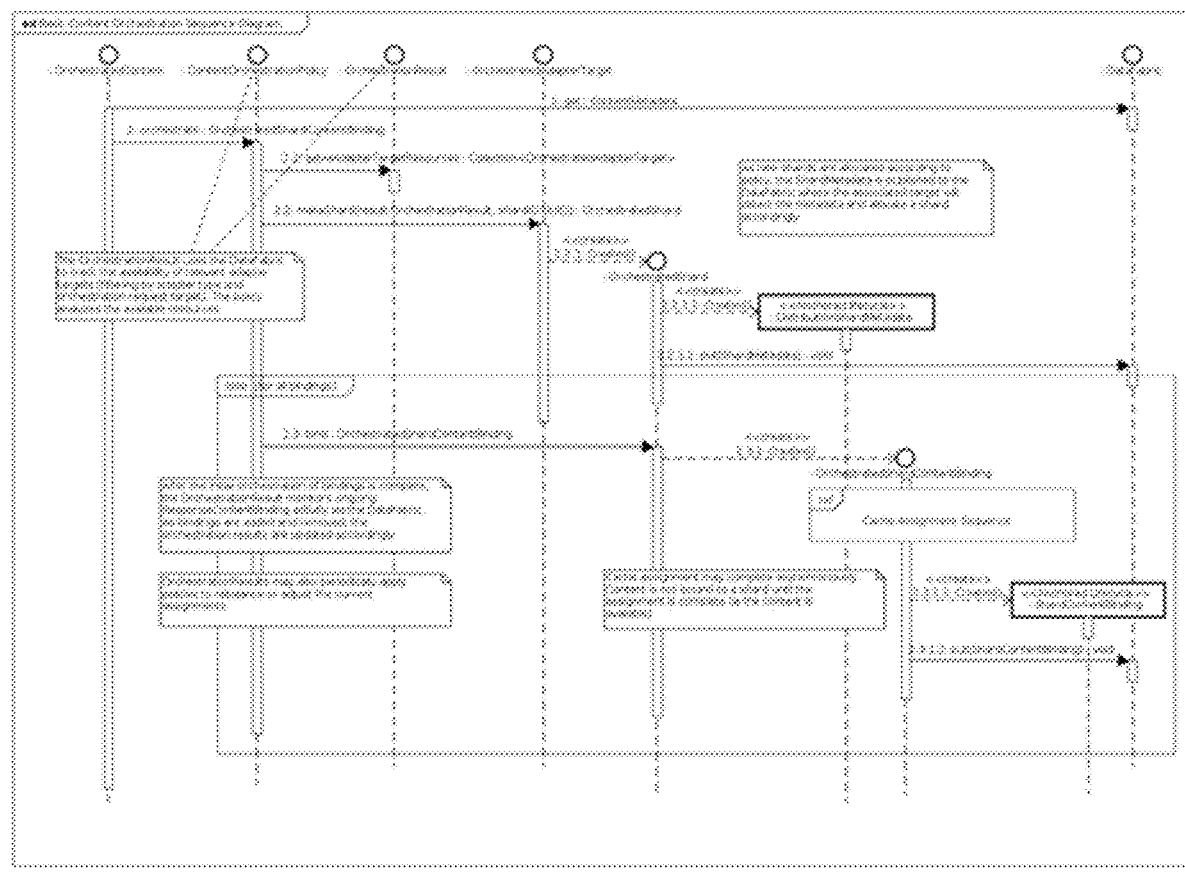
FIG. 46 is an basic content orchestration sequence diagram in accordance to embodiments.

FIG. 46 is an basic content orchestration sequence diagram in accordance to embodiments. OrchestratedContent locates ContentMetadata using the typeID from the ContentOrchestrationRequest and the contentID from the ResponseContentBinding. OrchestratedContent uses the ContentMetadata to obtain a OrchestratedShardContentBinding from the ContentOrchestrationPolicy. ContentOrchestrationPolicy selects an existing or new AdapterTargetResource, depending on policy. The OrchestrationResult provides access to available resources, represented as instances of AdapterTargetResource.

ContentOrchestrationPolicy selects an existing or new ShardResource, depending on policy, a new shard publishes ShardMetadata binding the shard to a target. OrchestratedShard creates a ShardContentBindingResource, incrementing orchestration sequence number. OrchestratedShardContentBinding initiates a cache assignment sequence binding content to an adapter cache. OrchestratedShardContentBinding creates ShardContentBinding and publishes ShardContentBinding. OrchestratedContent monitors response binding and cache binding.

Use-Case Realization—Cache Assignment

Figure 47:
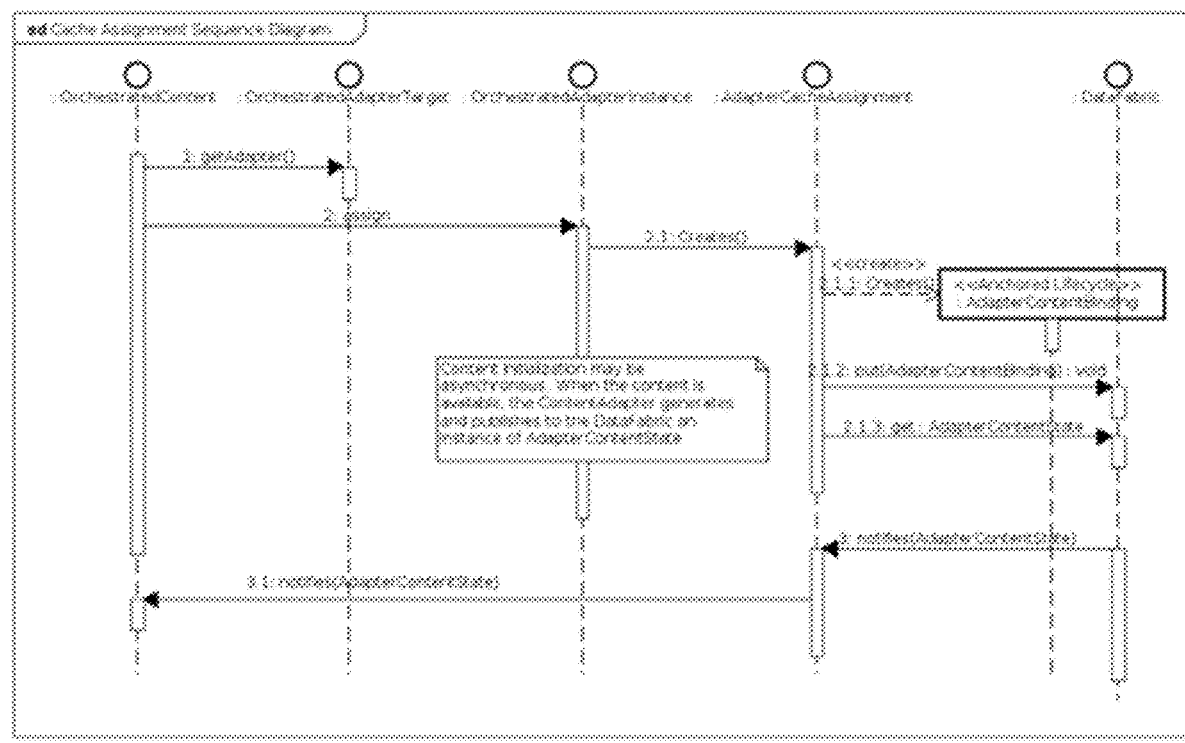
FIG. 47 is an cache assignment sequence diagram in accordance to embodiments.

FIG. 47 is an cache assignment sequence diagram in accordance to embodiments. OrchestratedContent, having been assigned to a OrchestratedAdapterTarget by an orchestration policy, the OrchestratedAdapterInstance is obtained. OrchestratedContent requests an assignment from the OrchestratedAdapterInstance, resulting in an instance of AdapterCacheAssignment whose purpose is to track the state of the cache assignment. OrchestratedAdapterInstance creates an assignment. AdapterCacheAssignment creates an AdapterContentBinding. AdapterCacheAssignment publishes the AdapterContentBinding to the DataFabric.

AdapterCacheAssignment monitors the DataFabric for the corresponding AdapterContentState, and notifies the OrchestratedContent to proceed.

Use-Case Realization—Basic Content Creation

Figure 48:
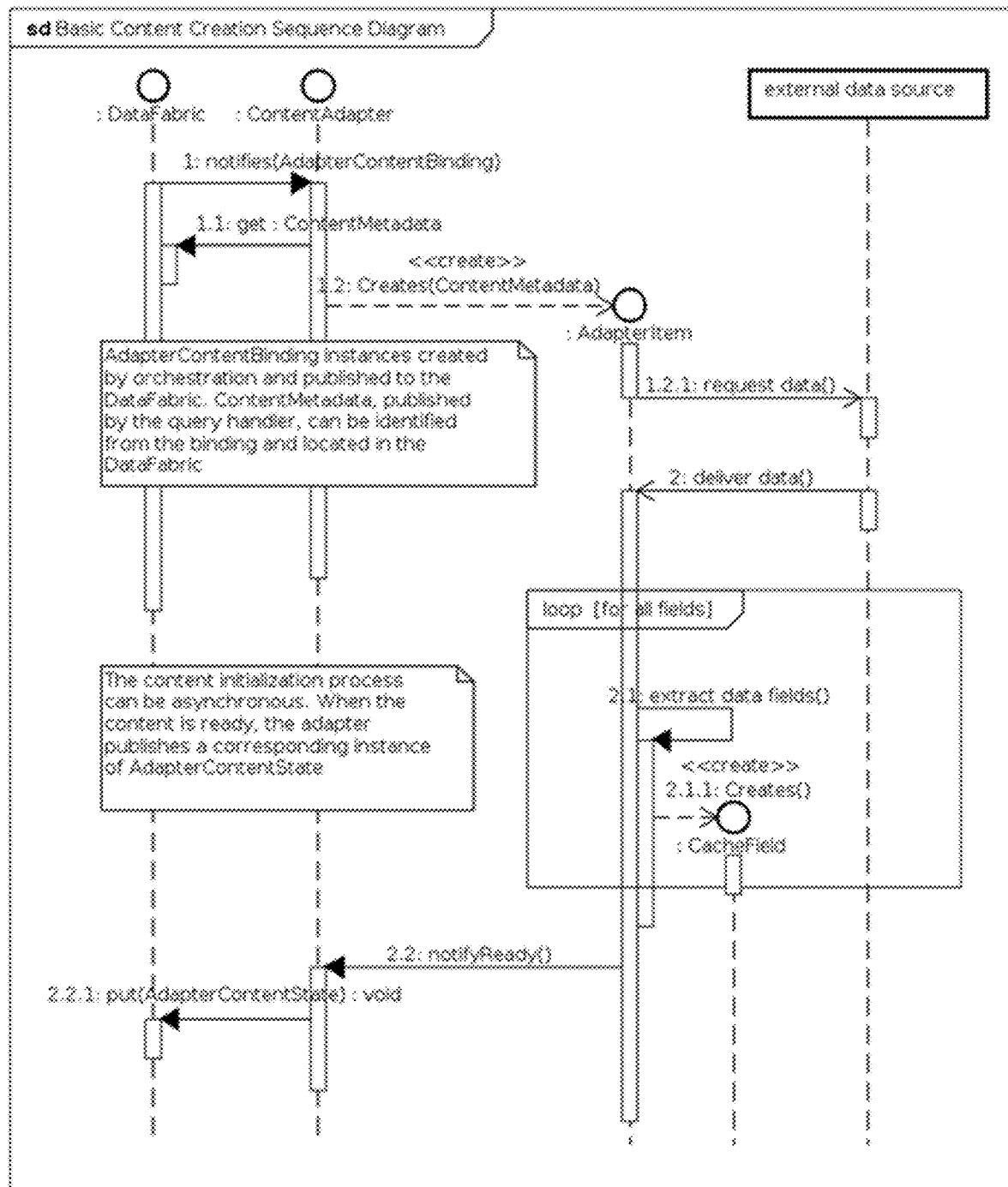
FIG. 48 is an content creation sequence diagram in accordance to embodiments.

FIG. 48 is an content creation sequence diagram in accordance to embodiments. DataFabric notifies ContentAdapter with new AdapterContentBinding. ContentAdapter locates ContentMetadata (previously constructed by query handler) using content ID from the binding and creates an AdapterItem. AdapterItem retrieves data from a data source as appropriate and creates necessary CacheField instances.

AdapterItem constructs or obtains FieldMetadata for each field. FieldMetadata references can be shared across many different CacheField instances. AdapterItem dispatches pre and post image events to registered instance of AdapterItemClient. AdapterItem obtains Subject from client and performs access checks with the SubjectAccessController associated with the ContentAdapter and indicates ready state to ContentAdapter ContentAdapter creates AdapterContentState and publishes AdapterContentState to DataFabric. AdapterItem monitors any events from the data source and dispatches pre and post update events to client—incrementing the sequence number and updating fields as necessary.

Figure 49:
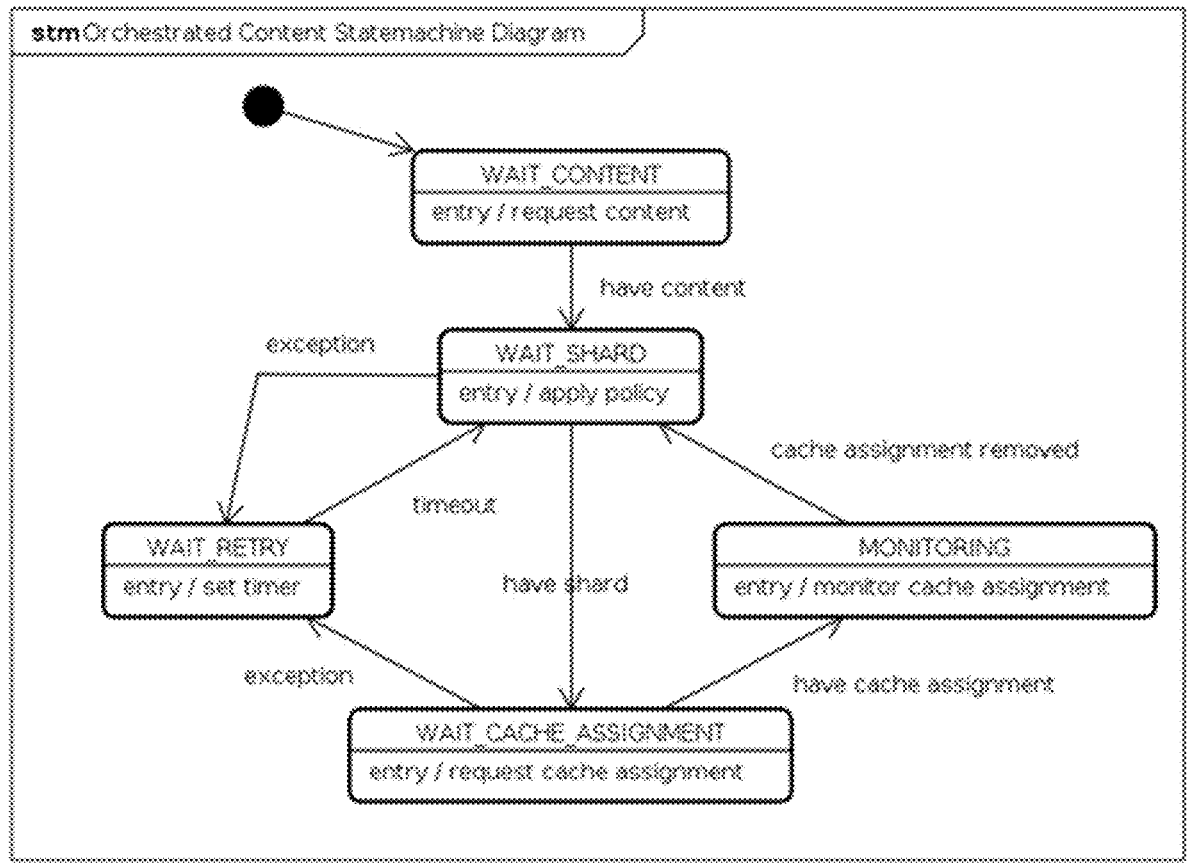
FIG. 49 is an initial content orchestration state diagram in accordance to embodiments.

FIG. 49 is an initial content orchestration state diagram in accordance to embodiments.

Use-Case Realization—Refresh Shard Binding Initialization

Figure 50:
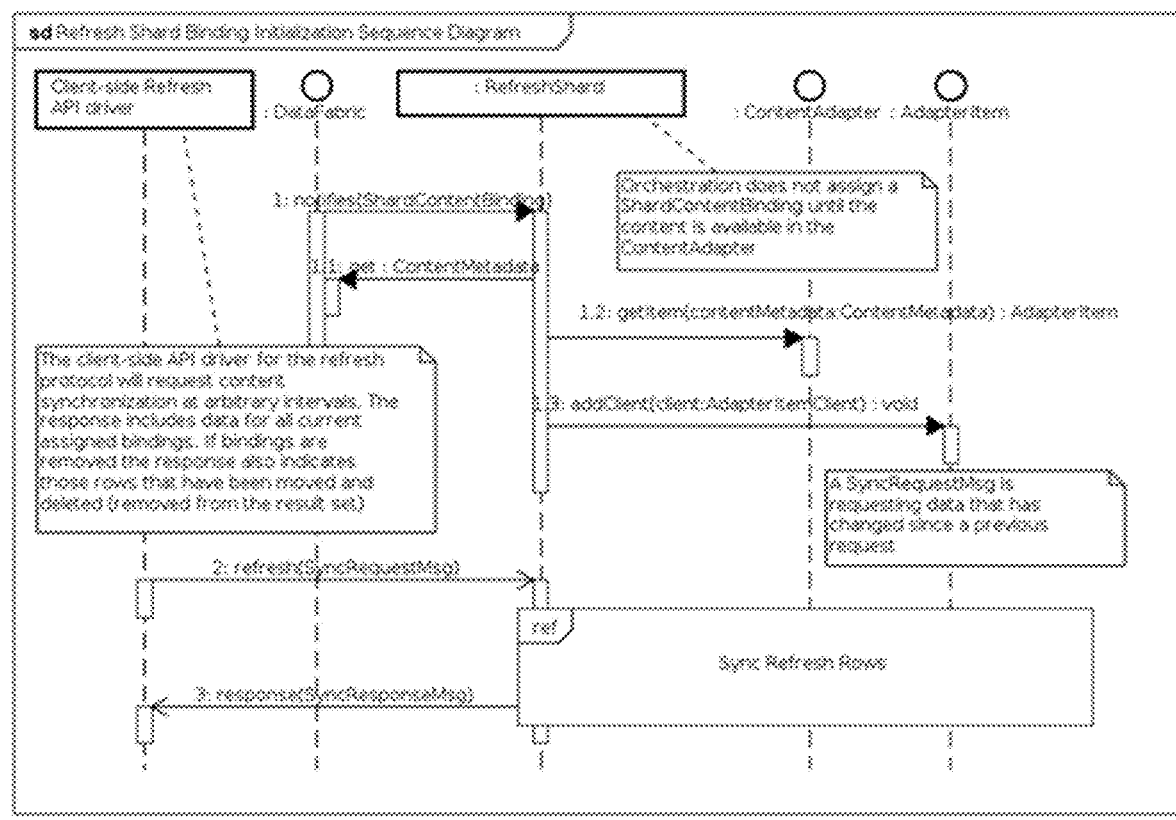
FIG. 50 is a refresh shard binding initialization sequence diagram in accordance to embodiments.

FIG. 50 is a refresh shard binding initialization sequence diagram in accordance to embodiments. DataFabric notifies RefreshShard with new ShardContentBinding. RefreshShard uses content identifier from AdapterContentReference in ShardContentBinding to obtain ContentMetadata from the DataFabric. RefreshShard uses the content table ID from the AdapterContentReference. RefreshShard locates the required ContentAdapter and obtains an AdapterItem. RefreshShard registers with the AdapterItem.

Client-Side Refresh API Driver: At some point, the client-side application requests a refresh which results in a SyncRequestMsg. See Sync Refresh Shard Rows Sequence Diagram.

Use-Case Realization—Sync Refresh Shard Rows

Figure 51:
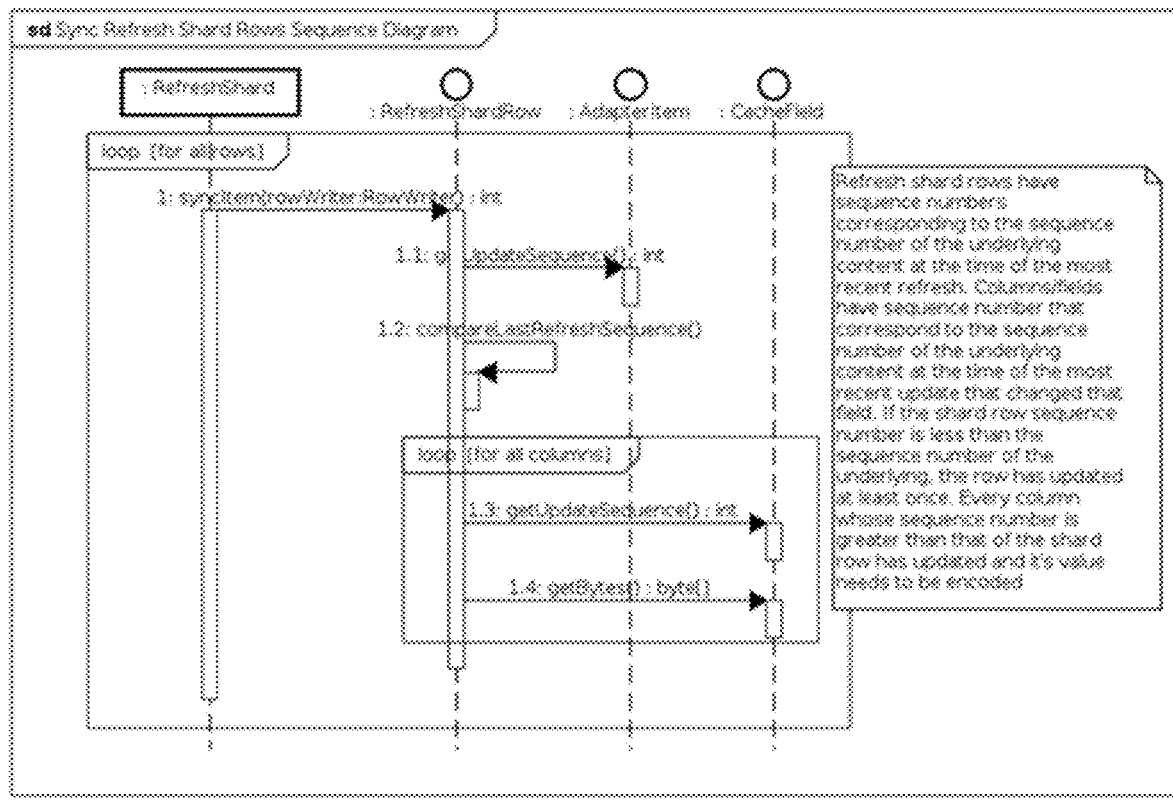
FIG. 51 is a synchronized refresh shard rows sequence diagram in accordance to embodiments.

FIG. 51 is a synchronized refresh shard rows sequence diagram in accordance to embodiments. RefreshShard triggered by a client-side refresh request, the RefreshShard visits all rows. For each row, the shard compares the sequence number cached in the shard for that row with the sequence number of the adapter item. If the sequence number is the same, the item has not changed and no data is required for that row.

RefreshShard: For each row where the underlying item has updated, the shard iterates over the columns/fields associated with the shard (shard columns are driven by the query) and compares the stored shard sequence number with the sequence number associated with the CacheField in the AdapterItem. If the CacheField has a higher sequence number it has been updated and the data is encoded.

RefreshShard: As the shard finishes with each row it updates the stored sequence number to be the same as that of the AdapterItem. RefreshShard: The encoded data is sent to the client as a response to the refresh request.

Use-Case Realization—Orchestration Result Re-Balancing

Figure 52:
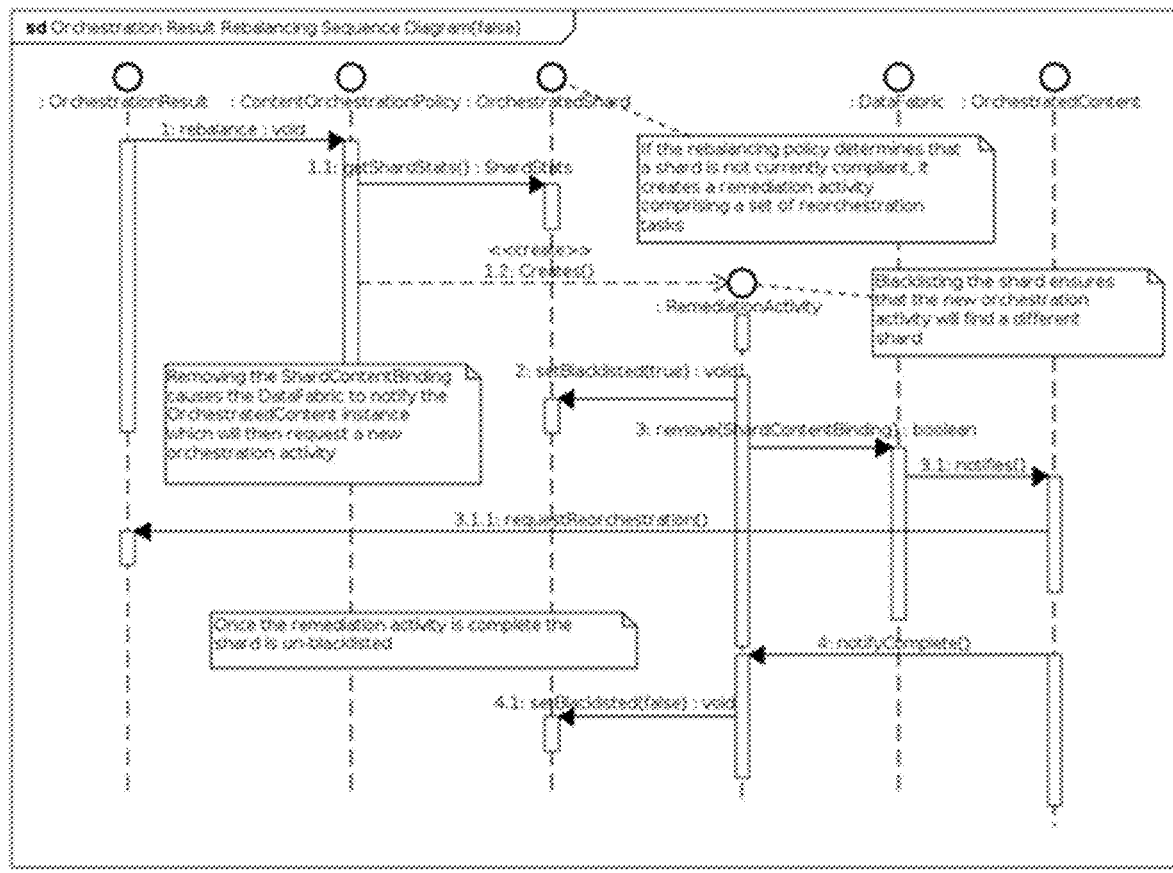
FIG. 52 is an orchestration result re-balancing sequence diagram in accordance to embodiments.

FIG. 52 is an orchestration result re-balancing sequence diagram in accordance to embodiments. OrchestrationResult initiates policy-based assessment of current orchestration. ContentOrchestrationPolicy obtains result shards to assess metrics vs targets, assesses operational metrics vs policy requirements (e.g., bandwidth per shard within tolerances), for each adjustment (move), the policy creates a remediation activity, and for each shard impacted the shard is blacklisted, removing it from consideration during remediation.

OrchestrationResult passes activity to OrchestrationContext. OrchestrationContext queues activity by priority and tracks completion of all activities relating to rebalancing and removes any shard blacklisting.

Use-Case Realization—Refresh Protocol Content Relocation

Figure 53:
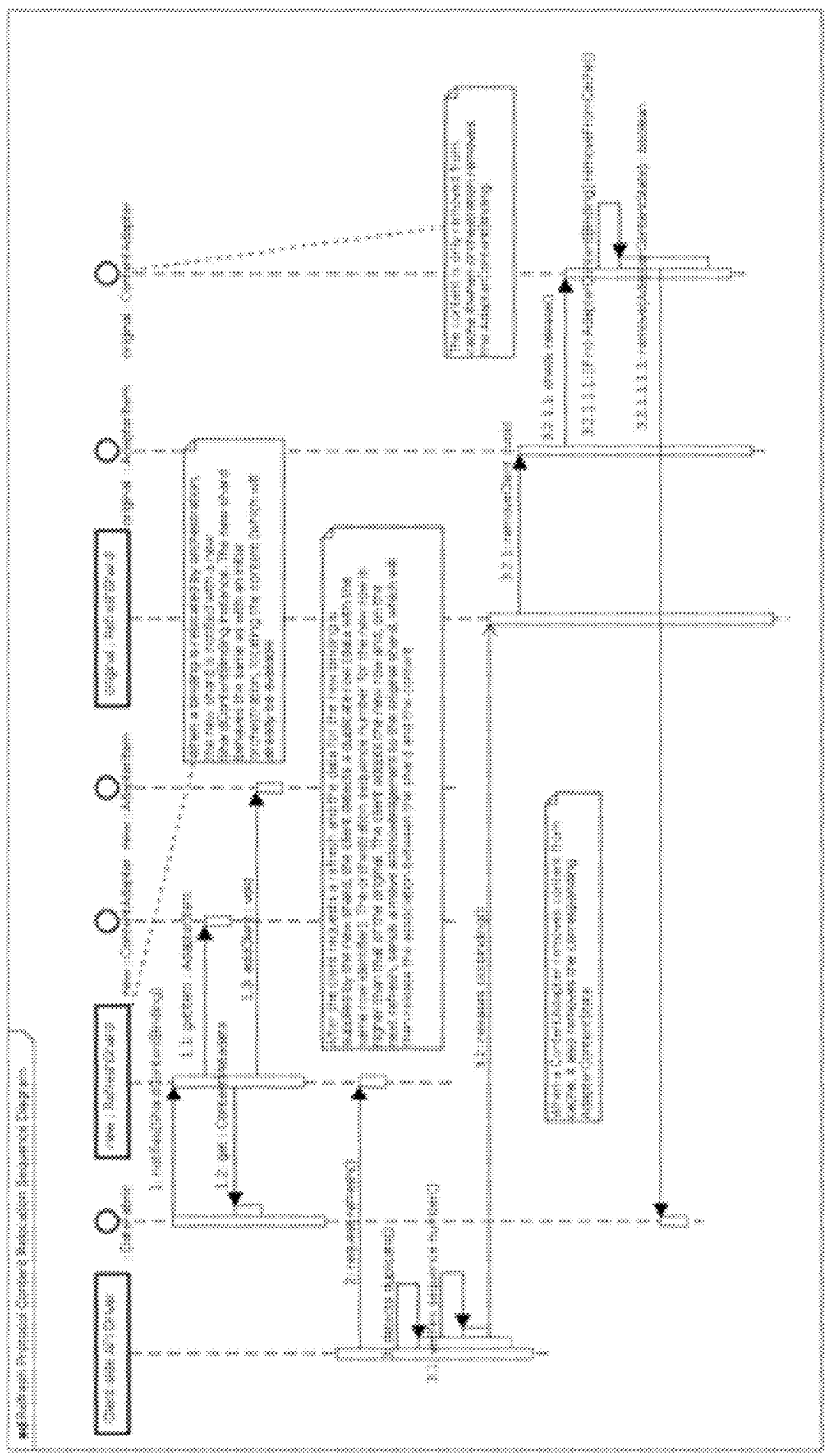
FIG. 53 is a refresh protocol content relocation sequence diagram in accordance to embodiments.

FIG. 53 is a refresh protocol content relocation sequence diagram in accordance to embodiments. As a result of orchestration rebalancing activity, DataFabric delivers "new" ShardContentBinding to the target DistributionShard. The content reference in this binding is, by definition, a duplicate. The original content binding is an association between the content and some other shard. N.B. The move may not be a cache relocation but rather just a move to a new shard associated with the existing cache.

Shard obtains required content from the appropriate ContentAdapter and connects to content. Client-Side Refresh API Driver: at some arbitrary time, the client-side driver issues a routine refresh request. Shard sends content for all bindings, including the new binding. Responses include row-level orchestration sequence number.

Client-Side Refresh API Driver detects a duplication binding and checks sequence number against the original. Sends a move acknowledgement to the original shard location for the new binding. Shard disconnects from the original content instance If AdapterItem sees no interest from other clients will check for release with ContentAdapter. ContentAdapter will release content if there is no longer an AdapterContentBinding (it would have been removed by orchestration for content relocation). If released, the AdapterContentState is removed from the DataFabric. N.B. Orchestration algorithms are in charge of removing the AdapterContentBinding. Typically, such a removal would happen after some grace period during which the content is not being used but is still available. Algorithms and timing for cache removal may vary by table.

Use-Case Realization—Orchestration Adapter Re-Balancing

Figure 54:
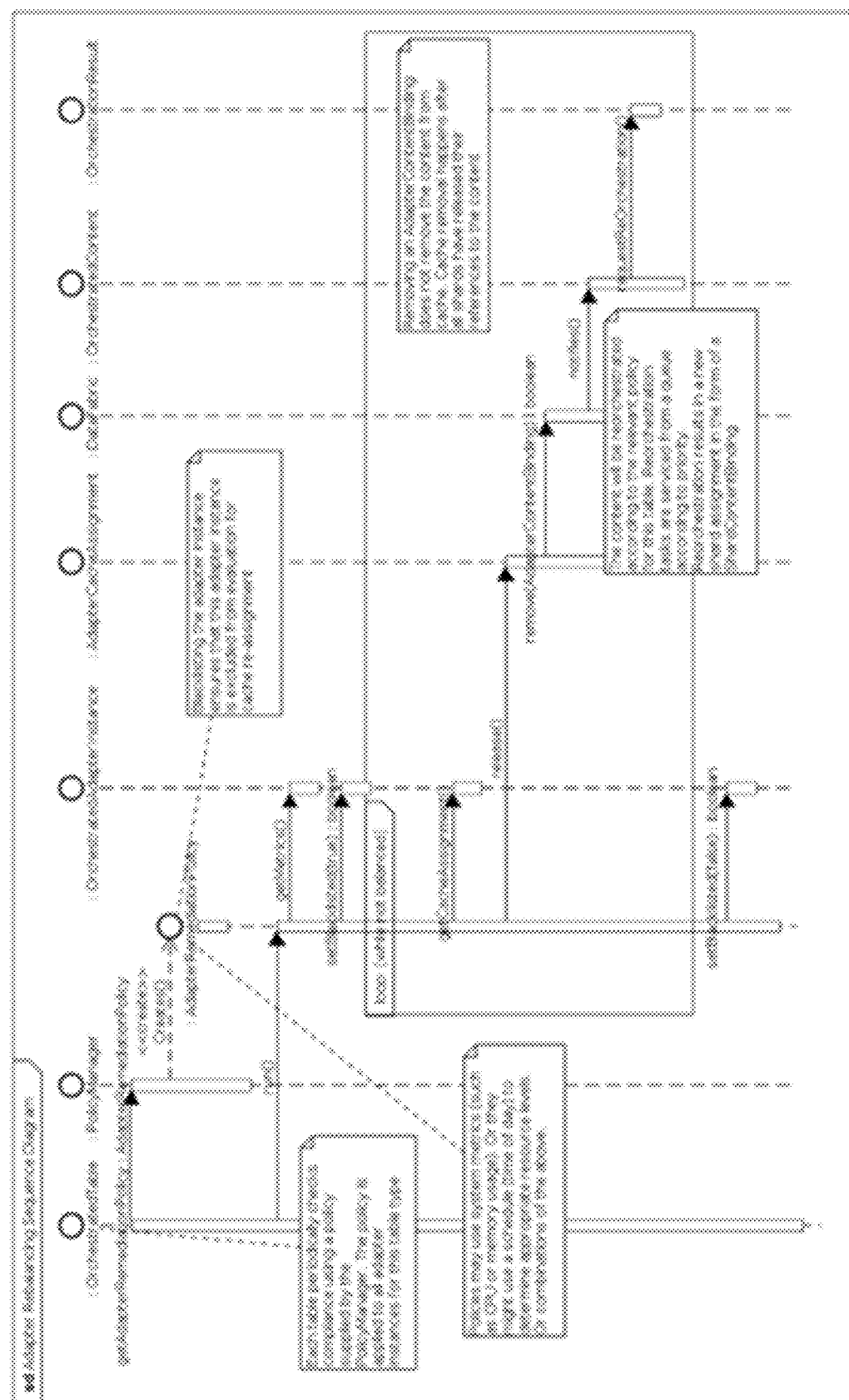
FIG. 54 is an orchestration adapter re-balancing sequence diagram in accordance to embodiments.

FIG. 54 is an orchestration adapter re-balancing sequence diagram in accordance to embodiments. OrchestratedTable initiates balance check by requesting a policy from the PolicyManager. PolicyManager creates an AdapterRemediationPolicy. AdapterRemediationPolicy assess adapter metrics maintained in the OrchestratedTable, determines that an adapter is out of compliance with the policy (e.g., resource consumption is too high) and blacklists the adapter. AdapterRemediationPolicy chooses which content to move and releases cache assignment for impacted content.

AdapterCacheAssignment removes AdapterContentBinding from the DataFabric. DataFabric Notifies OrchestratedContent. OrchestratedContent requests rebalancing. OrchestratedTable, when all tasks are complete, un-blacklists adapter.

Use-Case Realization—Auto-Scaling Up

Figure 55:
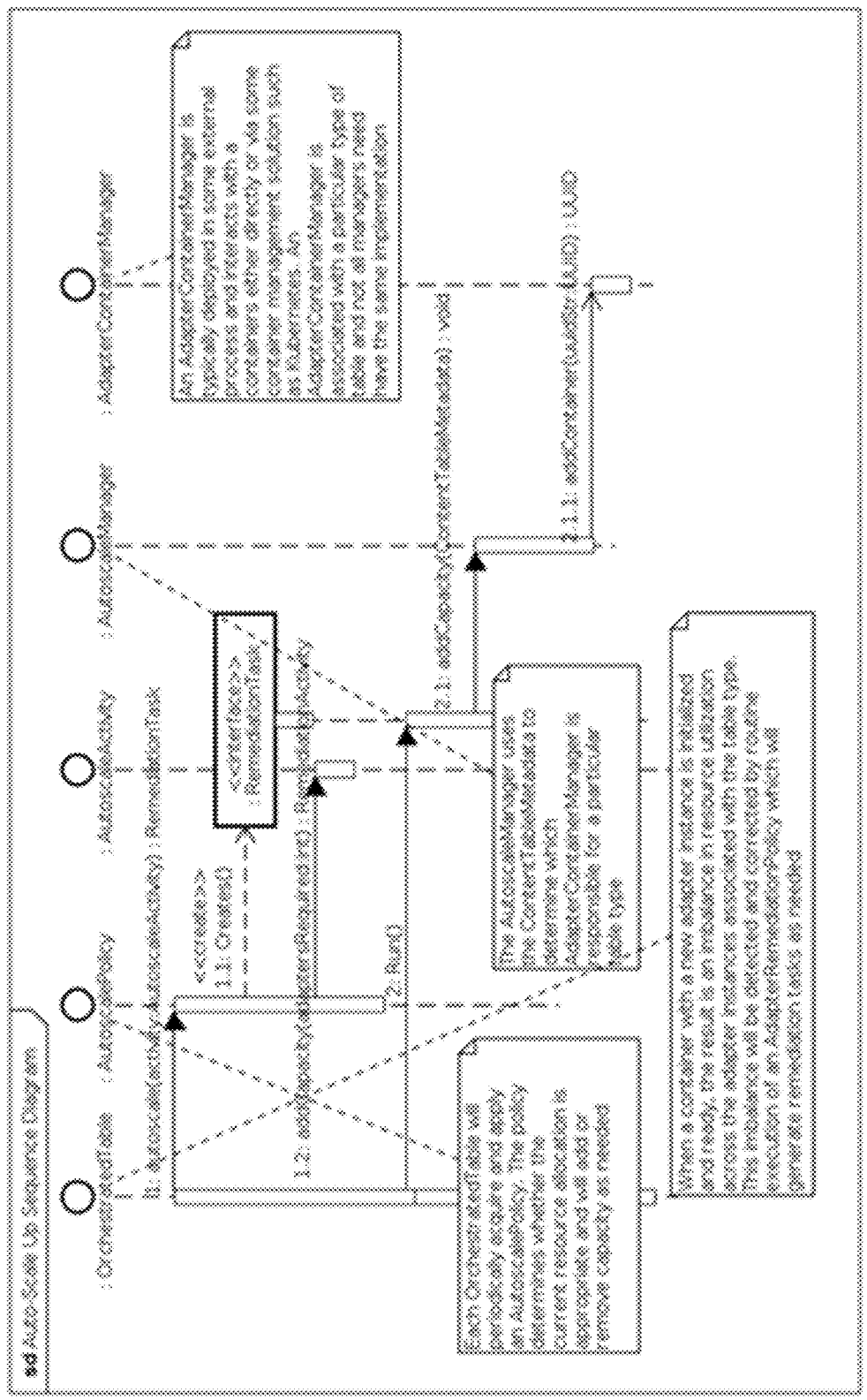
FIG. 55 is an auto-scale up sequence diagram in accordance to embodiments.

FIG. 55 is an auto-scale up sequence diagram in accordance to embodiments. OrchestratedTable periodically requests an analysis by its associated AutoscalePolicy by assigning an AutoscaleActivity that results zero or more remediation tasks (the activity collects and tracks RemediationTasks). AutoscalePolicy assesses various metrics available from the OrchestratedTable (such as memory and cpu consumption) and determines that additional capacity is required. AutoScalePolicy creates a RemediationTask to add capacity. AutoScalePolicy assigns the task to the AutoscaleActivity. AutoscaleActivity requests more capacity from the AutoscaleManager.

AutoscaleManager identifies and communicates with a table-specific AdapterContainerManager to request the launch of an additional container that will provide more resource for the target table. OrchestratedTable, subsequently, when the new container is fully initialized, orchestration algorithms will detect additional capacity and an imbalance in resource assignments, resulting in various re-balancing tasks.

Use-Case Realization—Auto-Scaling Down

Figure 56:
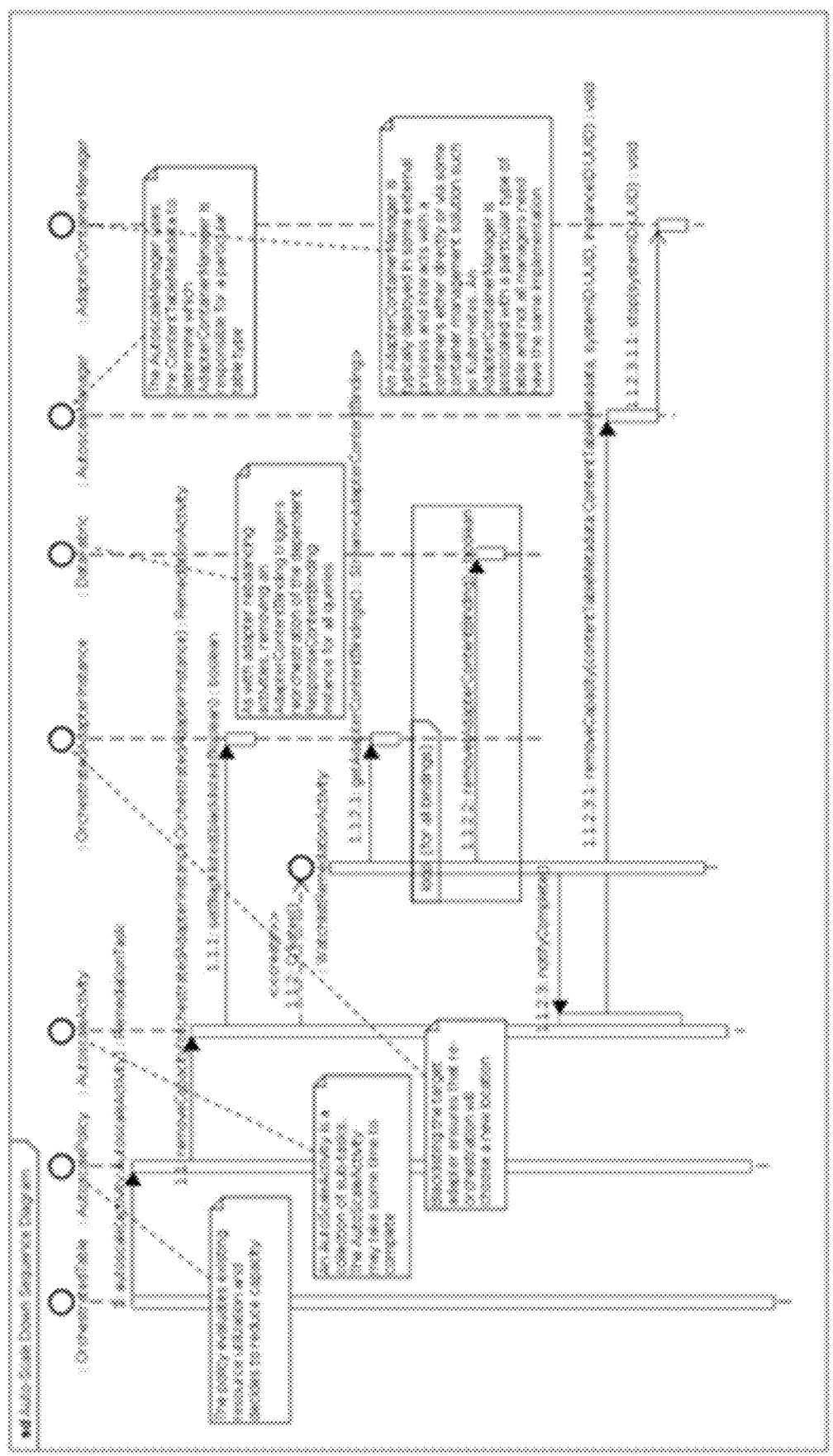
FIG. 56 is an auto-scale down sequence diagram in accordance to embodiments.

FIG. 56 is an auto-scale down sequence diagram in accordance to embodiments. OrchestratedTable periodically requests an analysis by its associated AutoscalePolicy by assigning an AutoscaleActivity that results zero or more remediation tasks (the activity collects and tracks RemediationTasks). AutoscalePolicy assesses various metrics available from the OrchestratedTable (such as memory and CPU consumption) and determines that the system has excess capacity, creates a RemediationTask to remove capacity, identifying a specific instance of OrchestratedAdapterInstance, assigns the task to the AutoscaleActivity. AutoscaleActivity blacklists the target OrchestratedAdapterInstance, making it ineligible for content assignments, obtains the complete set of AdapterContentBindings from the OrchestratedAdapterInstance and removes them all from the DataFabric. This results in a set of RemediationTasks that are tracked to completion.

AutoscaleActivity: Once the remediation tasks are complete (all content has been relocated) the AutoscaleActivity requests that the AutoscaleManager remove the container associated with the OrchestratedAdapterInstance. AutoscaleManager identifies and communicates with a table-specific AdapterContainerManager to request the wind-down of the container associated with the OrchestratedAdapterInstance (using the systemID associated with the instance).

Use-Case Realization—Query Release

Figure 57:
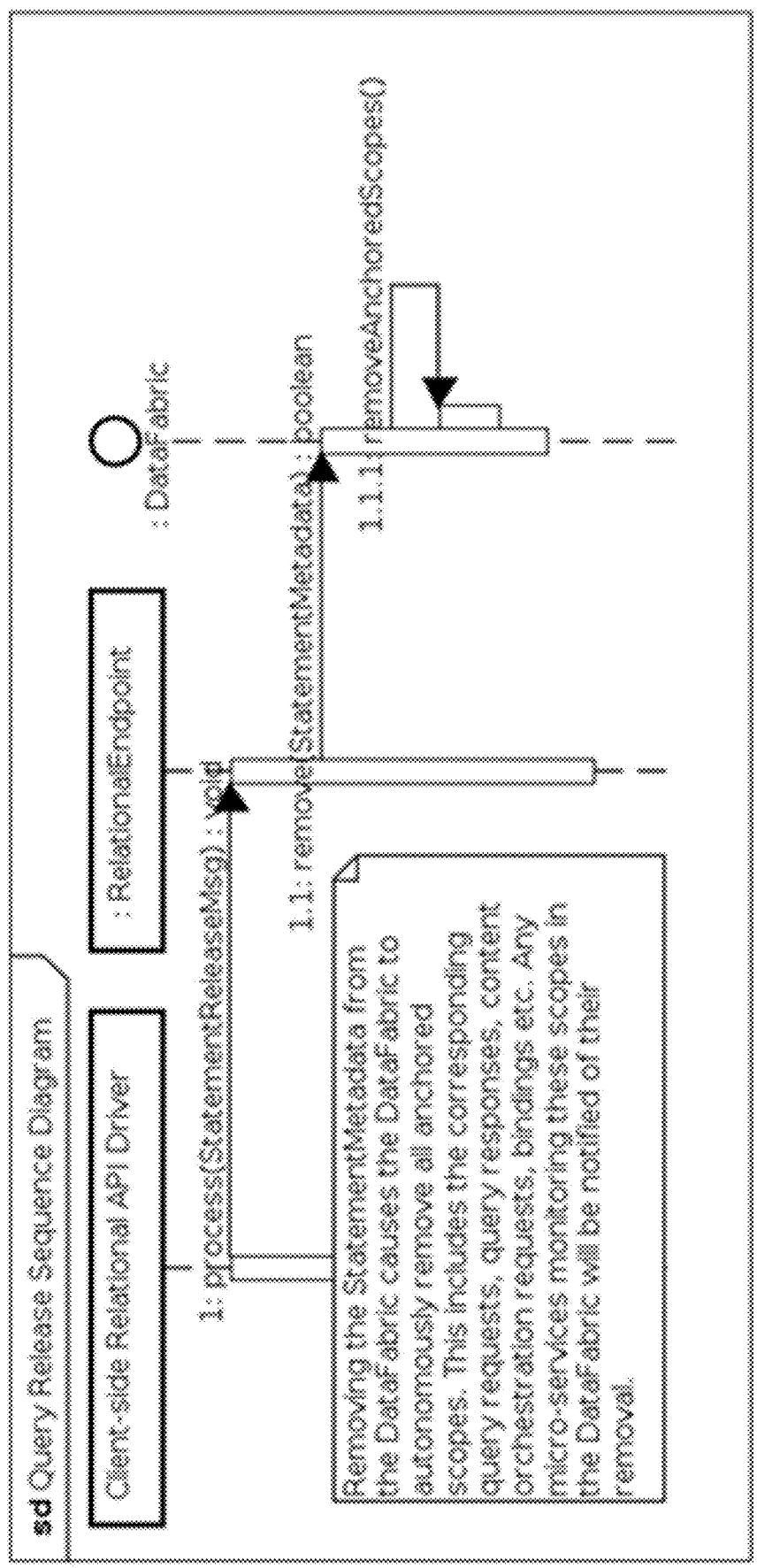
FIG. 57 is a query release sequence diagram in accordance to embodiments.

FIG. 57 is a query release sequence diagram in accordance to embodiments. Client-side Relational API Driver conveys a message that indicates the query should be dropped. PacketProtocolEndpoint is a query handling endpoint (relational/pub-sub) etc., that removes the StatementMetadata from the DataFabric. DataFabric removes the object as requested, notifying any futures and monitors (including other nodes in the DataFabric). All scopes anchored to this object are removed autonomously by all DataFabric nodes. This is a recursive activity. Eventually the statement and all associated requests, responses and response bindings are removed from cache. Any corresponding shard bindings and orchestration results/activity are also released based on notifications from the DataFabric.

Use-Case Realization—Session Release

Figure 58:
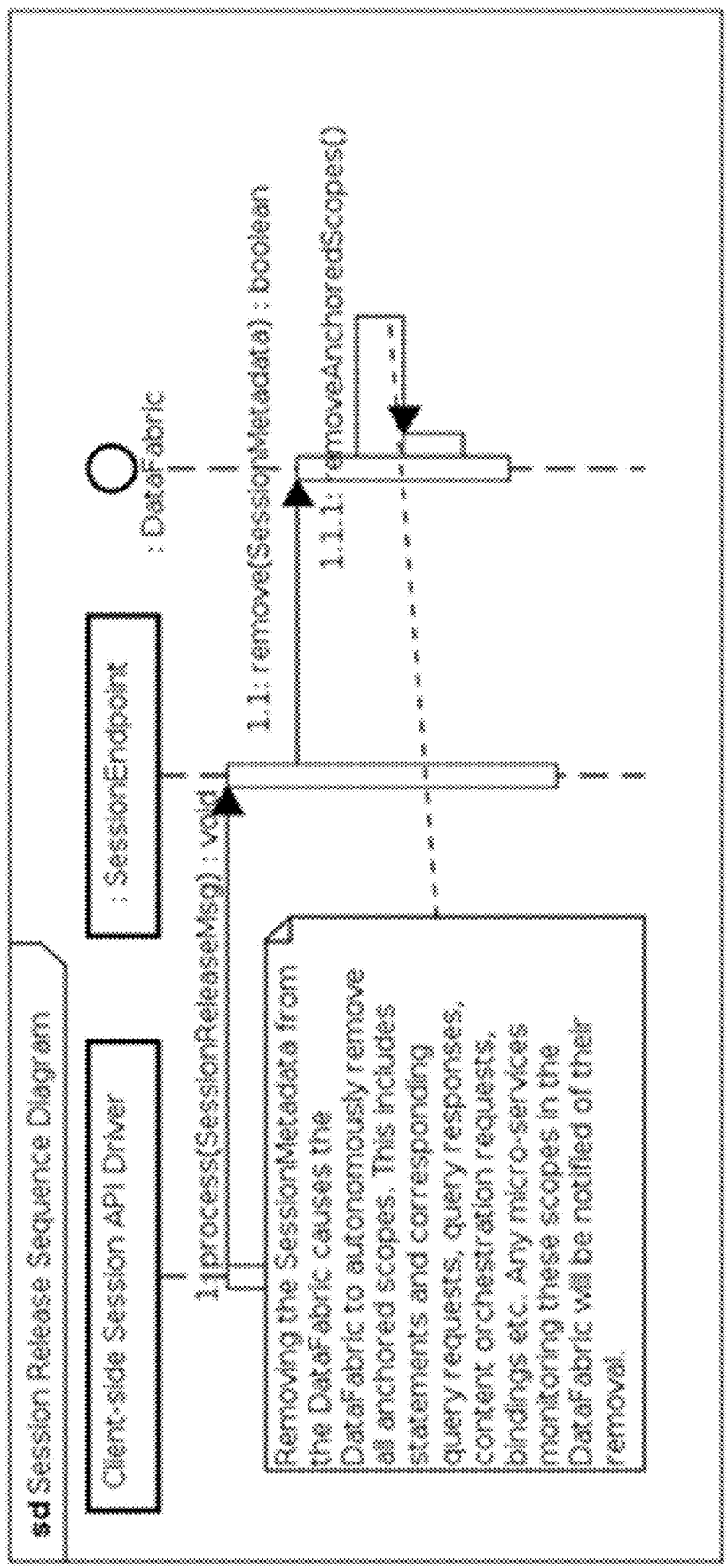
FIG. 58 is a session release sequence diagram in accordance to embodiments.

FIG. 58 is a session release sequence diagram in accordance to embodiments. Client-side Session API Driver conveys a session termination (or session times out). SessionEndpoint removes the SessionMetadata from the DataFabric. DataFabric removes the object as requested, notifying any futures and monitors, including metadata for queries associated with the session (see query release).

Use-Case Realization—Primary Key Join

Figure 59:
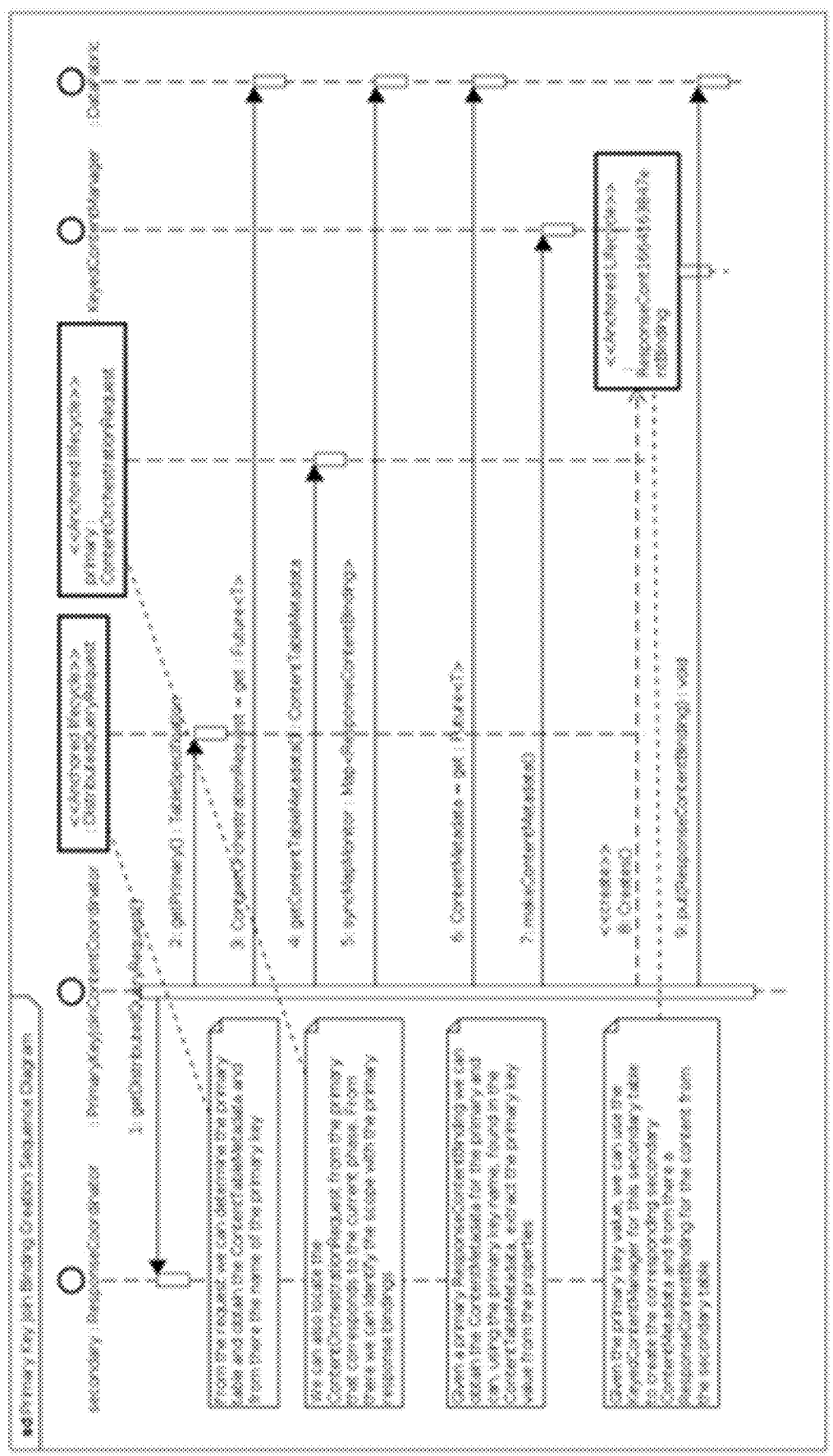
FIG. 59 is a primary key join binding creation sequence diagram in accordance to embodiments.

FIG. 59 is a primary key join binding creation sequence diagram in accordance to embodiments. ResponseCoordinator initializes PrimaryKeyJoinContentCoordinator. PrimaryKeyJoinContentCoordinator determines the primary table from the DistributedQueryRequest, obtains the ContentTableMetadata for the primary table and determines the primary key name, obtains the ContentOrchestrationRequest associated with the primary table and the current query phase, and monitors the DataFabric for all ResponseContentBinding instances associated with the primary ContentOrchestrationRequest.

PrimaryKeyJoinContentCoordinator: For each primary binding, the ContentMetadata for the primary table content is obtained from the DataFabric. PrimaryKeyJoinContentCoordinator: For each primary binding, extract the primary key from the primary ContentMetadata, using they key name from the primary ContentTableMetadata, for all bindings the ContentMetadata for the joined (secondary) table is requested from the KeyedContentManager using the value of the primary key. For each secondary ContentMetadata create a secondary ResponseContentBinding. PrimaryKeyJoinContentCoordinator continues to monitor the DataFabric for add and remove events associated with the primary table bindings and adjusts the joined secondary bindings accordingly.

Use-Case Realization—Foreign Key Join

Figure 60:
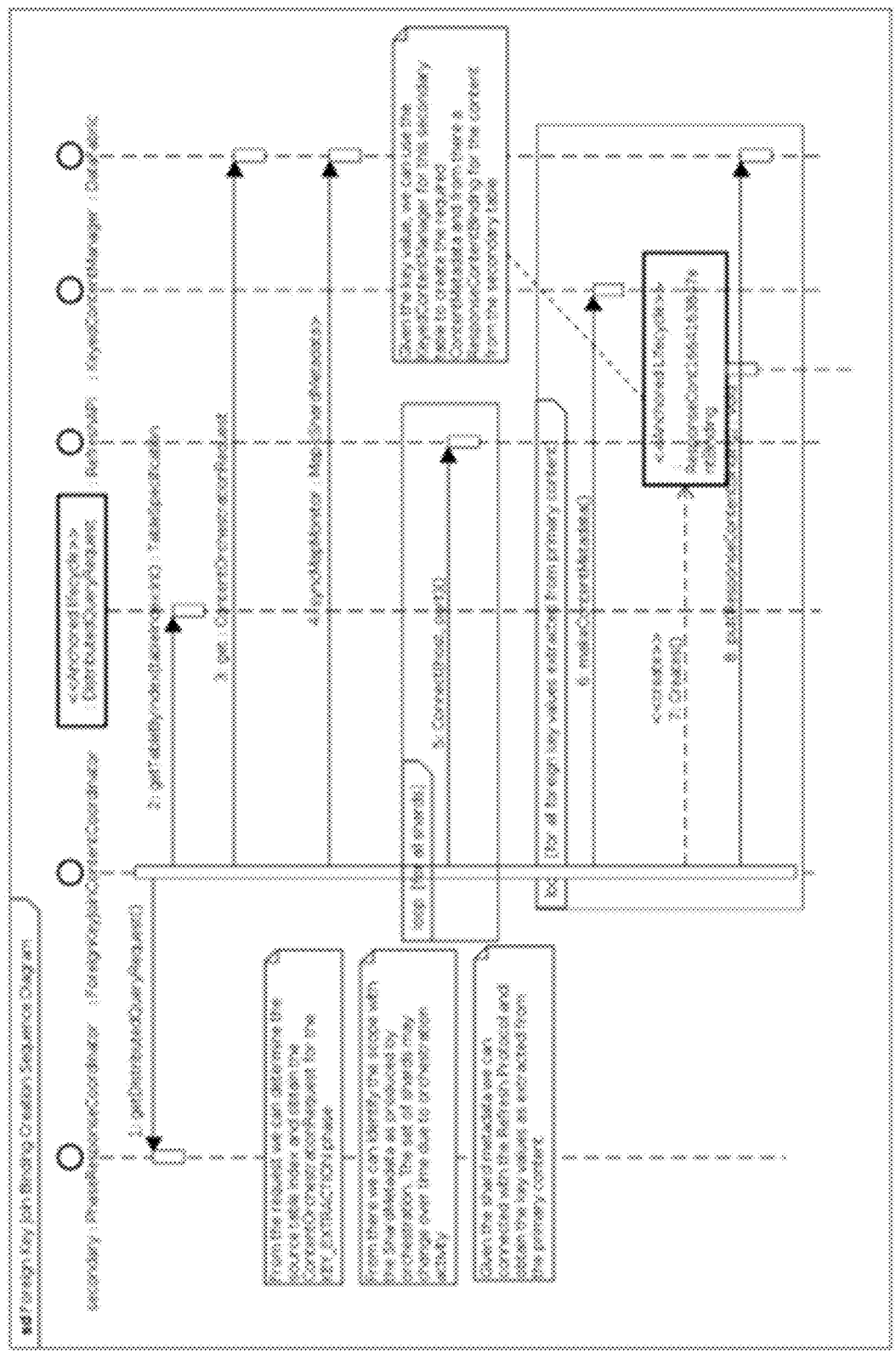
FIG. 60 is a foreign key join binding creation sequence diagram in accordance to embodiments.

FIG. 60 is a foreign key join binding creation sequence diagram in accordance to embodiments. ResponseCoordinator initializes the ForeignKeyJoinContentCoordinator. ForeignKeyJoinContentCoordinator determines source table for the join by examining the secondary table details in DistributedQueryRequest, locates the ContentOrchestrationRequest for the source table, locates ShardMetadata associated with the ContentOrchestrationRequest, uses the Refresh protocol to connect to each shard and synchronizes all shards and content, extracts the foreign key values from all rows in all shards and uses the KeyedContentManager to create ContentMetadata (for the joined table), uses the ContentMetadata to create ResponseContentBinding instances for the joined table, and monitors the refresh API results for added and removed rows, adjusted the ResponseContentBindings for the joined table accordingly.

Use-Case Realization—Foreign Key Column Coordinator

Figure 61:
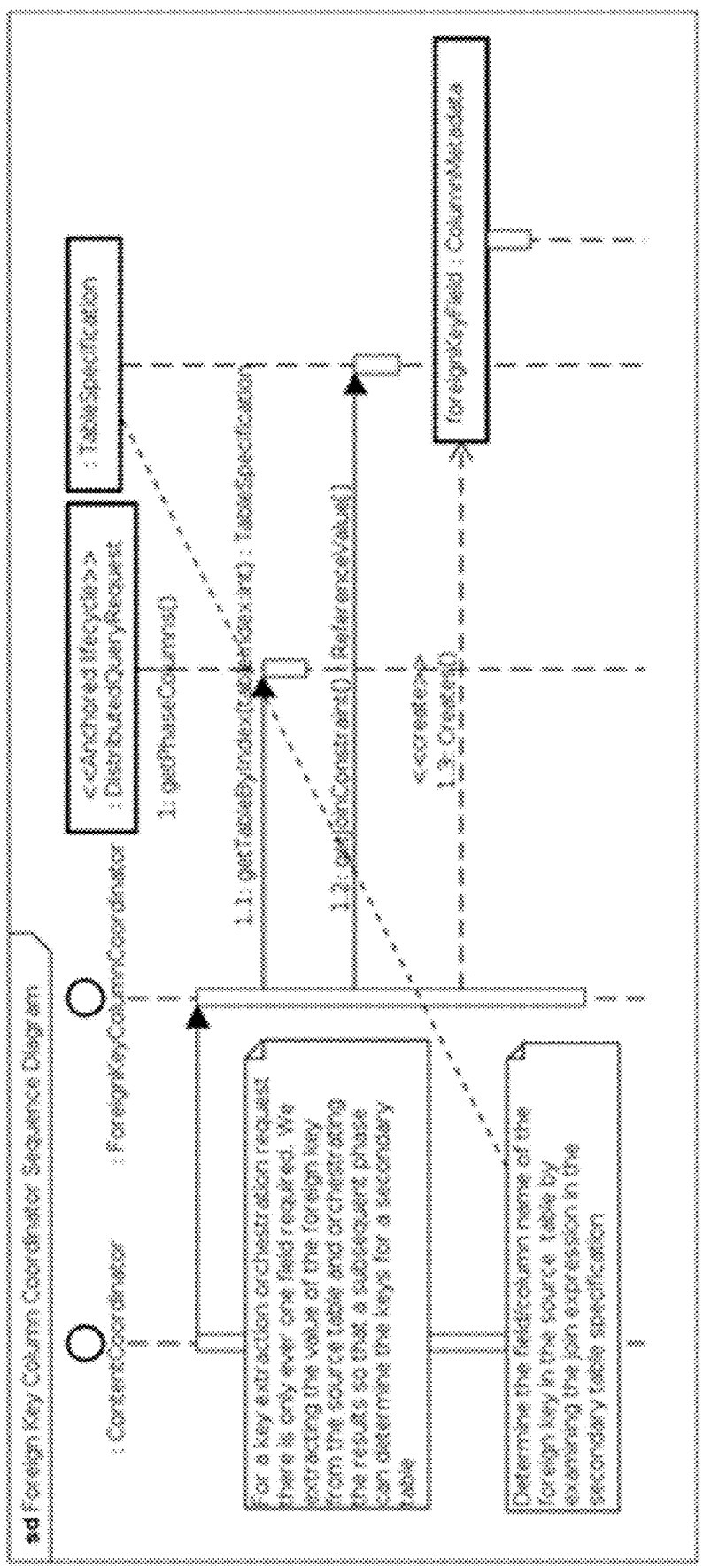
FIG. 61 is a foreign key join column coordinator sequence diagram in accordance to embodiments.

FIG. 61 is a foreign key join column coordinator sequence diagram in accordance to embodiments. ResponseCoordinator initializes the ForeignKeyColumnCoordinator. ForeignKeyColumnCoordinator obtains the DistributedQueryRequest and locates the table containing the foreign keys (i.e., the values that are being extracted to use as keys for another, secondary, table). ForeignKeyColumnCoordinator: The join constraint associated with the contains a reference to the column containing the foreign key, creates a ColumnMetadata with the foreign key field name, and creates a PhaseColumnSelections with just the one column. The column selection object will be used when orchestrating bindings for the source table so as to extract the foreign key values via refresh shards used by the ForeignKeyContentSource in the subsequent query handling phase. ForeignKeyColumnCoordinator publishes the PhaseColumnSelections to the DataFabric.

Use-Case Realization—Function Validation

Figure 62:
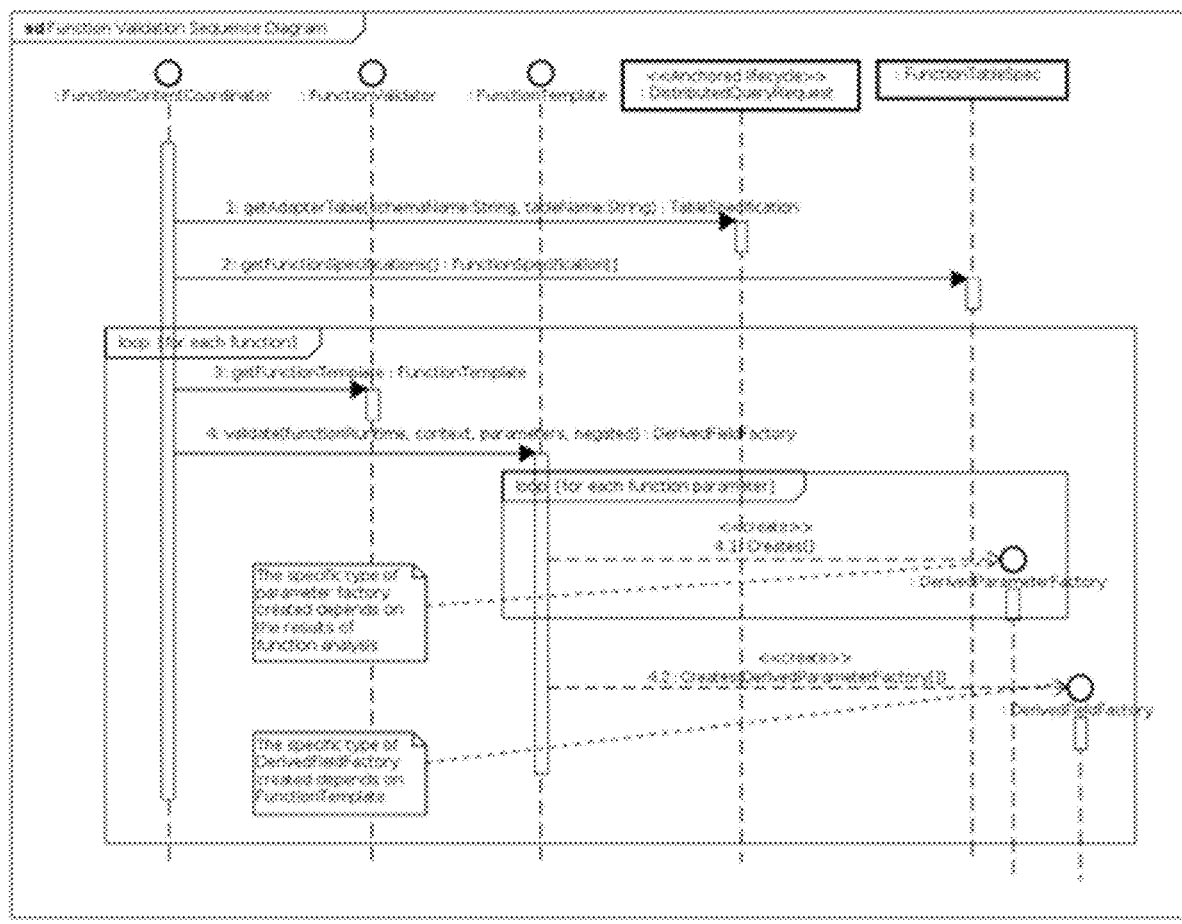
FIG. 62 is a function validation sequence diagram in accordance to embodiments.

FIG. 62 is a function validation sequence diagram in accordance to embodiments. ResponseCoordinator initializes OrchestratedDerivedContentCoordinator, extracts the FunctionTableSpec for the function table being handled and extracts the FunctionSpecifications, for each function referenced by name, validates the function by name with the FunctionValidator, obtaining the FunctionTemplate, extracts the parameter specifications from the FunctionSpecification and validates with the FunctionTemplate.

FunctionTemplate, for each function parameter, constructs a DerivedParameterFactory, using the collection of DerivedParameterFactory, constructs a DerivedFieldFactory. The result of this sequence is a collection of DerivedFieldFactory, one for each column that references a function in the underlying function table/library.

Use-Case Realization—Synthetic Type Analysis

Figure 63:
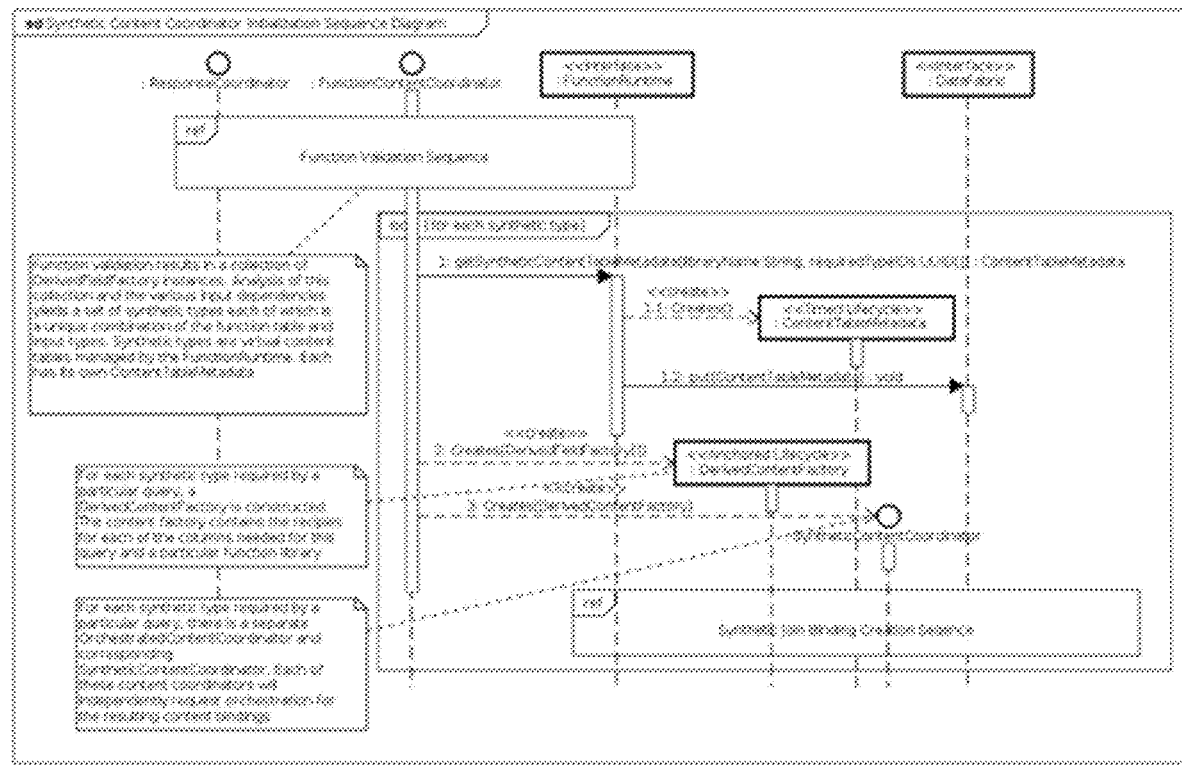
FIG. 63 is a synthetic content coordinator initialize sequence diagram in accordance to embodiments.

FIG. 63 is a synthetic content coordinator initialize sequence diagram in accordance to embodiments. ResponseCoordinator initializes FunctionContentCoordinator, validates functions as described in Function Validation Sequence resulting in a collection of DerivedFieldFactory, analyzes the input (parameter) dependencies of each DerivedFieldFactory to group them by similar dependencies.

FunctionContentCoordinator: Each group represents content from a synthetic type (the combination of the function library type and the input types). For each group, the ContentTableMetadata for the synthetic type is obtained from the FunctionRuntime, which determines if a new type is needed.

The FunctionRuntime implementation is responsible for creating ContentTableMetadata as needed for each unique synthetic type. FunctionContentCoordinator: For each synthetic type, constructs a DerivedContentFactory, and a SyntheticContentCoordinator, initializes each SyntheticContentCoordinator which then implements a synthetic content join to create ResponseContentBinding instances (see Synthetic Join Binding Creation Sequence).

Use-Case Realization—Synthetic Content Join

Figure 64:
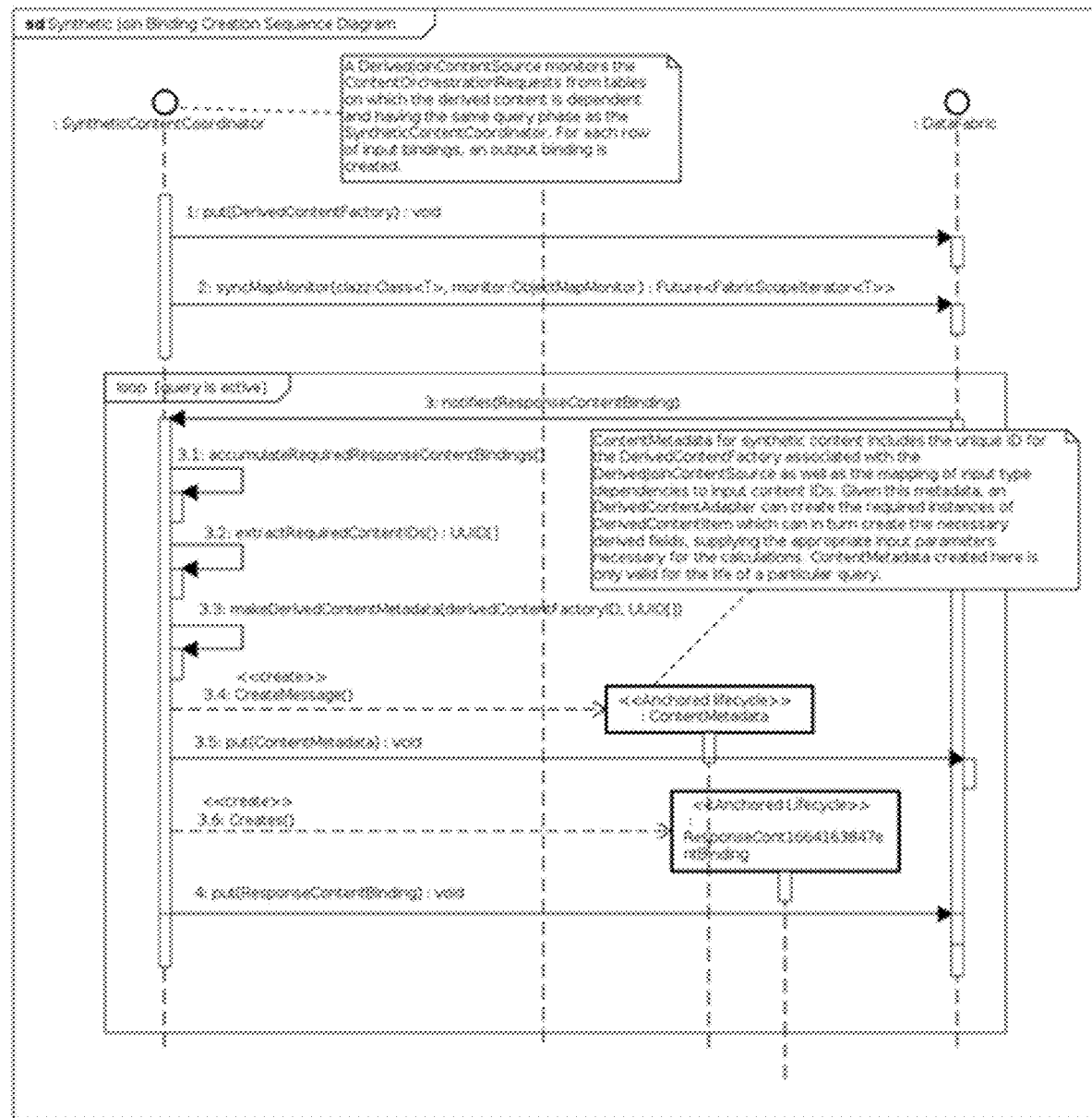
FIG. 64 is a synthetic content join binding creation sequence diagram in accordance to embodiments.

FIG. 64 is a synthetic content join binding creation sequence diagram in accordance to embodiments. SyntheticContentCoordinator publishes the DerivedContentFactory associated with this joiner (all content rows produced by this joiner will reference, via ContentMetadata, the ID of this DerivedContentFactory. SyntheticContentCoordinator monitors DataFabric for ResponseContentBinding instances from one or more tables whose content is required as input to one or more functions associated with this synthetic type and when all required bindings for a given row are available, builds a map associating type identifiers and content identifiers for all required input content. The identifier for the DerivedContentFactory and the map are embedded in the properties for new ContentMetadata describing a row of derived content.

SyntheticContentCoordinator publishes the ContentMetadata for the derived content, creates a new ResponseContentBinding having the same row as the input content and the content ID of the newly published ContentMetadata, publishes the new ResponseContentBinding, continues to monitor DataFabric for added rows (accumulating all input bindings) and removed rows, and updates the output set of ResponseContentBinding instances.

Use-Case Realization—Synthetic Adapter Initialization

Figure 65:
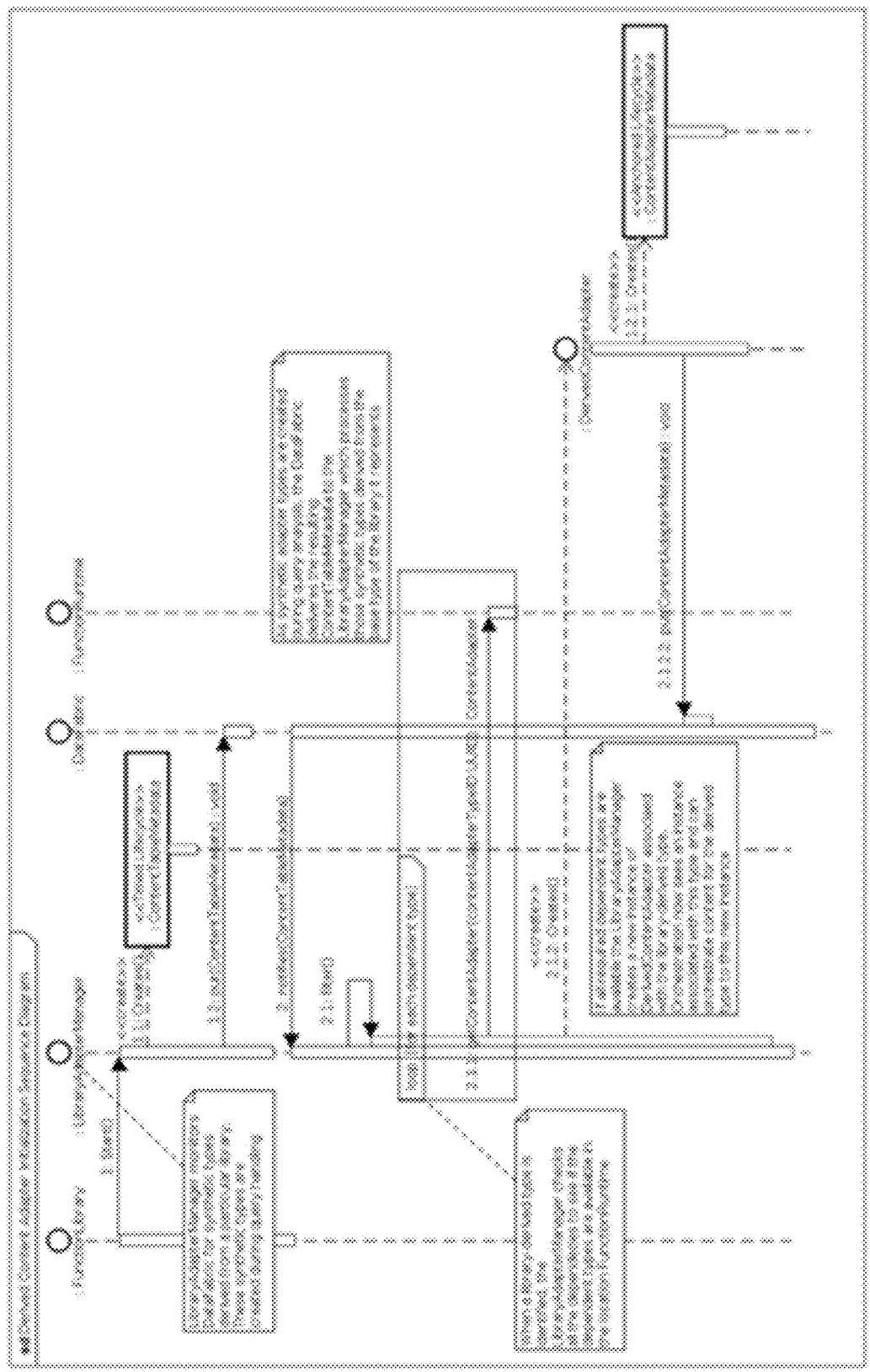
FIG. 65 is a derived content adapter initialization sequence diagram in accordance to embodiments.

FIG. 65 is a derived content adapter initialization sequence diagram in accordance to embodiments. FunctionLibrary creates a LibraryAdapterManager to handle the construction of DerivedContentAdapter instances. LibraryAdapterManager Publishes ContentTableMetadata for the base library type, monitors the DataFabric for new instances of ContentTableMetadata, ignoring instances that do not match the schema and table (function library) name of the base library.

DataFabric notifies LibraryAdapterManager with a matching new ContentTableMetadata instance. LibraryAdapterManager extracts from the matching ContentTableMetadata all the type IDs on which this synthetic type is dependent. Synthetic type metadata is constructed during query handling. For each type on which the synthetic type is dependent, the LibraryAdapterManager checks for the availability of a ContentAdapter for that type in the FunctionRuntime.

LibraryAdapterManager: If all required content is available, the LibraryAdapterManager creates an instance of DerivedContentAdapter whose purpose is to provide content for the ContentTableMetadata. N.B. the base type for the function library has no dependencies and so each node with the function library will also have a DerivedContentAdapter for the base library type. The new DerivedContentAdapter creates an instance of ContentAdapterMetadata and publishes it to the DataFabric. Orchestration now sees a new adapter instance capable of producing content for the synthetic type (the combination of the function library and some specific set of dependent types).

Use-Case Realization—Calculated Content Creation

Figure 66:
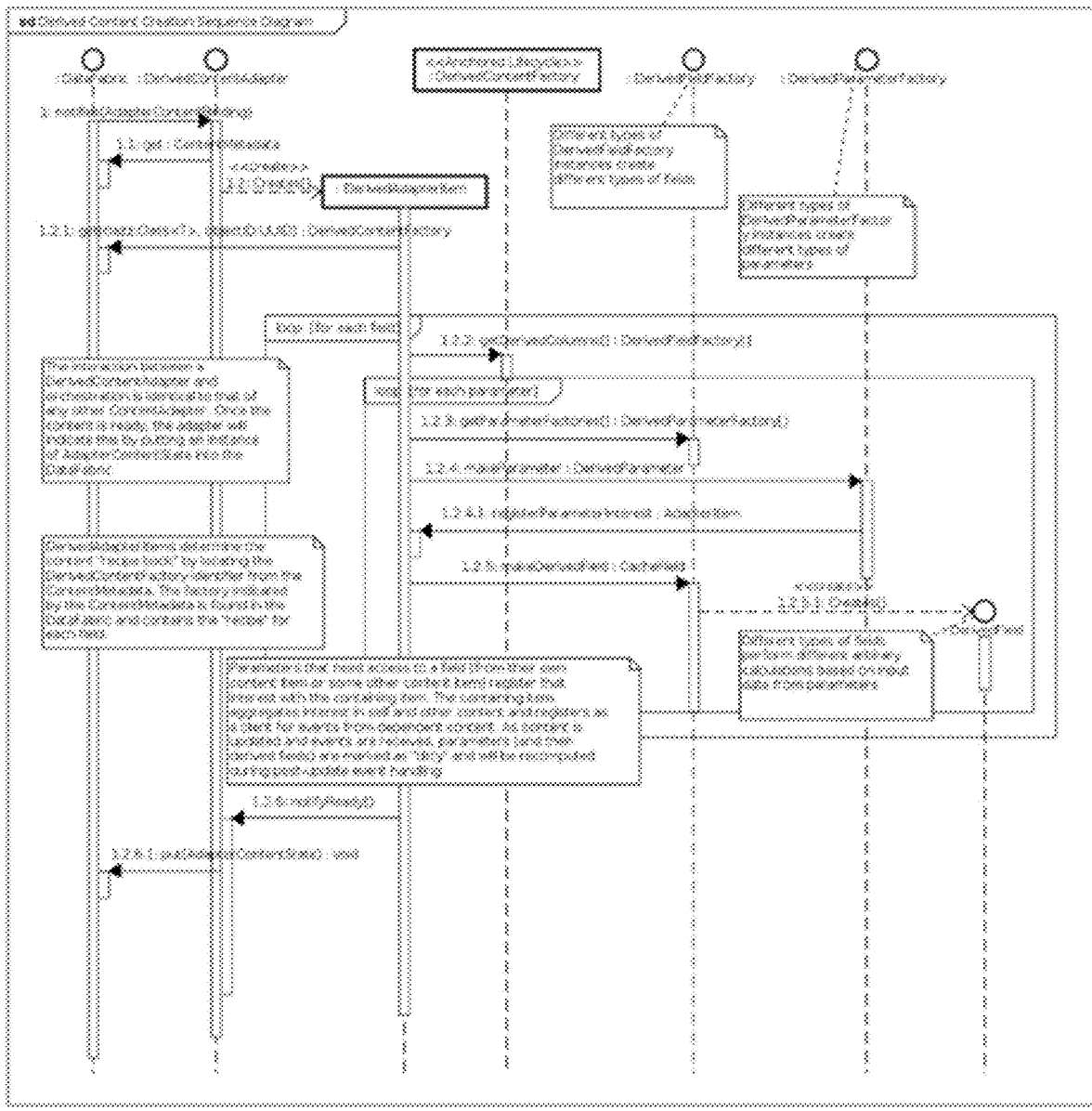
FIG. 66 is a derived content creation sequence diagram in accordance to embodiments.

FIG. 66 is a derived content creation sequence diagram in accordance to embodiments. DataFabric Orchestration routes content to an instance of DerivedContentAdapter by publishing in the DataFabric an AdapterContentBinding in the appropriate scope (anchored to the ContentAdapterMetadata for the adapter instance). The DataFabric delivers the AdapterContentBinding to the DerivedContentAdapter. DerivedContentAdapter: The adapter obtains the referenced ContentMetadata from the DataFabric, and creates an instance of DerivedAdapterItem. DerivedAdapterItem: The adapter item extracts the identity of a DerivedContentFactory from the ContentMetadata and obtains the factory from the DataFabric. The DerivedContentFactory is a recipe book for constructing the fields required in the adapter item. The adapter item obtains the recipes for individual fields (instances of DerivedFieldFactory) from the DerivedContentFactory. A DerivedFieldFactory is a recipe for a specific derived column in a result (ie all rows in the result see the same recipe for a given field in the result). To construct a field, the adapter item must first construct the field inputs, or parameters. The recipe for the parameters is available from each DerivedFieldFactory DerivedParameterFactory: The recipe for a field and its parameters applies to an entire "column" in the results. The recipe for a parameter that refers to some table, identifies the ID of that table. To actually construct a parameter for a field in a specific row, the DerivedParameterFactory must know the input content associated with that row. In other words it has to know the row-specific content for the dependent tables content associated with a particular row. It finds this information in the ContentMetadata (for derived content, the ContentMetadata constructed during query analysis contains a mapping of table IDs to content IDs for all tables on which the derived content is dependent). A DerivedParameterFactory can then construct a DerivedParameter with references to the appropriate content.

DerivedAdapterItem instances aggregate the interest of field parameters in other related content. Once the input parameters have been assembled, a DerivedAdapter item uses the field factory to construct the appropriate type of field. Once the DerivedAdapterItem is fully assembled and all fields, parameters, etc. are fully constructed and references resolved, the item indicates to the adapter that it is ready. DerivedContentAdapter: The adapter indicates to orchestration that the content is ready by publishing an instance of AdapterContentState to the DataFabric.

Use-Case Realization—Constraint Query Handling

Figure 67:
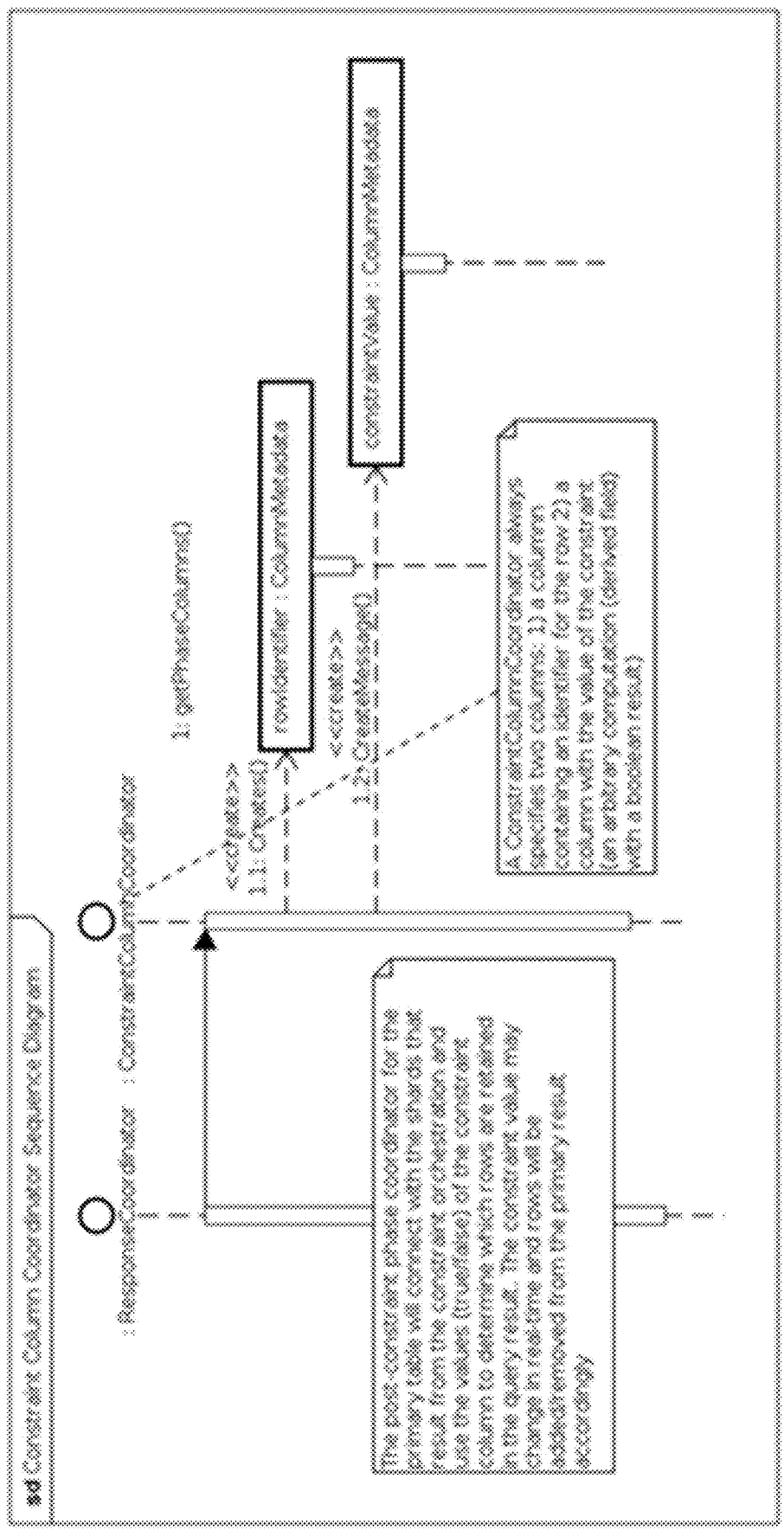
FIG. 67 is a constraint column coordinator sequence diagram in accordance to embodiments.

FIG. 67 is a constraint column coordinator sequence diagram in accordance to embodiments.

Figure 68:
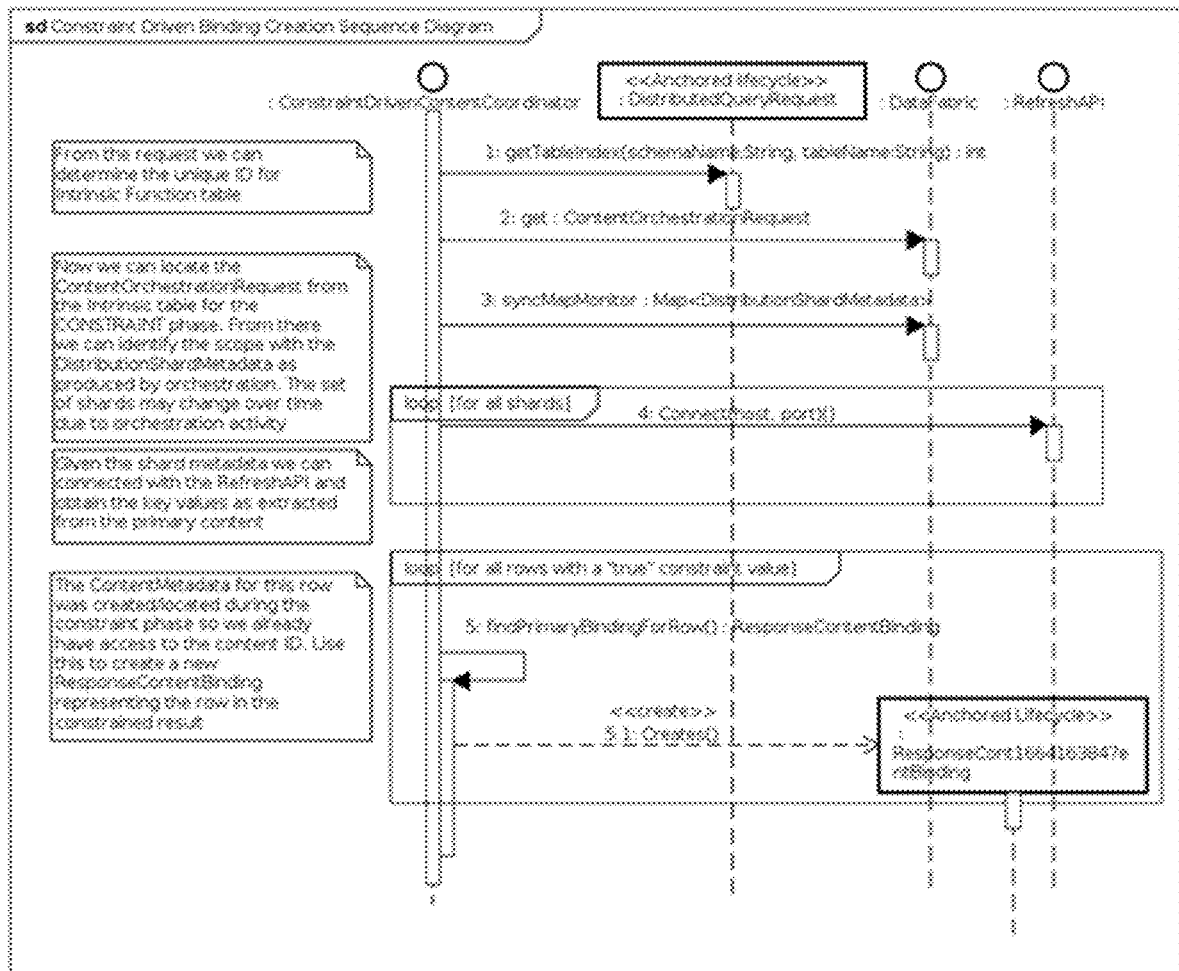
FIG. 68 is a constraint-driven binding creation sequence diagram in accordance to embodiments.

FIG. 68 is a constraint-driven binding creation sequence diagram in accordance to embodiments.

The constraint phase ResponseCoordinator requests the column metadata from the ConstraintColumnCoordinator. The ConstraintColumnCoordinator always returns the same to column descriptor (ColumnMetadata). The first is a descriptor for a unique row identifier. The second is a descriptor for the implicit value that arises from evaluation of the constraint expression in the query. This field is boolean (true, false) and represents the result of the constraint evaluation. The constraint expression results in the construction of some arbitrarily complex computed value manifesting as a DerivedField and handled like any other computation.

The FunctionContentCoordinator assigned by the Intrinsic library response planner for the constraint phase will create bindings and request orchestration (using a refresh protocol orchestration target) for the row identifier and constrain fields (essentially an intermediate query). This orchestration will result in some number of shards associated with the intrinsic library orchestration request for this, the constraint phase The primary table response planning allocates a ConstraintDrivenContentCoordinator for the post-constraint phase of the response. The ConstraintDrivenContentCoordinator identifies the orchestration request generated by the intrinsic library during the constraint phase and, from there, the instances DistributionShardMetadata as assigned by orchestration.

The ConstraintDrivenContentCoordinator connects to the shards associated with the intermediate query and results (row and constrain value fields). From the result rows, the constraint values that are "true" yield the corresponding row identifiers for the rows that belong in the constrained result. Using these row identifiers, the ConstraintDrivenContentCoordinator can extract the contentID from the bindings produced in the previous phase and create new ResponseContentBinding instances for the constrained output.

Use-Case Realization—Primary Table View Creation

Figure 69:
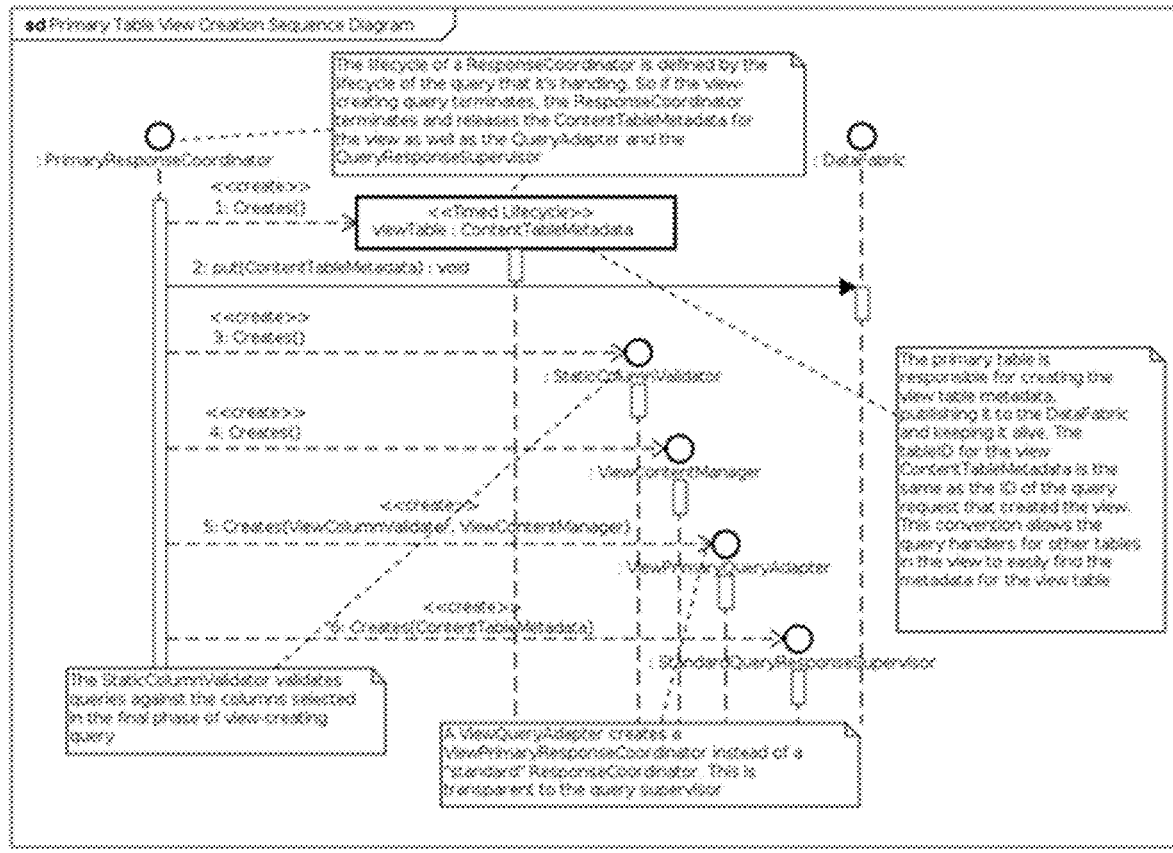
FIG. 69 is a primary table view creation sequence diagram in accordance to embodiments.

FIG. 69 is a primary table view creation sequence diagram in accordance to embodiments. PrimaryResponseCoordinator for final phase creates a ContentTableMetadata for the view Table. ContentTableMetadata always specifies a table type and a content type. For standard tables the table type and the content type are the same. For a view the table type is an identity unique to the view but the content type is the same identity as the underlying table. This means that response bindings associated with view query results will be orchestrated to adapters and resources associated with the underlying type. By convention the view table identifier is the same value as the request that created the view. This allows the query handlers for all tables involved in the view to easily identify the metadata for the view table.

PrimaryResponseCoordinator creates a StaticColumnValidator with using a collection of fields defined in the final response phase of the view-creating query handling, creates a ViewContentManager, creates a ViewPrimaryQueryAdapter using the StaticColumnValidator and the ViewContentManager. PrimaryResponseCoordinator creates a QueryResponseSupervisor to supervise requests targeting the view table, and publishes the ContentTableMetadata for the view into the DataFabric. Orchestration sees a new table. While the query creating the view is active, the associated ResponseSupervisor is active and keeps the view table "alive" by maintaining the table metadata in the DataFabric.

Use-Case Realization—Secondary Table View Creation

Figure 70:
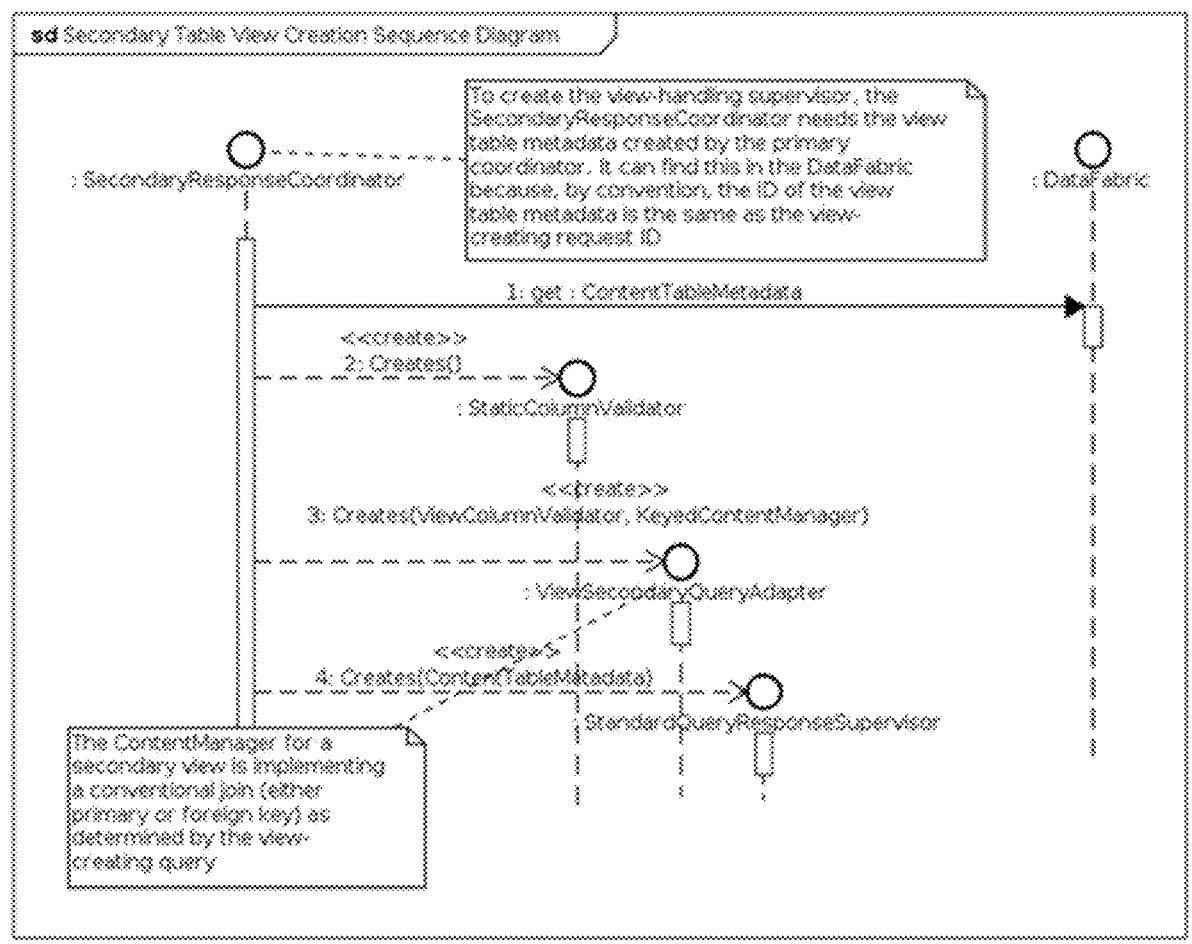
FIG. 70 is a secondary table view creation sequence diagram in accordance to embodiments.

FIG. 70 is a secondary table view creation sequence diagram in accordance to embodiments. SecondaryResponseCoordinator obtains the ContentTableMetadata for the view from the DataFabric. By convention, the identifier for the view table is the value from the request ID associated with the view-creating request. SecondaryResponseCoordinator creates a StaticColumnValidator by using a collection of fields defined in the final response phase of the view-creating query handling, creates a ViewSecondaryQueryAdapter using the StaticColumnValidator and the ContentManager from the underlying table and creates a QueryResponseSupervisor to supervise requests targeting the view table.

Use-Case Realization—Function Table View Creation

Figure 71:
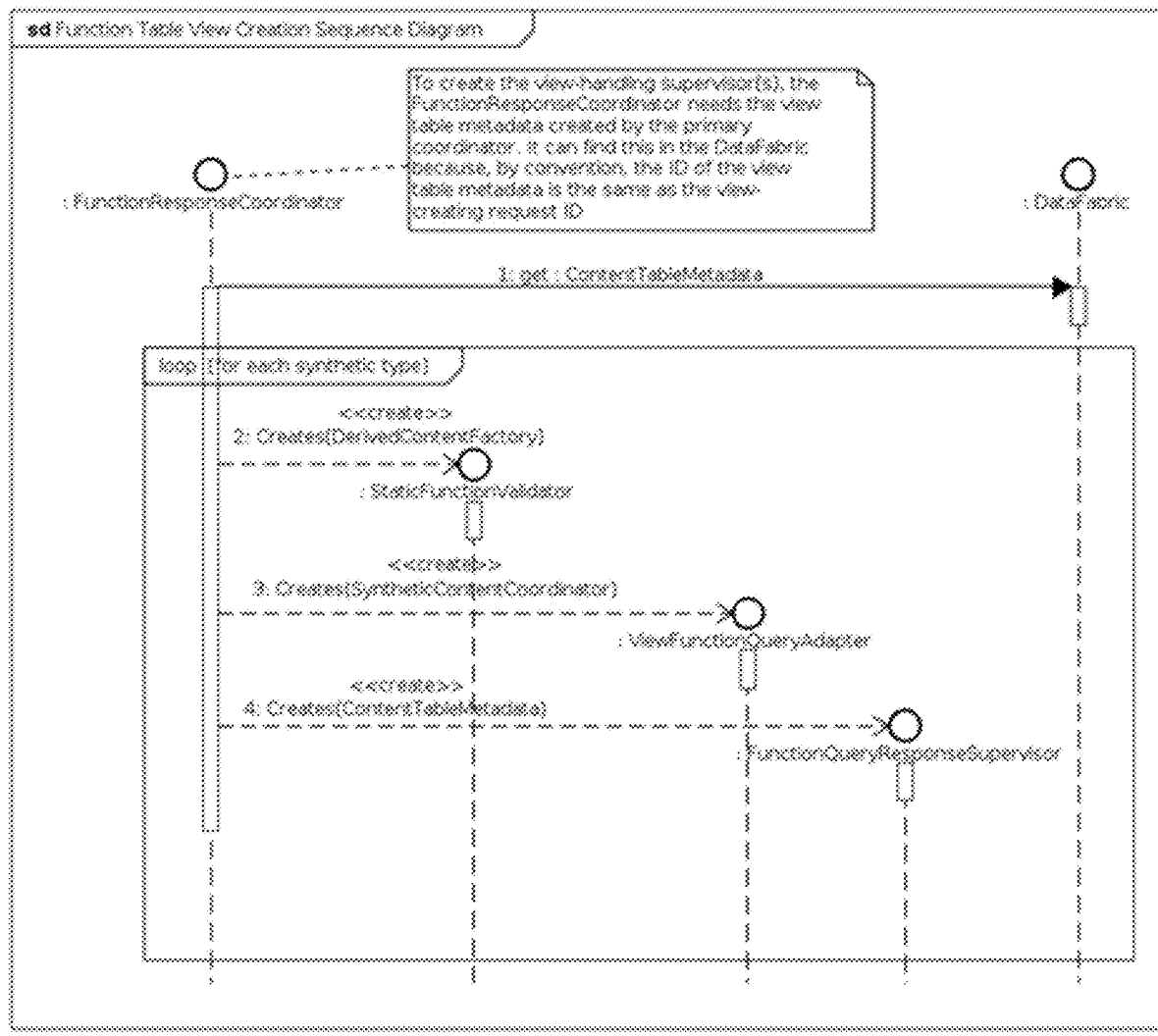
FIG. 71 is a function table view creation sequence diagram in accordance to embodiments.

FIG. 71 is a function table view creation sequence diagram in accordance to embodiments. FunctionResponseCoordinator obtains the ContentTableMetadata for the view from the DataFabric. By convention, the identifier for the view table is the value from the request ID associated with the view-creating request.

FunctionResponseCoordinator, from the FunctionContentCoordinator that handled the view query, obtains the collection of SyntheticContentCoordinators. Collectively, the synthetic coordinators provide the content for the derived content need to construct the view. FunctionResponseCoordinator, for each of these synthetic types, obtains the DerivedContentFactory and from there extracts the set of fields assigned to that synthetic type. For each type, use the fields to create a StaticFunctionValidator. Use the StaticFunctionValidator and the SyntheticContentCoordinator to construct a ViewFunctionQueryAdapter. Finally, for each synthetic type construct a FunctionQueryResponseSupervisor. Each supervisor will monitor queries against the view and apply standard query handling that results in a derived content join for the subset of view columns associated with the synthetic type.

FunctionResponseCoordinator, for each type, uses the StaticFunctionValidator and the SyntheticContentCoordinator to construct a ViewFunctionQueryAdapter. Finally, for each synthetic type construct a FunctionQueryResponseSupervisor. Each supervisor will monitor queries against the view and apply standard query handling that results in a derived content join for the subset of view columns associated with the synthetic type. FunctionResponseCoordinator, finally, for each type, constructs a FunctionQueryResponseSupervisor using the view ContentTableMetadata. Each supervisor will monitor queries against the view table and apply standard query handling that results in a derived content join for the subset of view columns associated with the synthetic type.

Use-Case Realization—Market Data Chain Query Handling

Figure 72:
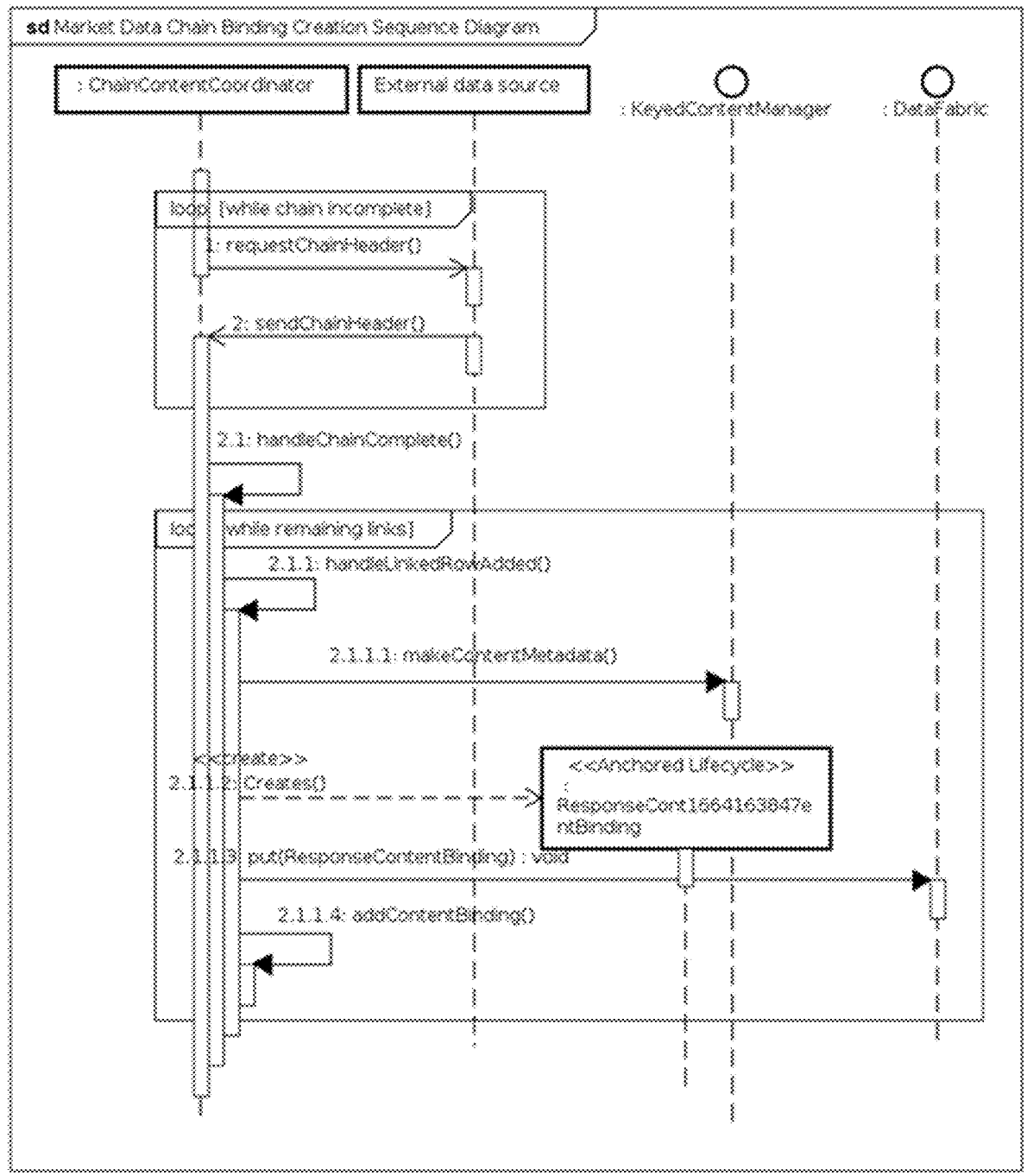
FIG. 72 is a market data chain binding creation sequence diagram in accordance to embodiments.

FIG. 72 is a market data chain binding creation sequence diagram in accordance to embodiments. QueryAdapter for a chain table uses a ChainContentManager specific to the DistributedQueryRequest and analyzes the query request to determine the key referenced in the explicit key constraint. QueryAdapter initializes the ChainContentManager. ChainContentManager requests ChainHeader data records from an external data source.

ChainContentManager traverses ChainHeader extracting chain link symbols and uses ContentManager from the underlying market data adapter to obtain ContentMetadata. The ChainContentManager has a chain-specific domain of content.

ChainContentManager ChainContentManager creates a ContentRow for each link of chain content. ChainContentManager monitors real-time events from the external data source to detected chain adds/drops and updates ContentRow results accordingly and passing corresponding add/remove events to the ContentCoordinator.

Use-Case Realization—Map Single-Stream Topics to a Synthetic Join

Figure 73:
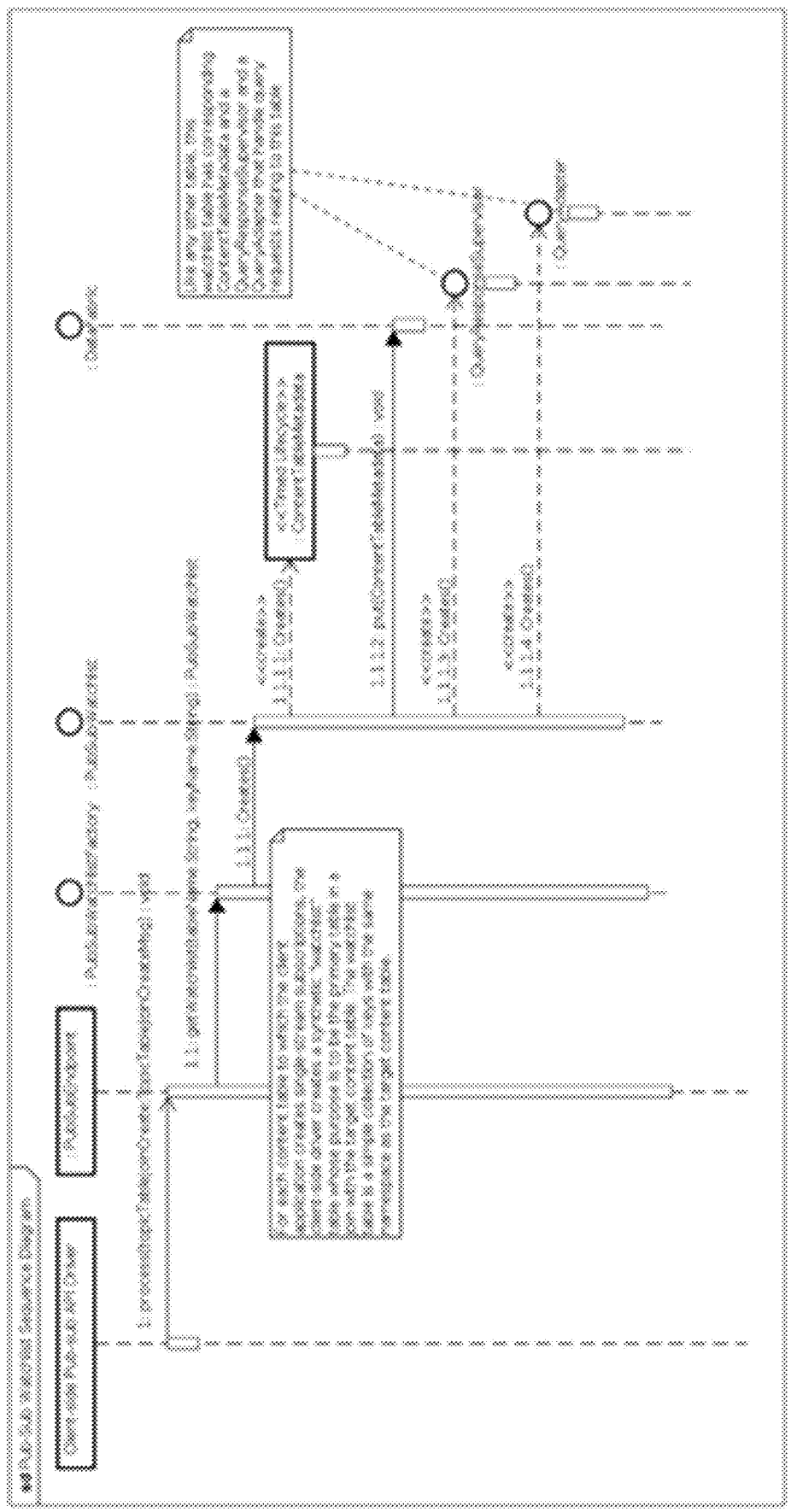
FIG. 73 is a pub-sub watchlist sequence diagram in accordance to embodiments.

FIG. 73 is a pub-sub watchlist sequence diagram in accordance to embodiments. Client-side Pub-Sub API Driver, on first subscribe for a single-stream topic for each unique combination of selector expression and content table, sends a request to create a watchlist table. This table will be the primary in a join. PubSubEndpoint, PubSubServer, on first subscribe for a single-stream topic for each unique combination of selector expression and content table, sends a request to create a watchlist table. This table will be the primary in a join.

PubSubWatchlistFactory creates a PubSubWatchlist, creates ContentTableMetadata representing the watchlist. A "watchlist" table is a simple table with one column whose values are keys to content in a related content table. The purpose of the watchlist table is to be the primary table in a join based on the key value. PubSubWatchlistFactory creates QueryResponseSupervisor and a QueryAdapter to handle queries against the watchlist table. Client-side Pub-Sub API Driver, on first subscribe for a single-stream topic for each unique combination of selector expression and content table, sends a EnableSubscriptionMsg with a query requesting a join between the watchlist and the target content table.

Use-Case Realization—Push Shard Binding Initialization

Figure 74:
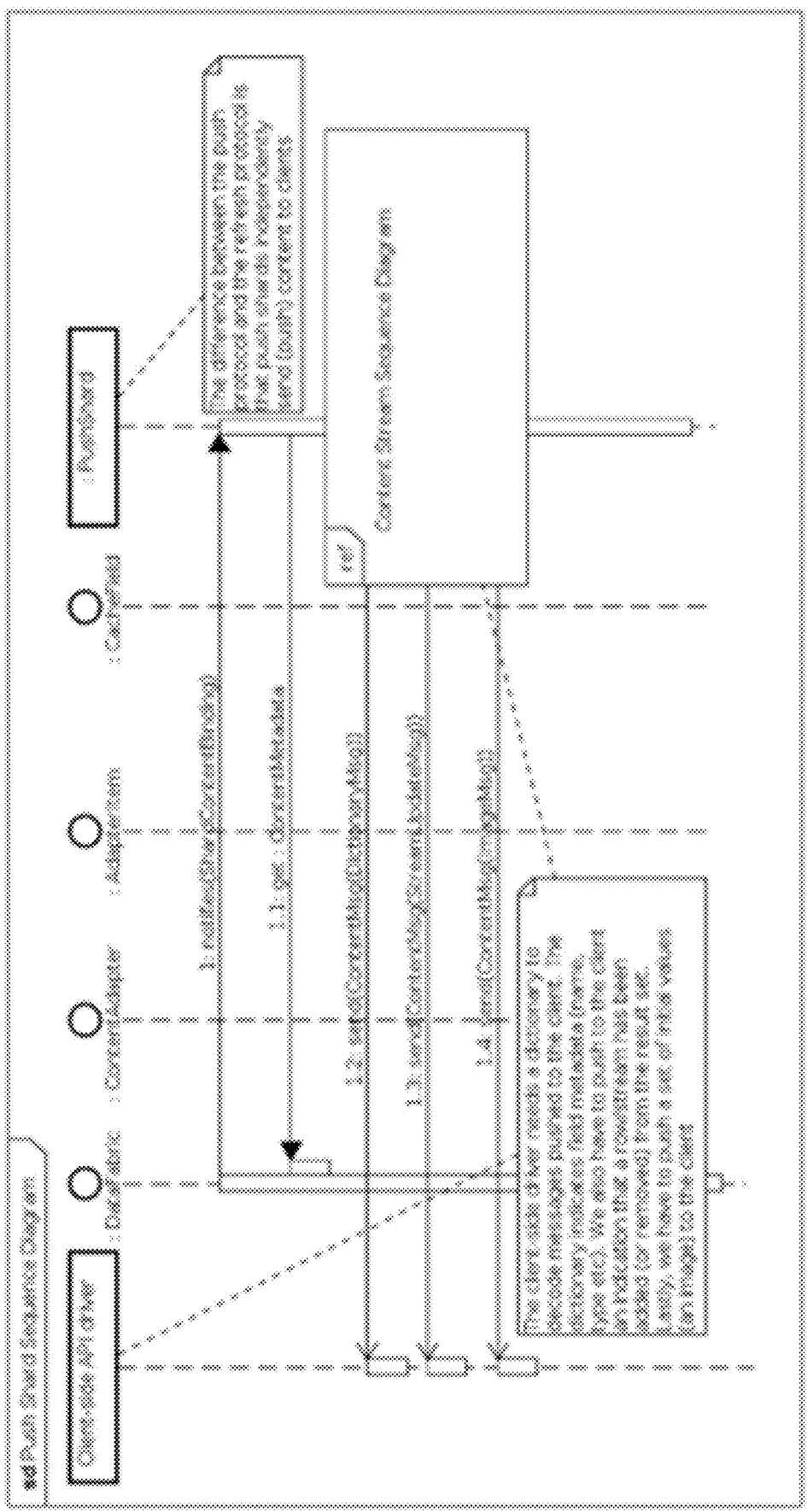
FIG. 74 is a pub-sub shard initialization sequence diagram in accordance to embodiments.

FIG. 74 is a pub-sub shard initialization sequence diagram in accordance to embodiments. DataFabric delivers a ShardContentBinding to the PushShard. The binding is the result of orchestration assignment to the shard. PushShard uses the AdapterContentReference from the ShardContentBinding to obtain a ContentStream (see Content Stream Sequence Diagram). PushShard sends a DictionaryMsg and a StreamUpdateMsg to the client. PushShard sends an ImageMsg to the client when there is capacity on the channel.

Use-Case Realization—Subscribe to Single Streams

Figure 75:
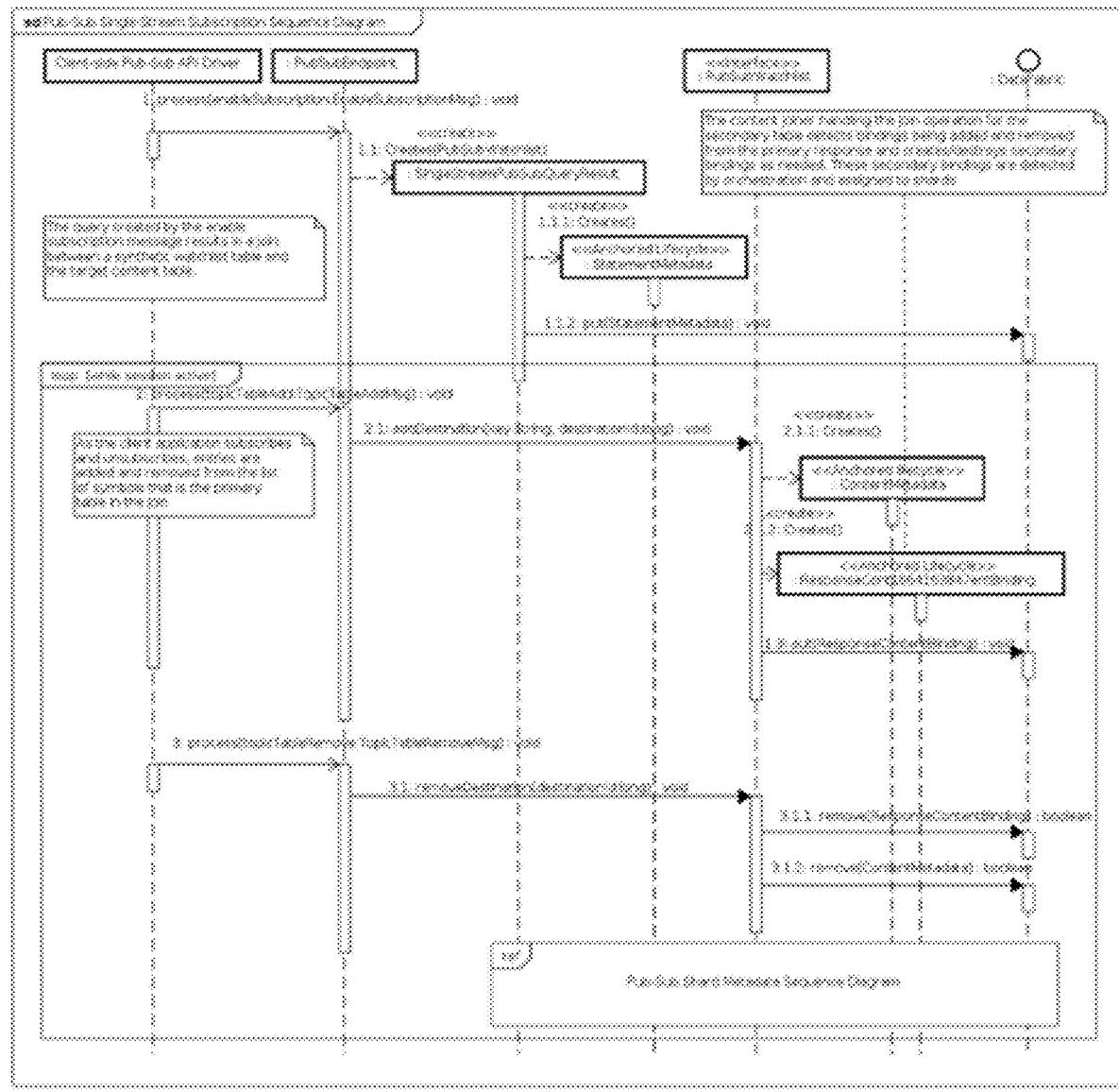
FIG. 75 is a pub-sub single-stream subscription sequence diagram in accordance to embodiments.

FIG. 75 is a pub-sub single-stream subscription sequence diagram in accordance to embodiments. Client-side Pub-Sub API Driver, for first and subsequent subscribes for single-stream topics from a particular table, sends an add symbol request to update the watchlist table and for subsequent unsubscribes for single-stream topics, sends a remove symbol request to update the watchlist table by removing the corresponding symbol. As shards are added and removed by orchestration, the PubSubEndpoint updates the client with shard information (host, port, identity) so the client-side data protocol driver can connect and initiate push distribution of content.

Use-Case Realization—Content Stream Initialization

Figure 76:
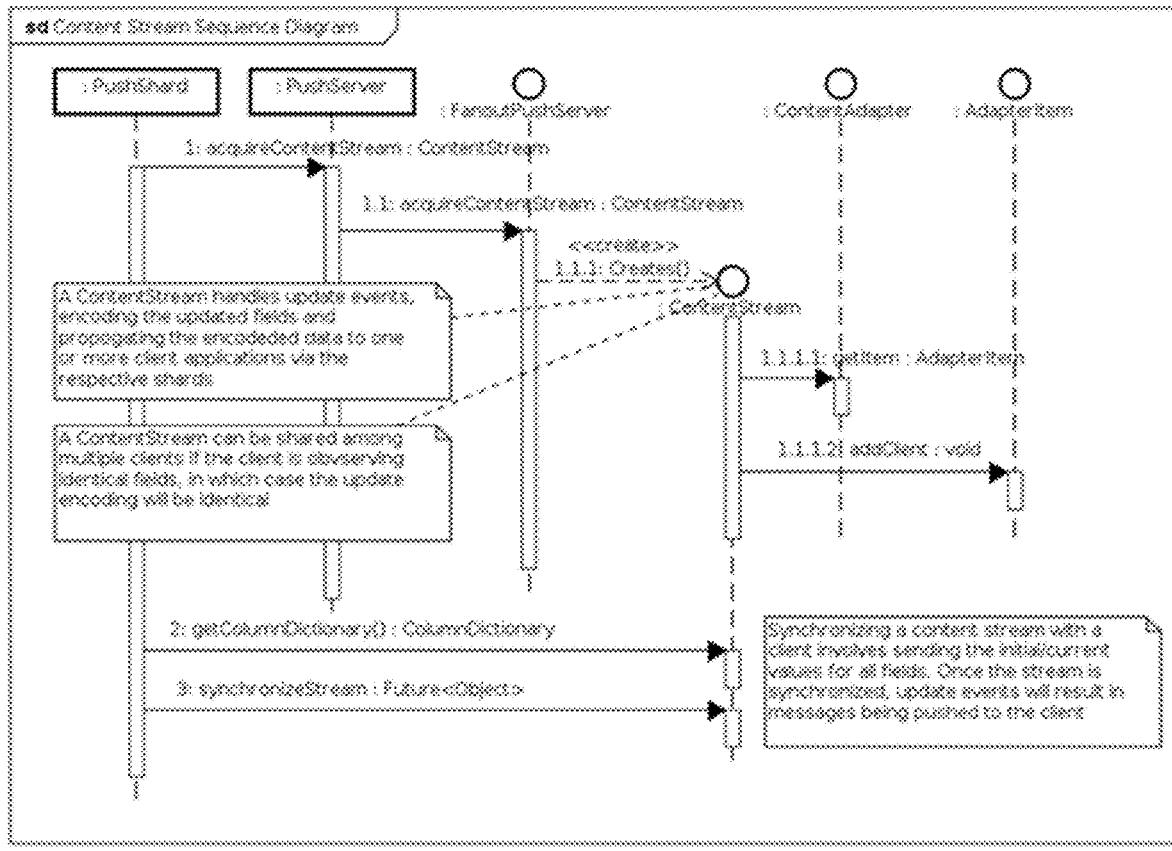
FIG. 76 is a content stream initialization sequence diagram in accordance to embodiments.

FIG. 76 is a content stream initialization sequence diagram in accordance to embodiments. PushShard: Having been notified by the DataFabric that there is a new ShardContentBinding, the shard locates the ContentMetadata identified by the binding and requests the corresponding ContentStream from the PushServer, passing the PhaseColumnSelections associated with the ContentOrchestrationRequest that generated the shard.

PushServer: The push server forwards the request to a FanoutPushServer. The FanoutPushServer identifies or creates the ContentStream having the same underlying AdapterItem and the same set of column selections. The ContentStream obtains the relevant AdapterItem from the underlying ContentAdapter and registers as a client of the AdapterItem.

The PushShard obtains the dictionary associated with the ContentStream from the ContentStream. The dictionary helps the client-side driver to decode messages and is specific to the ContentStream (reflecting the columns associated with the stream). The dictionary has a unique ID and only needs to be sent to the client once, even if used by multiple streams.

The PushShard synchronizes with the stream by requesting an image. Once this transaction is completed by virtue of sending the image (this requires suitable network bandwidth, appropriate buffers, etc.) the shard will then be notified by the ContentStream for each real-time update to the underlying AdapterItem such that the ContentStream provides encoded data that the shard must push to the client-side api driver.

Use-Case Realization—Subscribe to a Table (Multi-Stream Response)

Figure 77:
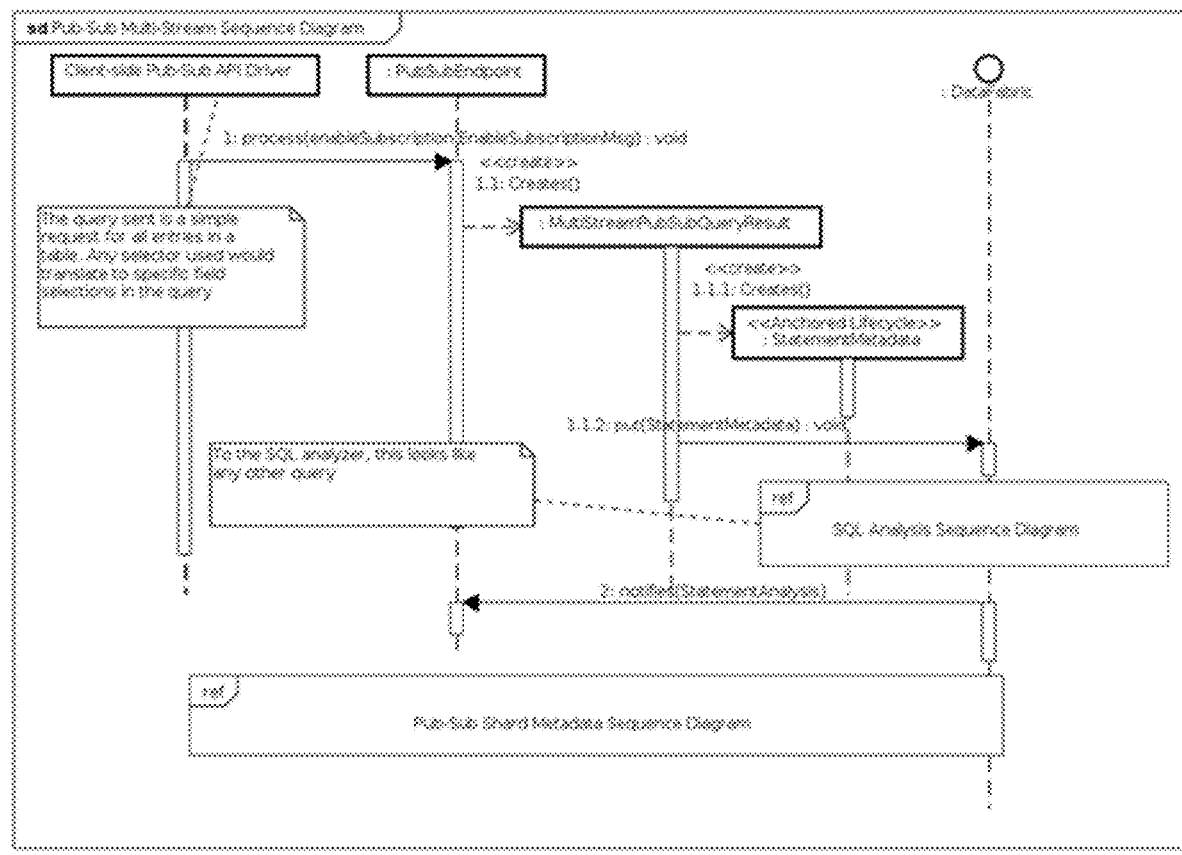
FIG. 77 is a pub-sub multi-stream subscription sequence diagram in accordance to embodiments.

FIG. 77 is a pub-sub multi-stream subscription sequence diagram in accordance to embodiments. Client-side Pub-Sub API Driver sends an EnableSubscriptionMsg with a query requesting content from a particular table. Rows in the result are mapped to streams within a multi-stream topic.

PubSubEndpoint, PubSubServer creates MultiStreamPubSubQueryResult to manage the query. MultiStreamPubSubQueryResult creates a StatementMetadata selecting all rows from the table name found in topic name. MultiStreamPubSubQueryResult publishes the StatementMetadata to the DataFabric. The StatementMetadata is detected and processed by the SQL analyzer as with any other statement. The MultiStreamPubSubQueryResult detects for the StatementAnalysis that results and responds to the client with success or failure MultiStreamPubSubQueryResult monitors ContentOrchestrationRequests produced during query processing and monitors ShardMetadata produced for the final phase of the query. Shard details are passed back to the client-side API driver which can then connect to the shards using a push distribution protocol.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of operating a data fabric node architecture comprising one or more data fabric nodes, the method comprising:
   receiving a session initiation from a client application and publishing corresponding session metadata to the data fabric;
   receiving from the client application a query and performing syntactic analysis and publishing a result of the analysis to the data fabric as a query metadata; and
   anchoring the query metadata in the data fabric to the session metadata.

2. The method of claim 1, further comprising:
   analyzing by a query service the query metadata received from the data fabric by a content adapter query handlers relevant to the query; and
   after a semantic analysis, responding to the query service using a response metadata anchored to the query metadata.

3. The method of claim 2, further comprising:
   publishing by a query service content metadata, the content metadata governing particular rows in a query result; and
   anchoring the content metadata to the query metadata in the data fabric.

4. The method of claim 3, further comprising, when the content metadata is created by a standard library, storing an identity for externally sourced content in the content metadata.

5. The method of claim 3, further comprising, when the content metadata is created by a function library, creating a content recipe having an identifier, storing the recipe in the data fabric, and storing the identifier in the content metadata.

6. The method of claim 4, further comprising:
   publishing, for each required query handling phase, a content orchestration request describing columns in the result and describing rows in the result with associated response content bindings via the data fabric; and
   anchoring the content orchestration requests and associated response content bindings directly or indirectly to the query metadata in the data fabric.

7. The method of claim 6, further comprising:
   an orchestration service receiving content orchestration requests and response content bindings from the data fabric and applying policies to choose assignments of content to caches and partitioning a result content as a whole into shards associated with orchestration targets; and
   publishing assignment metadata to the data fabric.

8. The method of claim 7, further comprising:
   receiving at content adapters assignment metadata from the data fabric; and
   identifying a required content from the content metadata and then materializing the required content so that it is accessible via shards and orchestration targets.

9. The method of claim 8, further comprising:
   function libraries locating content recipes identified in content metadata, identifying a required input content for each computed values, locating the content and then constructing an object that performs required computations, and updating a result in real-time if the inputs change.

10. The method of claim 9, further comprising:
    the orchestration service monitoring system metrics and result-specific metrics and choosing to add or remove resources from the system automatically and then re-balancing/relocating content and/or shards so as to achieve policy-based resource utilization goals and/or quality-of-service requirements.

11. The method of claim 10, further comprising:
    detecting by the query service a first query has been canceled or released by a client application and removing a corresponding query metadata from the data fabric; and
    removing by any data fabric node, where replicated, all objects in the data fabric previously anchored directly or indirectly to the first query.

12. A non-transitory computer-readable medium storing instructions that, when executed by one or more processors, cause the processors to operate a data fabric node architecture comprising one or more data fabric nodes, the operating comprising:
    receiving a session initiation from a client application and publishing corresponding session metadata to the data fabric;
    receiving from the client application a query and performing syntactic analysis and publishing a result of the analysis to the data fabric as a query metadata; and
    anchoring the query metadata in the data fabric to the session metadata.

13. The non-transitory computer-readable medium of claim 12, the operating further comprising:
    analyzing by a query service the query metadata received from the data fabric by a content adapter query handlers relevant to the query; and
    after a semantic analysis, responding to the query service using a response metadata anchored to the query metadata.

14. The non-transitory computer-readable medium of claim 13, the operating further comprising:
    publishing by a query service content metadata, the content metadata governing particular rows in a query result; and
    anchoring the content metadata to the query metadata in the data fabric.

15. The non-transitory computer-readable medium of claim 14, the operating further comprising, when the content metadata is created by a standard library, storing an identity for externally sourced content in the content metadata.

16. The non-transitory computer-readable medium of claim 15, the operating further comprising, when the content metadata is created by a function library, creating a content recipe having an identifier, storing the recipe in the data fabric, and storing the identifier in the content metadata.

17. A data fabric node system for operating a data fabric node architecture comprising one or more data fabric nodes, the system comprising:
    a processor executing instructions and in communication with publishers and consumers, the processor configured to:
    receive a session initiation from a client application and publishing corresponding session metadata to the data fabric;

receive from the client application a query and perform syntactic analysis and publish a result of the analysis to the data fabric as a query metadata; and anchor the query metadata in the data fabric to the session metadata.

18. The system of claim 17, the processor further configured to:

analyze by a query service the query metadata received from the data fabric by a content adapter query handlers relevant to the query; and after a semantic analysis, respond to the query service using a response metadata anchored to the query metadata.

19. The system of claim 18, the processor further configured to:

publish by a query service content metadata, the content metadata governing particular rows in a query result; and anchor the content metadata to the query metadata in the data fabric.

20. The system of claim 19, the processor further configured to, when the content metadata is created by a standard library, store an identity for externally sourced content in the content metadata.

* * * * *